United States Patent [19]
Yoshimi et al.

[11] Patent Number: 5,641,578
[45] Date of Patent: *Jun. 24, 1997

[54] WELDABLE BLACK STEEL SHEET

[75] Inventors: Naoto Yoshimi; Masaaki Yamashita; Toshiyuki Ookuma; Tatsuya Miyoshi; Toyofumi Watanabe; Tsutomu Watanabe, all of Tokyo, Japan

[73] Assignee: NKK Corporation, Tokyo, Japan

[*] Notice: The term of this patent shall not extend beyond the expiration date of Pat. No. 5,387,473.

[21] Appl. No.: 499,554

[22] Filed: Jul. 10, 1995

Related U.S. Application Data

[63] Continuation of Ser. No. 14,049, Feb. 5, 1993, abandoned, which is a continuation of Ser. No. 699,677, May 14, 1991, abandoned.

[30] Foreign Application Priority Data

| May 18, 1990 | [JP] | Japan | 2-126610 |
| Aug. 13, 1990 | [JP] | Japan | 2-211700 |
| Aug. 13, 1990 | [JP] | Japan | 2-211701 |
| Mar. 20, 1991 | [JP] | Japan | 3-080488 |

[51] Int. Cl.⁶ ............ B32B 15/08; B32B 15/18
[52] U.S. Cl. ............ 428/623; 428/626; 428/632; 428/659
[58] Field of Search ............ 428/621, 615, 428/623, 626, 658, 659

[56] References Cited

U.S. PATENT DOCUMENTS

| 3,928,292 | 12/1975 | Maeda et al. | 260/77.5 AQ |
| 4,329,402 | 5/1982 | Hyner et al. | 428/621 |
| 4,555,445 | 11/1985 | Frey et al. | 428/340 |
| 4,948,678 | 8/1990 | Shindou et al. | 428/623 |
| 4,981,759 | 1/1991 | Nakatani et al. | 428/626 |
| 5,059,492 | 10/1991 | Shindou et al. | 428/623 |
| 5,106,675 | 4/1992 | Ara et al. | 428/219 |
| 5,387,473 | 2/1995 | Yoshimi et al. | 428/626 |

*Primary Examiner*—John Zimmerman
*Attorney, Agent, or Firm*—Nields & Lemack

[57] ABSTRACT

A black steel sheet having a sufficiently small coating thickness to allow the welding of the steel sheet, and yet exhibiting an excellently black surface. It is a steel sheet having a surface plated with zinc or a zinc alloy, and carrying a chromate film formed on its plated surface, and a black film formed on the chromate film from a composition comprising specific proportions of a thermosetting resin and a black dye, which are both soluble in an organic solvent, and having a sufficiently small thickness. The composition may further contain a solid lubricant, or a granular rust-inhibitive pigment, or both.

57 Claims, 3 Drawing Sheets x : THE PROPORTION OF A BLACK DYE AGAINST 100 PARTS BY WEIGHT OF A THERMOSETTING RESIN WHICH IS SOLUBLE IN AN ORGANIC SOLVENT

WELDABLE BLACK STEEL SHEET

This application is a continuation of application Ser. No. 08/014,049 filed Feb. 5, 1993 (abandoned), which is a continuation of application Ser. No. 07/699,677 filed May 14, 1991 (now abandoned).

FIELD OF THE INVENTION

This invention relates to a black steel sheet which is weldable and exhibits an excellent appearance having a black color, and which is, therefore, suitable for use in making electric appliances for domestic use, machines and furniture for office use, copying machines, automobiles, building materials, etc.

BACKGROUND OF THE INVENTION

Various fields of industry including those engaged in the manufacture of electric appliances for domestic use and machines and furniture for office use have recently come to use to a greater extent a weldable black steel sheet having an excellent appearance which can be obtained by the continuous and rapid treatment of a steel sheet plated with zinc or an alloy thereof. A great deal of research and development work has, therefore, been made to obtain such black steel sheets, and includes efforts made to obtain an effective method for the blackening treatment of a steel sheet, and an effective solution which can be used for such treatment.

The following is a summary of the methods which have been proposed for forming a black film on a steel sheet as a result of the past work:

(a) A solution of a resin containing a black pigment, such as carbon black, is applied onto a steel sheet by e.g. spraying or roll coating to form thereon a film having a thickness of several tens of microns.

(b) A film existing on a steel sheet as a result of plating is caused to undergo reaction or electrolysis to develop a black film. This method includes a number of modes as will hereunder be set forth:

(1) A chromating solution containing Ag ions is used to form a black chromate film (as proposed in Japanese Patent Application Laid-Open No. 193376/1983);

(2) A black resin film composed mainly of carbon black is electrolyzed (Japanese Patent Application Laid-Open No. 62996/1981);

(3) A steel sheet which has been electroplated with a Zn-Co, Zn-Ni or Zn-Mo alloy is subjected to anodic treatment (Japanese Patent Publication No. 38276/1986);

(4) A steel sheet which has been plated with a Zn-Ni alloy is subjected to dipping, spraying or anodic treatment with a solution containing nitric acid or a nitrate group to develop a black surface (Japanese Patent Publication No. 30262/1987);

(5) A black plated film is formed by cathodic treatment (e.g. Japanese Patent Application Laid-Open No. 263995/1987); and (6) Immersion plating is carried out on a surface plated with zinc or an alloy thereof to deposit thereon a metal having a nobler potential (e.g. Japanese Patent Application Laid-Open No. 89879/1987).

(c) A treating solution obtained by adding an organic dye to an aqueous solution of potassium sodium silicate is applied onto a surface plated with zinc or an alloy (Japanese Patent Publication No. 30593/1980).

All of these methods do, however, have their own drawbacks, as will hereunder be pointed out.

(a) This is a common method of coating used to form an outer surface coating, the thickness of which is usually at least 10 microns when it consists of a single layer. This thickness is too large to allow the welding of the steel sheet. The thickness of the film which allows the welding of the steel sheet therethrough is from 0.2 to 3 microns. It is difficult to form a satisfactorily black film having a thickness not exceeding three microns, even if the solution may contain the black pigment, such as carbon black, at the maximum possible concentration. In other words, the use of any such blackening agent has been found unable to form any film that is satisfactorily black and yet keeps weldable the steel sheet on which the film has been formed.

(b)(1) The solution containing Ag ions is expensive. Moreover, this method spends as long a time as several tens of seconds in forming a black film and is, therefore, inapplicable to the continuous treatment of a strip which need be finished as rapidly as within five seconds.

(2) The black film which is formed by this method is unsatisfactory in formability. Insofar as carbon black is a conductive pigment, the film is electrically conductive and is, therefore, low in corrosion resistance. Moreover, the film is unsatisfactory in blackness.

(3) and (4) These methods are both uneconomical, since they rely upon the dissolution of metal from the plated layer on the steel sheet. Moreover, the metal ions as dissolved from the plated layer deteriorate the solution for the blackening treatment and can present a serious problem to the continuous treatment. Furthermore, both of the methods have only a limited scope of application, i.e. (3) is applicable only to a steel sheet plated with a Zn-Co, Zn-Ni or Zn-Mo alloy, while (4) is applicable only to a sheet plated with a Zn-Ni alloy.

(5) The black film which is formed by this method is unsatisfactory in formability.

(6) The black film which is formed by this method is unsatisfactory in adhesive strength, and is also low in corrosion resistance, insofar as a metal having a noble or high potential is deposited on a metal having a base or low potential (i.e. on zinc or an alloy thereof).

(c) This method is not intended for forming a film having an excellently black surface, nor is it intended for imparting weldability, insofar as the disclosure does not contain any specific reference to the film thickness. Moreover, as the film is basically composed of potassium sodium silicate, the hardened film is unsatisfactory in lubricating property as required during its press forming, and is, therefore, unsuitable for any steel sheet that is used for making electrical appliances for domestic use, office machines or furniture, etc. Moreover, the disclosure does not specifically define the organic dye to be used. There are a very large number of organic dyes which are widely different from one another in various properties including light fastness, tinting strength and solubility in a solvent. Some dyes are superior to others in e.g. tinting strength, but inferior in light fastness. It is, therefore, needless to say that all of the organic dyes are equally useful.

SUMMARY OF THE INVENTION

Under these circumstances, it is an object of this invention to provide a steel sheet coated with a film which allows the welding of the sheet therethrough and yet exhibits an excellent black surface. The weldable black steel sheet of this invention is an improvement over the product of the known method as described at (a) above in which a black pigment, such as carbon black, is employed to form a black film. The steel sheet of this invention is, therefore, free from any of the problems encountered by the known methods relying upon reaction or electrolysis as described at (b) above, including the deterioration of the treating solution by the dissolved metal ions, the loss of the plating material, and the scope of application limited by the underlying plating material. Moreover, the steel sheet of this invention can be produced continuously and rapidly by using an existing continuous strip coating and baking line.

It is another object of this invention to provide a steel sheet which is not only weldable and excellent in surface blackness, but also excellent in corrosion resistance, adhesive strength and formability.

We, the inventors of this invention, have done an extensive range of research and experimental work to attain these objects, and particularly, to obtain a black film which has a thickness allowing the welding of the underlying steel sheet, and yet is comparable in blackness to any known black film. As a result, we have found that a weldable steel sheet having an excellent black surface can be produced if a black film having an appropriate thickness falling within a specific range is formed thereon from a composition obtained by mixing a base resin and a specific black dye in a specific ratio, and that it is possible to produce a weldable and excellently black steel sheet which is excellent in corrosion resistance, adhesive strength and formability, too, if a film having a specific multilayer structure including the black film is formed on the steel sheet, or if the composition further contains a specific component as required. Our discovery of these facts forms a basis for this invention.

This invention, therefore, resides essentially in a steel sheet having a surface plated with zinc or a zinc alloy, and carrying a chromate film formed on the plated surface, and a black film formed in an appropriate thickness on the chromate film from a composition comprising specific proportions of a thermosetting resin and a black dye which are soluble in an organic solvent, and further containing a specific additive or additives, if required.

The following is a more specific summary of this invention:

(1) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a thermosetting resin as a base resin and 'x' parts by weight of a black dye as a blackening agent, the black film having a thickness of 'y' microns, the resin and the dye being both soluble in an organic solvent, the value of the 'x' satisfying formulas (1) and (2), while the value of the 'y' satisfies formulas (1) and (3):

$(x-1)(y-0.2) \geq 7$ (1)

$1 < x \leq 200$ (parts by weight) (2)

$0.2 < y \leq 3$ (microns) (3)

where x represents the proportion, in parts by weight, of the dye against 100 parts by weight of the base resin, and y represents the thickness, in microns, of the black film.

(2) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a thermosetting resin as a base resin, 1 to 100 parts by weight of a solid lubricant, and 'x' parts by weight of a black dye as a blackening agent, the black film having a thickness of 'y' microns, the resin and the dye being both soluble in an organic solvent, the value of the 'x' satisfying formulas (1) and (2), while the value of the 'y' satisfies formulas (1) and (3):

$(x-1)(y-0.2) \geq 7$ (1)

$1 < x \leq 200$ (parts by weight) (2)

$0.2 < y \leq 3$ (microns) (3)

where x represents the proportion, in parts by weight, of the dye against 100 parts by weight of the base resin, and y represents the thickness, in microns, of the black film.

(3) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a thermosetting resin as a base resin, 1 to 100 parts by weight of a granular rust-inhibitive pigment, and 'x' parts by weight of a black dye as a blackening agent, the black film having a thickness of 'y' microns, the resin and the dye being both soluble in an organic solvent, the value of the 'x' satisfying formulas (1) and (2), while the value of the 'y' satisfies formulas (1) and (3):

$(x-1)(y-0.2) \geq 7$ (1)

$1 < x \leq 200$ (parts by weight) (2)

$0.2 < y \leq 3$ (microns) (3)

where x represents the proportion, in parts by weight, of the dye against 100 parts by weight of the base resin, and y represents the thickness, in microns, of the black film.

(4) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a thermosetting resin as a base resin, 1 to 100 parts by weight of a solid lubricant, 1 to 100 parts by weight of a granular rust-inhibitive pigment, and 'x' parts by weight of a black dye as a blackening agent, the black film having a thickness of 'y' microns, the resin and the dye being both soluble in an organic solvent, the value of the 'x' satisfying formulas (1) and (2), while the value of the 'y' satisfies formulas (1) and (3):

$(x-1)(y-0.2) \geq 7$ (1)

$1 < x \leq 200$ (parts by weight) (2)

$0.2 < y \leq 3$ (microns) (3)

where x represents the proportion, in parts by weight, of the dye against 100 parts by weight of the base resin, and y represents the thickness, in microns, of the black film.

According to a preferred aspect of this invention, the values of the 'x' and 'y' are so selected as to satisfy formulas (1') and (2'), and (1') and (3'), respectively:

$$(x-5)(y-0.65) \geq 6 \quad (1')$$

$$5 < x \leq 120 \text{ (parts by weight)} \quad (2')$$

$$0.65 < y \leq 2.5 \text{ (microns)} \quad (3')$$

where x and y are both as defined above.

As a solid lubricant which the black film may contain, it is preferable to use one or more materials selected from the group consisting of hydrocarbon compounds such as polyolefin wax, fluororesins, fatty acid amides, metallic soaps, metal sulfides such as molybdenum disulfide, graphite, graphite fluoride, boron nitride and polyalkylene glycols. As a granular rust-inhibitive pigment, it is preferable to use one or more materials selected from the group consisting of sparingly soluble chromium compounds and silica.

As a dye which is soluble in an organic solvent, it is possible to use, for example, an azo, azine, phthalocyanine, azomethine, anthraquinone, or quinophthalone dye, or a mixture thereof.

The black dye which can be used for the purpose of this invention includes two types as classified by the chemical structure of the molecule, i.e. one which consists of a single kind of molecules and yet can give a black color, and a mixture of dyes which consist of molecules differing in chemical structure and can give a black color only when mixed.

A black metal complex of azo dye is particularly useful for making a black film which is excellent in both blackness and light fastness. A black azo dye composed of a complex chromium salt is, among others, useful for making a black film which is excellent in blackness, light fastness and corrosion resistance.

DETAILED DESCRIPTION OF THE INVENTION

Figure 1:
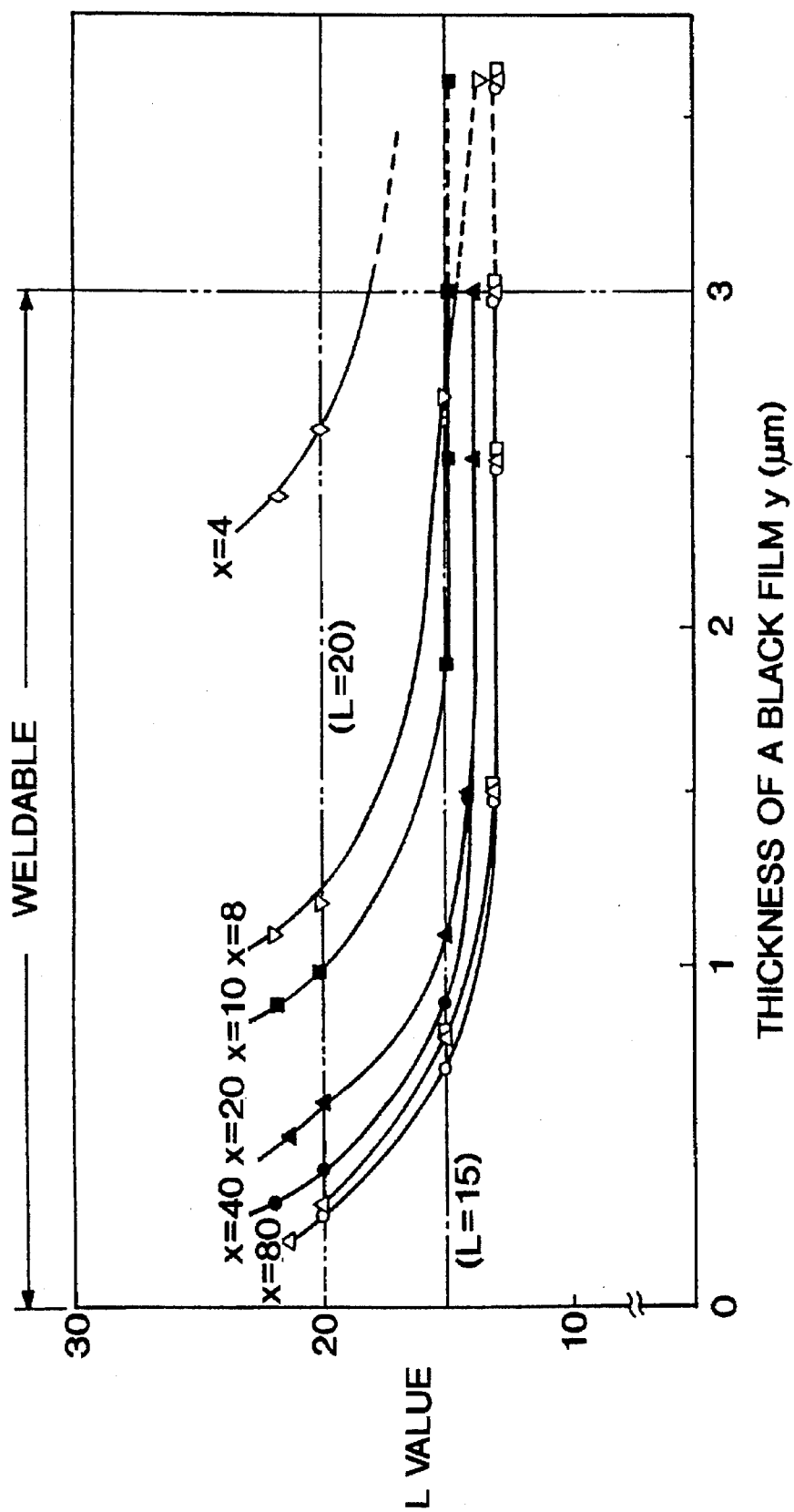
FIG. 1 is a graph showing the effect of the thickness, y, of a black film on its blackness (L value) in relation to the proportion, x, employed of a black dye which is soluble in an organic solvent.

The black steel sheet of this invention essentially comprises a steel sheet plated with zinc or a zinc alloy, as a starting material, a chromate film formed on its plated surface, and a black film formed on the chromate film from a composition comprising a thermosetting resin which is soluble in an organic solvent, and a black dye which is soluble in an organic solvent.

The black dye which can be used for the purpose of this invention includes two types as classified by the chemical structure of the molecule, i.e. one which consists of a single kind of molecules and yet can give a black color, and a mixture of dyes which consist of molecules differing in chemical structure and can give a black color only when mixed.

The steel sheet used as a starting material is, for example, a steel sheet plated with zinc, an alloy of zinc and iron, an alloy of zinc and nickel, an alloy of zinc and manganese, an alloy of zinc and aluminum, an alloy of zinc, cobalt and chromium, or a similar plating composition further containing one or more elements such as Ni, Fe, Mn, Mo, Co, Al and Cr. It is also possible to use as a starting material a steel sheet coated with a disperse plated layer formed from a composition similar to any of those mentioned above, but further containing, for example, a granular resin, silica, or a chromium compound. Moreover, the starting material may be a compositely plated steel sheet carrying a plating film formed by two or more layers of the same or different compositions, for example, a film formed by two or more layers consisting of Zn-Fe alloys having different iron contents, respectively.

As far as its blackness is concerned, a similar black film can be produced on any steel sheet and a cold rolled steel sheet which has not been plated can, for example, be used as a starting material. From the standpoint of corrosion resistance, however, it is necessary to use a plated steel sheet as a starting material, insofar as the black steel sheet of this invention is used for making a final product to which no further painting will be given.

Any practically possible method, such as an electrolytic, dip coating, or vapor phase process, can be employed for preparing the starting material.

A chromate film is formed on the surface of the starting material by chromate treatment. The combination of the chromate film and a black film containing a specific blackening agent as will hereinafter be described gives a very high level of corrosion resistance to the black steel sheet of this invention.

The chromate film is so formed as to have a dry coating weight of 10 to 200 mg/m$^2$, preferably 30 to 80 mg/m$^2$, in terms of metallic chromium. If its coating weight exceeds 200 mg/m$^2$, it is likely to lower the workability and weldability of the steel sheet. If its coating weight is smaller than 10 mg/m$^2$, it is likely to lack uniformity and lower the corrosion resistance of the steel sheet. The chromate film preferably contains chromium having a valence of 6, since chromium ions having a valence of 6 have a repairing action and prevent corrosion occurring from any surface defect on the steel sheet.

The chromate treatment for forming the chromate film can be carried out by any known process relying upon reaction, coating or electrolysis.

If a coating type of process is employed for the chromate treatment, it is carried out by employing a coating solution which consists mainly of a partially reduced chromic acid solution and may further contain a water-dispersible or -soluble organic resin, such as an acrylic resin, and/or silica (colloidal or fumed) having a particle diameter of several to several hundred millimicrons. The solution may contain chromium ions having a valence of 3 and ones having a valence of 6 in a ratio of 1:1 to 1:3, and have a pH of 1.5 to 4.0, preferably 2 to 3. The ratio of the chromium ions having a valence of 3 to those having a valence of 6 is adjusted by employing a commonly used organic reducing agent selected from among, for example, saccharides and alcohols, or a commonly used inorganic reducing agent. The coating type of chromate treatment may be carried out by any commonly used method, such as roll coating, dipping, or spraying. The treatment is not followed by water rinsing, but is directly followed by drying to give a chromate film, since rinsing results in the removal of chromium ions having a valence of 6. The film contains chromium ions having valences of 3 and 6 in the ratio in which the solution contains them. A resin film, which will be formed on the chromate film, prevents any excessive flow of chromium ions having a valence of 6 out of the chromate film in a corrosive environment and enables the maintenance of effective passivation and thereby high corrosion resistance for a long period of time.

An electrolytic type of chromate treatment is carried out by cathodic treatment in a bath comprising chromic anhydride and one or more kinds of anions selected from among, for example, sulfuric acid, phosphoric fluoride and halogenoxy acids, and is followed by rinsing in water and drying to give a chromate film.

The chromate film which is formed by the coating type of process contains a larger amount of chromium having a valence of 6 than that formed by the electrolytic process, and is, therefore, superior in corrosion resistance. The corrosion resistance of the former film becomes still better upon heat treatment, which improves its density and strength, as will hereinafter be described in further detail. The chromate film which is formed by the electrolytic process has the advantages of being high in density and strength even without being given heat treatment, and of being easy to control in coating weight. The film formed by the coating type of process is, however, preferred from the standpoint of corrosion resistance.

Description will now be made of the black film formed on the chromate film and its components. According to this invention, the black film is principally characterized by comprising a thermosetting resin which is soluble in an organic solvent, as a base resin, and a black dye which is also soluble in an organic solvent, as a blackening agent. The film may further contain a solid lubricant which is added to improve its formability or a rust-inhibitive pigment added to improve its corrosion resistance, or both.

In the following description, the blackness of a black film will be judged by its lightness, or L value. The smaller the L value of a film, the better its blackness is. According to this invention, the black film is intended to have an L value not exceeding 20, and preferably not exceeding 15. The L values which are herein stated were measured by a multiple light source spectrophotometer manufactured by Suga Shikenki Kabushiki Kaisha (Model MSC).

It is essential that the blackening agent which is employed to form the black film be capable of giving a satisfactorily high degree of blackness when the film has a thickness allowing the welding of the underlying steel sheet, i.e. not exceeding three microns. Moreover, it is imperative for the blackening agent not to exert any adverse effect on any other property required of the black film, such as formability or corrosion resistance, when it is mixed with the base resin in a ratio ensuring that the film exhibit a satisfactorily high degree of blackness.

The coloring agents which are generally in use can be classified into three major types, i.e. inorganic pigments, organic pigments, and dyes. When an inorganic or organic pigment is used in a coating film having a small thickness not exceeding several microns, its hiding power has a critical bearing on the blackness of the film. Carbon black is a typical inorganic pigment used as a blackening agent. As it is, for example, inexpensive, carbon black is used more often than any other blackening agent, and is commercially available in a wide variety of grades for a wide range of application. Carbon black, however, fails to exhibit a sufficiently high hiding power for achieving a satisfactorily high degree of blackness in any film having a thickness not exceeding three microns, as intended by this invention, though its hiding power may be sufficient for an ordinary coating film having a thickness in the order of as large as several tens of microns. Moreover, carbon black is an electrically conductive pigment, and forms, therefore, an electrically conductive black film which lowers the corrosion resistance of the steel sheet on which the film has been formed. No other black inorganic pigment, such as iron oxide or titanium black, can form a satisfactorily black film.

Aniline Black is a typical black organic pigment, but has too low a hiding power to form a satisfactorily black film. Another black organic pigment known as Perylene Black is also incapable of forming a satisfactorily black film.

No combination of two or more organic or inorganic pigments has been found capable of achieving a satisfactorily high level of blackness.

It is understood that there are commercially available thousands of dyes as counted by tradenames. They are classified by two major methods, i.e. (1) one classifying the dyes by the chemical structure thereof, and (2) one for the practical classification of the dyes based on their properties (see e.g. "Handbook of Organic Chemistry", compiled by The Society of Organic Synthetic Chemistry, and published by Gihodo).

The method as stated at (1) above classifies the dyes by the chemical group in the molecule which gives rise to color. The dyes as classified by this method include nitroso, nitro, azo (monoazo, disazo, trisazo and tetrakisazo), anthraquinone, indigo, azine, cyanine, phthalocyanine, stilbene, sulfur, triazole, triphenylmethane, acridine, diphenylmethane, and oxazine dyes.

According to the method as stated at (2) above, the dyes are classified into e.g. direct, acid, basic, acid mordant, premetallized, sulfur, vat, azoic, disperse, reactive, oxidation, fluorescent brightener, and oil-soluble (organic solvent-soluble) dyes.

It follows from these two ways of classification that, for example, the acid dyes according to the classification by the method (2) include azo (monoazo, disazo, trisazo and tetrakisazo), anthraquinone, triphenylmethane, and azine dyes according to the classification by the method (1).

The color of a dye as the most important property thereof is due to the action of a chemical group containing an unsaturated bond, such as —CH=CH—, or —N=N— (chromophore), and a group containing a lone pair of electrons, such as —NH$_2$ or —OH (auxochrome), whereby, while light having a particular wavelength is absorbed, light having a different wavelength not causing absorption is visible to the eye as the color of the dye. Thus, there are various dyes having a variety of colors. These colors are yellow, orange, red, violet, blue, green, brown and black according to the classification by the Color Index.

The Color Index (Third Edition, Vols. 1 to 8) published by The Society of Dyers and Colourists and American Association of Textile Chemists and Colourists describes the commercially available dyes by class, structure, properties, use, etc., and classifies the dyes under "C.I. Generic Name".

The Color Index classifies the commercially available dyes in a practically useful way similar to that of classification by the method as stated at (2) above, and gives the classification of the colors which includes the classification of the dyes by the chemical structure in a numerical order starting with 1. If the chemical structural formula of a dye is specifically known, it is shown under "C.I. Constitution Number", and the majority of the dyes of which the chemical structural formulas are not clear are classified by chemical structure as, for example, azo (monoazo, disazo, etc.), anthraquinone, and azine dyes, as is the case with the classification by the method stated at (1) above.

For example, the black dyes belonging to the class of acid dyes are grouped under the classification "C.I. Acid Black" which includes "C.I. Acid Black 1" covering disazo dyes having a specific chemical structure, "C.I. Acid Black 2" covering azine dyes having a specific chemical structure, and "C.I. Acid Black 3" covering disazo dyes having another chemical structure, and classifies the dyes by color, properties, use, etc. The "C.I. Generic Name" provides a listing of dyes by the names under which they are commercially available.

We have examined the black dyes belonging to every class of dyes to see whether each dye satisfies the requirements connected with the manufacture and use of the steel sheet according to this invention. The requirements are:

(1) That the dye is soluble or dispersible in a base resin (thermosetting resin) and a solvent (water, or an organic solvent), and does not change in color when a film containing it is baked for thermal setting;

(2) That the dye enables the formation of a satisfactorily black film having a small thickness allowing the welding of the underlying steel sheet, i.e. not exceeding three microns; and (3) That the color of the dye does not fade even in a film which is likely to be exposed to light from various sources, as one formed on a steel sheet used to make electrical appliances for domestic use, office machines or furniture, etc., i.e. the dye has good fastness to light.

It is only the black dyes satisfying all of these three requirements that can be used to make the black steel sheet of this invention.

We have found that the black dyes which are soluble in an organic solvent are suitable for use as a blackening agent for forming a black film on the steel sheet according to this invention. More specifically, we have found that a mixture of a black dye which is soluble in an organic solvent, and a thermosetting resin which is soluble in an organic solvent, can form a film having a sufficiently small thickness to allow welding, i.e. not exceeding three microns, and yet exhibiting an excellent level of blackness as represented by an L value not exceeding 20, and preferably not exceeding 15.

Such a black dye is easily soluble in an organic solvent, such as alcohol, Cellosolve, ester, or ketone, and can, therefore, form a composition for forming a black film if it is mixed with an organic solvent and a thermosetting resin which is soluble in an organic solvent. A black film formed from such a composition is excellently black, even if it may have a sufficiently small thickness to allow welding, i.e. a thickness not exceeding three microns. Insofar as the dye is highly fast to light, it can be used without presenting any problem for forming a black film which is likely to be exposed to light from various sources, as one formed on a steel sheet used to make electrical appliances for domestic use, office machines or furniture, etc.

The black film according to this invention is by far higher in corrosion resistance than any conventional black film containing carbon black as a blackening agent. This is apparently due to the facts:

(i) That the black dye is electrically nonconductive;

(ii) That The dye itself forms a passive film, as its molecules are uniformly and densely distributed in the black film; and (iii) That the uniformly and densely distributed molecules of the dye prevent penetration of ions through the film and thereby improve its barrier effect.

The corrosion resistance of the steel sheet according to this invention owes itself primarily to the barrier effect produced by the chromate forming a passive film by virtue of chromium ions having a valence of 3 and the barrier effect of the resin film, and is further improved by the barrier effect of the dye itself as hereinabove stated. Other factors contributing to its high corrosion resistance include its self-healing action which is achieved by the conversion of chromium ions having a valence of 6 in the chromate to ones having a valence of 3 and rectifying any defect of the passive film, and the high adhesive strength achieved between the zinc or zinc alloy layer and the chromate film, and between the chromate film and the black film.

The manufacture of the steel sheet according to this invention is free from any such problem caused by the deterioration of the bath used for treatment as has hitherto been encountered by etching type of blackening treatment, or blackening treatment relying upon reaction, such as electrolytic treatment or substitution plating. The black steel sheet of this invention avails itself of the most important advantage of the coating type of treatment, i.e. can be produced from any type of plated steel sheet irrespective of the material used for its plating.

We have found that no satisfactorily black film can be formed from any other dyes including diazovinylsulfone dyes belonging to the reactive black dyes (C.I. Reactive Black), monoazo dyes belonging to the mordant black dyes (C.I. Mordant Black), and azo dyes belonging to the disperse black dyes (C.I. Disperse Black). This is presumably due to the change in color which is caused by light or heat during or after the formation of a film, or the inherent insufficiency of the dye in blackness, or both. Other dyes, e.g. insoluble vat black dyes (C.I. Vat Black), have the drawback of being difficult to dissolve or disperse in any kind of base resin.

We have also found that the black metal complex of azo dye is superior in light fastness and corrosion resistance to any other black dye that is soluble in an organic solvent.

The black metal complex of azo dye belongs to the class "C.I. Solvent Black" in the Color Index, and more particularly, is a complex compound of an azo dye and a trivalent metal, such as chromium, copper or cobalt. According to "C.I. Generic Name" in the Color Index, typical dyes of this type include C.I. Solvent Black 6, 22, 23, 25, 28, 29, 30, 34 to 43, 45, and 47 to 49. Other dyes of this type are also available, though they are not registered in the Color Index.

This type of dye is characterized in that it is soluble in a solvent, and that it is superior to any other black dye in stability (fastness) to light, apparently because it is a complex compound having a chemical structure formed by two molecules of an azo dye and one atom of a metal (a complex metal salt of the 2:1 type). Although Cr, Co, Cu, Fe, Al, etc. can be used to form a complex salt with dye molecules, chromium is used more often in the known dyes of the type under consideration than any other metal.

Examples of the commercially available products are:

ORASOL Black RL of CIBA GEIGY (C.I. Solvent Black 29);

ORASOL Black RLP of CIBA GEIGY (C.I. Solvent Black 29);

ORASOL Black CN of CIBA GEIGY (C.I. Solvent Black 28);

ORASOL Black BA of CIBA GEIGY (C.I. Solvent Black 6);

ZAPON Black X51 of BASF (C.I. Solvent Black 27); and

Aizen Spilon Black RLH Special of Hodogaya Chemical Co., Ltd. (C.I. Solvent Black 42).

Examples of the products not found in the Color Index (Third Edition) are:

Aizen Spilon Black MH Special of Hodogaya; and
Kayaset Black K-R of Nippon Kayaku Co., Ltd.

Any of these dyes can be used to form an excellently black film.

The use of a dye composed of a complex chromium salt, among others, enables a very high level of corrosion resistance, presumably by virtue of the synergistic effect produced by the trivalent chromium ions and the underlying chromate, as will be obvious from EXAMPLE 6. It is apparent that the dye containing trivalent chromium forms a stable passive film showing a greatly improved barrier effect. Therefore, the most preferable form of the dye under consideration is a complex salt containing trivalent chromium ions.

We have also found that a solvent-soluble black azo dye which is not a complex metal salt can also form a film having a sufficiently small thickness to allow welding, i.e. not exceeding three microns, and yet exhibiting an excellent level of blackness which is comparable or even superior to that of the metal complex dye, as represented by an L value not exceeding 20, and preferably not exceeding 15. The non-complex dye is about 20% less expensive than the complex dye, and enables a corresponding reduction in the cost of a black film.

The black azo dye of the non-complex type presents a deeper black color if the number of the conjugated double bonds in its chromophore is increased to thereby prolong the length of the molecule of the dye. It is inferior to the complex dye in light stability or fastness, but can be used without presenting any problem for application in an environment in which it is not exposed to intense ultraviolet light, as on a steel sheet used to make a product for indoor use, e.g. an office automation machine.

Examples of this type of dye listed in the Color Index are:
C.I. Solvent Black 1, 2, 6, 15, 24 and 35 (monoazo dyes);
C.I. Solvent Black 3, 4 and 39 (disazo dyes); and
C.I. Solvent Black 26, 46 and 51 (each containing an unknown number of azo groups in the molecule).

Other existing or novel dyes not listed in the Color Index may be used for the purpose of this invention. It is also possible to use a mixture of two or more dyes. Moreover, it is possible to use a mixture consisting mainly of a black azo dye of the non-complex type and further containing a dye belonging to another class when classified by chemical structure.

Examples of the commercially available products are:
Neptun Black X60 (C.I. Solvent Black 3: product of BASF);
Neptun A Black X17 (C.I. Solvent Black 46: BASF); and
Mitsui Oil Black YG-6 (C.I. Solvent Black 39; Mitsui Toatsu Dyes Ltd.).

Any of these dyes can be used to form an excellently black film.

We have also found that a black azine dye which is soluble in an organic solvent can be used to form a film having a sufficiently small thickness to allow welding, i.e. a thickness not exceeding three microns, and yet exhibiting an excellent level of blackness which is comparable to that of a film of a metal complex of an azo dye, as represented by an L value not exceeding 20, and preferably not exceeding 15. The former dye is about 50% less expensive than the latter, and enables a drastic reduction in the cost of a black film, as compared with the latter. The former dye is inferior to the latter in light fastness, but can be used without presenting any problem for application in an environment in which it is not exposed to intense ultraviolet light, as on a steel sheet used to make an article for indoor use, e.g. an office automation machine.

Examples of black azine dyes listed in the Color Index are C.I. Solvent Black 5, 5:1, 7, 31, 32 and 50. Other existing or novel dyes not listed in the Color Index may be used for the purpose of this invention. It is also possible to use a mixture of two or more dyes, or a mixture consisting mainly of a black azine dye and further containing a dye belonging to another class when classified by chemical structure.

Examples of commercially available black azine dyes are:
Basonyl Black X22 (C.I. Solvent Black 5; product of BASF);
Orient Spirit Black SB (C.I. Solvent Black 5; Orient Chemical Industries, Ltd.);
Orient Spirit Black SSBB (C.I. Solvent Black 5; Orient Chemical);
Orient Nigrosine Base EX (C.I. Solvent Black 7; Orient Chemical);
Orient Oil Black BS (C.I. Solvent Black 7; Orient Chemical);
Orient Special Black EB (C.I. Solvent Black 7; Orient Chemical); and
Sumisol Black AR (C.I. Solvent Black 50; Sumitomo Chemical Industrial Co., Ltd.).

Any of these dyes can be used to form an excellently black film.

The black azo dye of the non-complex type and the black azine dye can both be used as a blackening agent to form an excellently black film having a sufficiently small thickness to allow welding, i.e. a thickness not exceeding three microns. Although they are both inferior in light fastness to the black azo dye of the complex type as hereinbefore stated, they can be used without presenting any problem to form a black film on a steel sheet which will be used to make an article for indoor use, such as an electrical appliance for domestic use, or office machine or furniture.

It is possible to use a mixture of two or more of the black azo dye of the metal complex type, black azo dye, and black azine dye which have been described.

Apart from these dyes, it is also possible to use another kind of dye that is soluble in an organic solvent, such as a phthalocyanine, azomethine, anthraquinone, or quinophthalone dye. The black dye which can be used for the purpose of this invention is not only one which consists of a single kind of molecules and can produce a black color by itself, but also a mixture of dyes which consist of molecules differing in chemical structure and can produce a black color only when mixed together, as hereinbefore stated. Therefore, it is possible to use a black dye produced in accordance with the subtractive process by mixing dyes selected from one or more classes of dyes, such as azo-metal complex, azo, azine, phthalocyanine, azomethine, anthraquinone and quinophthalone dyes.

The minimum allowable proportion of the black dye soluble in an organic solvent to the thermosetting resin also soluble in an organic solvent in the composition for forming the black film on the steel sheet of this invention, and the minimum allowable thickness of the black film are both dependent upon the intended blackness of the steel sheet, and are correlated to each other. The following is a description of the relation which we have experimentally found between the proportion 'x' (parts by weight) of the black dye for 100 parts by weight of the thermosetting resin and the thickness 'y' (microns) of the black film.

Reference is first made to FIG. 1 showing the effect which the thickness 'y' (microns) of the black film has experimentally been found to exert on its blackness (L value), in relation to the proportion 'x' (parts by weight) of the black dye. As is obvious from it, we have found that, while an increase in the value of x generally enables a lowering of the minimum allowable value of y, no desired blackness can be achieved unless the value of y is larger than 0.2 (preferably larger than 0.65), however large the value of x may be, and that, while an increase in the value of y generally enables a lowering of the minimum allowable value of x, no desired blackness can be achieved unless the value of x is larger than 1 (preferably larger than 5), however large the value of y (or the thickness of the film) may be.

The maximum allowable of the thickness 'y' (microns) of the black film is limited from a weldability standpoint. It is $$y \leq 3 \quad (3)$$

and preferably $$y \leq 2.5 \quad (3')$$

No film having a thickness 'y' in excess of three microns, or even in excess of 2.5 microns, is suitable, as it disables the satisfactory passage of a welding current.

The maximum allowable of the proportion 'x' (parts by weight) of the black dye for 100 parts by weight of the resin is limited from a formability standpoint. It is $$x \leq 200 \quad (2)$$

and preferably $$x \leq 120 \quad (2')$$

No proportion 'x' in excess of 200 parts by weight, or even in excess of 120 parts by weight, is suitable, as the resulting film is very likely to peel off any bent or otherwise formed portion thereof.

Figure 2:
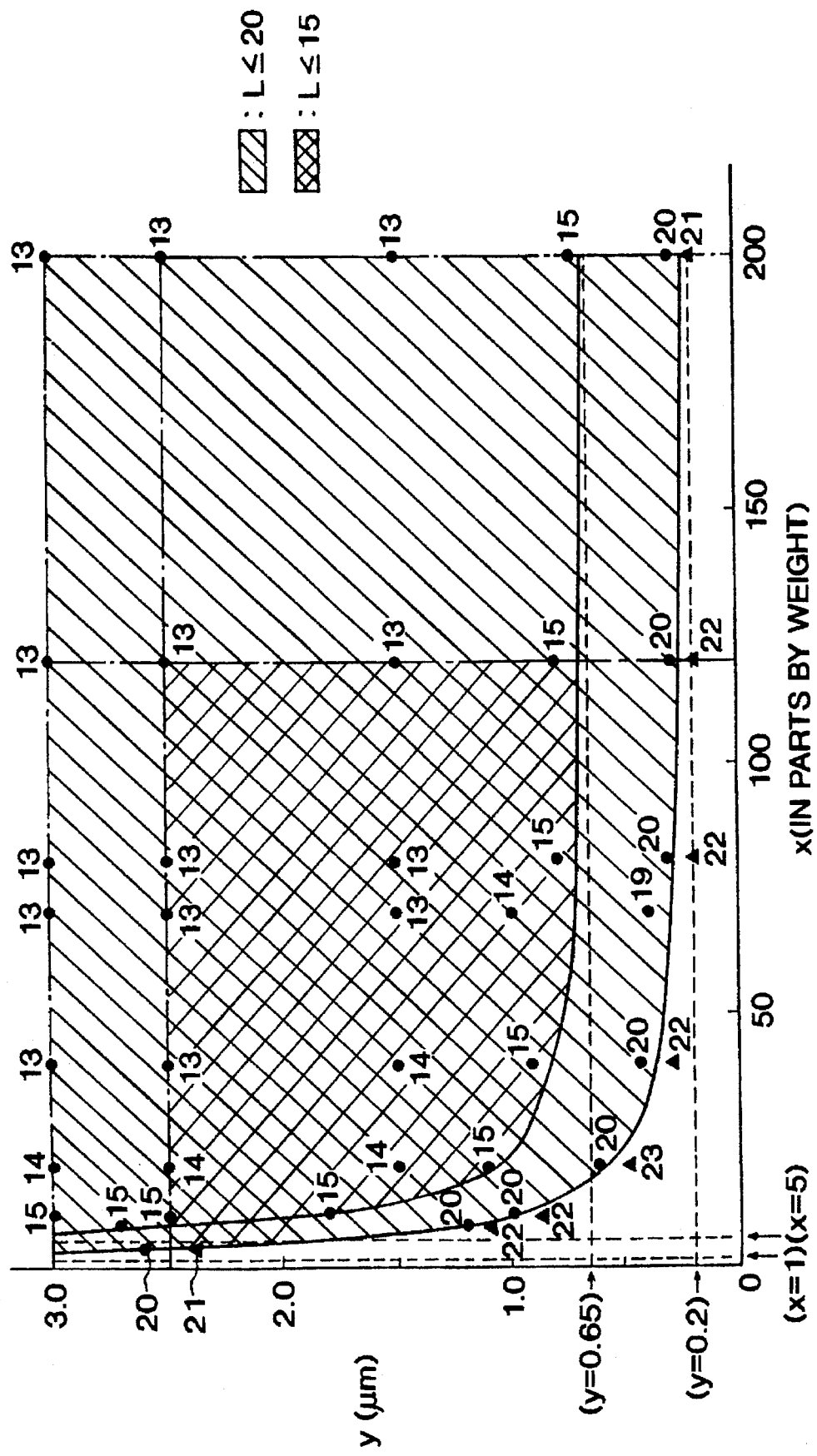
FIG. 2 is a graph showing the ranges of the proportion, x, of the black dye and the thickness, y, of the black film which give the film the desired blackness (L value)

We have studied the relation between the values of x (parts by weight) and y (microns), and obtained the results as shown in FIG. 2. As is obvious from it, we have found that, if the intended blackness is of a level as represented by an L value not exceeding 20, the following relationship need exist:

$$(x-1)(y-0.2) \geq 7 \quad (1)$$

where $x>1$, and $y>0.2$;
and that, if it is of a preferred level as represented by an L value not exceeding 15, the following relationship need exist:

$$(x-5)(y-0.65) \geq 6 \quad (1')$$

where $x>5$, and $y>0.65$.

Therefore, the black film on the steel sheet of this invention is required to satisfy the following relationship:

$$(x-1)(y-0.2) \geq 7$$

where $1<x \leq 200$, and $0.2<y \leq 3$,
and preferably the following relationship:

$$(x-5)(y-0.65) \geq 6$$

where $5<x \leq 120$, and $0.65<y \leq 2.5$.

FIG. 2 shows the ranges of x and y as defined above.

The base resin used to form the black film on the steel sheet of this invention is a thermosetting resin which is soluble in an organic solvent. These limitations are important for the reasons which will hereinafter be set forth. The resin need be one which is soluble in an organic solvent, since the black dye which is soluble in an organic solvent is difficult to dissolve satisfactorily in a water-soluble resin. The resin need be a thermosetting one, since the use of a thermoplastic resin is likely to result in a black film which is low in scratch resistance.

Specific examples of the applicable thermosetting resins which are soluble in an organic solvent are acrylic copolymer, alkyd, epoxy, polybutadiene, phenolic, polyurethane, and silicone resins, and isocyanate- or melamine-crosslinked fluororesins. It is also possible to use a mixture of two or more such resins, a product of addition condensation formed by any such resin and another monomer, or a derivative of any such resin obtained by modification with another resin. Acrylic copolymer, alkyd, and epoxy resins are, among others, preferred.

The acrylic copolymer resins are ones which can be synthesized from ordinary unsaturated ethylenic monomers by e.g. solution, emulsion or suspension polymerization. This type of resin is obtained by employing as an essential component a hard monomer such as methacrylate, acrylonitrile, styrene, acrylic acid, acrylamide or vinyltoluene, and adding an appropriate proportion of an unsaturated vinyl monomer to impart hardness, flexibility and crosslinking property to the resulting resin. The resin may be modified by another kind of resin, such as an alkyd, epoxy, or phenolic resin.

As regards the alkyd resins, it is possible to use any of the known ones which can be produced by ordinary methods for synthesis, for example, oil-modified, rosin-modified, phenol-modified, styrenated, silicone-modified, and acryl-modified alkyd resins, and oilfree alkyd (polyester) resins.

Examples of the suitable epoxy resins are straight epoxy resins of e.g. the epichlorohidrin or glycidyl ether type, and fatty acid-modified, polybasic acid-modified, acrylic resin-modified, alkyd- (or polyester-)modified, polybutadiene-modified, phenol-modified, amine- or polyamine-modified, and urethane-modified epoxy resins.

A known curing agent is used with the resin. Examples of the appropriate curing agents are melamine, block isocyanate, and urea.

The black film formed on the steel sheet of this invention as hereinabove described possesses all of the necessary properties. The addition of certain additives as will hereinafter be described, however, makes it possible to form a film having still better properties.

Firstly, it is preferable to add a solid lubricant to a film-forming composition to form a black film having good self-lubricating property. The following is a list of examples of the solid lubricants which are appropriate for the purpose of this invention:

(a) Hydrocarbon lubricants, such as natural and synthetic paraffins, microcrystalline wax, polyethylene wax, and chlorinated hydrocarbons;

(b) Fluororesins, such as polyfluoroethylene, polyvinyl fluoride, polytetrafluoroethylene, and polyvinylidene fluoride resins;

(c) Fatty acid amide lubricants, such as stearic acid amide, palmitic acid amide, methylenebisstearoamide, ethylenebisstearoamide, oleic acid amide, ethyl acid amide, and alkylenebis fatty acid amide;

(d) Metallic soaps, such as calcium stearate, lead stearate, calcium laurate, and calcium palmitate;

(e) Metal sulfides, such as molybdenum disulfide, and tungsten disulfide; and (f) Other lubricants, such as graphite, graphite fluoride, boron nitride, grease, and alkali metal sulfates.

The solid lubricant is used in the proportion of 1 to 100 parts by weight, preferably 10 to 60 parts by weight, for 100 parts by weight of thermosetting resin. If its proportion is less than one part, or even 10 parts, by weight, it does not satisfactorily improve the lubricating property of the black film. The use of the lubricant in any proportion in excess of 100 parts, or even 60 parts, by weight, is undesirable, since it lowers the strength of the black film as cured, and causes it to adhere partly to a die used for pressing the steel sheet.

The black film formed from a coating composition comprising a base resin and a black dye, which are both soluble in an organic solvent, has a satisfactorily high level of corrosion resistance by virtue of the synergistic effect produced by the underlying plating layer and the chromate film. It is, however, preferable to add a rust-inhibitive pigment to the composition to form a film which exhibits a still higher level of corrosion resistance particularly when subjected to working, and thereby provides a black steel sheet having a widened scope of application.

It is possible to use as the rust-inhibitive pigment one or more materials selected from among sparingly soluble chromates and silica. The sparingly soluble chromates are barium chromate ($BaCrO_4$), strontium chromate ($SrCrO_4$) lead chromate ($PbCrO_4$), zinc chromate ($ZnCrO_4 \cdot 4Zn(OH)_2$), calcium chromate ($CaCrO_4$), potassium zinc chromate ($K_2O \cdot 4ZnO \cdot 4CrO_3 \cdot 3H_2O$), and silver chromate ($AgCrO_4$).

As regards silica, it is effective to use hydrophobic silica because of its affinity for an organic solvent. Hydrophobic silica is obtained by rendering colloidal or fumed silica hydrophobic. Specific examples are:

(1) Colloidal silica dispersed in an organic solvent, such as methyl, ethyl, n-propyl, isopropyl or n-butyl alcohol, ethyl cellosolve, or ethylene glycol (known by commercial names such as OSCAL 1132, 1232, 1332, 1432, 1532, 1622, 1722 and 1724 of Shokubai Kasei Kogyo); and (2) Hydrophobic ultrafinely divided silica, or ultrafine silica particles having surfaces rendered hydrophobic by e.g. an organic solvent, or reactive silane compound (known by commercial names such as R974, RS11, R812, R805, T805, R202, RY200 and RX200 of Nippon Aerosil).

Any such hydrophobic silica is stable when dispersed in the base resin.

One or more rust-inhibitive pigments are incorporated as one of the constituents of the film-forming composition. The rust-inhibitive pigment is used in the proportion of 1 to 100 parts, preferably 10 to 60 parts, by weight for 100 parts by weight of thermosetting resin. If its proportion is less than one part by weight, it does not exhibit any rust inhibiting effect. The use of the pigment in any proportion exceeding 100 parts by weight should be avoided, as it gives rise to a color other than black, and results in an unsatisfactorily black film. For example, the yellow sparingly soluble chromates reduces the blackness.

The addition of both the solid lubricant and the granular rust-inhibitive pigment enables the formation of a black film which is outstandingly good in both formability and corrosion resistance on any formed steel sheet portion. In this case, they are each used in the proportion of 1 to 100 parts, preferably 10 to 60 parts, by weight for 100 parts by weight of base resin.

Moreover, another color pigment (carbon black, or any other inorganic or organic pigment), or dye can be added to form a black film having its color tone and luster controlled exquisitely as desired.

The black film as hereinabove described can be formed if the composition which has been diluted with a solvent as required is applied in an appropriate film thickness onto a steel sheet by e.g. roll squeezing or coating, or air-knife coating, and is baked by heating the sheet to a temperature of 80° C. to 300° C., preferably 120° C. to 250° C. Any ordinary method can be employed without any limitation in particular for the application and baking of the composition. It is, however, a great advantage of the steel sheet according to this invention that it can be manufactured by any coating equipment that iron and steel manufacturers usually have for producing high corrosion resistance surface treated steel sheets.

As is obvious from the foregoing, this invention provides a black steel sheet which is weldable, since its black film has a thickness not exceeding three microns, which is smaller than the black film on any conventionally available steel sheet, and yet which has an excellently black surface. The black steel sheet of this invention is a product which is excellent in both various properties and productivity. In addition to its excellent blackness and weldability, it is outstandingly characterized by the high adhesive strength, workability, corrosion resistance and light fastness of its black film. As it can be manufactured by any existing coating and baking equipment including a roll coater, its manufacture can be accomplished by a process of greatly improved productivity which is free from any problem as has hitherto been caused by the deterioration of the coating solution by an dissolution from the plating layer on any conventional black steel sheet made by reactive etching.

The black steel sheet exhibits a particularly high level of light fastness if its black film contains as the blackening agent a black metal complex of azo dye which is soluble in an organic solvent. It exhibits a particularly high level of corrosion resistance, as well as light fastness, if the metal forming the complex is chromium.

The black azo dye of the non-complex type and the black azine dye are somewhat inferior in light fastness to the black azo dye of the complex type, but can be used without presenting any problem to form a black film on a steel sheet used to make any article for indoor use, such as an electrical appliance for domestic use. Moreover, the former dyes are about 20 to 50% less expensive than the latter, and the use thereof enables a corresponding reduction in the cost of the film-forming composition.

EXAMPLES

The invention will now be described more specifically with reference to EXAMPLES 1 to 6 each directed to a steel sheet used for making an electrical appliance for domestic use, or office machine or furniture, as well as COMPARATIVE EXAMPLES 1 to 6 corresponding to EXAMPLES 1 to 6, respectively.

Each steel sheet had a surface which had been electroplated with a Zn-Ni alloy having a nickel content of 12%, or a Zn-Fe alloy having an iron content of 25%. After it had been degreased with an alkali, rinsed with water, and dried, it was coated with a chromate solution by a roll coater, or was electrolyzed in an electrolytic bath for chromate treatment, whereby a chromate film was formed on the plated surface of the steel sheet. After it had been dried, the film was coated with a resin solution by a roll coater. The resin film was dried, heated, and air cooled.

More specifically, the coating type of chromate treatment and the electrolytic chromate treatment were carried out, as will be described below:

Coating Type of Chromate Treatment

The chromating solution contained chromium ions having a valence of 3 and ones having a valence of 6 in the ratio of 2:3, and had a pH of 2.5 (after adjustment by KOH), and a solid content of 20 g per liter. The solution was applied by the roll coater onto the steel surface at ordinary room temperature, and dried.

Electrolytic Chromate Treatment

The bath contained 50 g of $CrO_3$ and 0.5 g of $H_2SO_4$ per liter, and had a temperature of 50° C. The film was formed by cathodic treatment using a current density of 4.9 $A/dm^2$ and an electrolyzing time of 20 seconds, followed by rinsing with water and drying.

TABLES 1 to 7 show the modes of plating applied on the steel sheets, and the details of the base resins, blackening agents, solid lubricants, and granular rust-inhibitive pigments used for preparing the black film compositions, as employed in the EXAMPLES of this invention and the COMPARATIVE EXAMPLES. TABLES 8 to 95 show the plated steel sheets employed, the chromate films formed thereon, the compositions used for forming black films thereon, and the results of the tests conducted on the black steel sheets obtained. The compositions were prepared by mixing the constituents thereof as shown in TABLES 2 to 7 in the proportions as shown in TABLE 8 and so on, and were diluted with an organic solvent as required.

The following is a description of the tests conducted for the evaluation of each black steel sheet:

(1) Blackness:

The multiple light source spectrophotometer (Model MSC) of Suga Test Instruments Co., Ltd. was used to determine the L value of the black film on each steel sheet as a measure of its blackness. The symbols used to show the results of evaluation in the relevant tables have the following meanings, respectively:

⊚: L≦15;
o: 15<L<20;
x: L>20.

(2) Weldability:

Spot welding was conducted on each steel sheet and the number of continuously formed weld spots was counted as a measure of its weldability.

Spot Welding Conditions:

Electrode: Cr-Cu, D type;
Electrode dia.: 6 mm;
Welding current: 10 kA;
Welding pressure: 200 kg;
Welding time: 12 cycles/60 Hz.

The symbols used to show the results in the relevant tables have the following meanings:

⊚: 1000 or more spots;
o: 700 or more spots;
x: Less than 700 spots.

(3) Corrosion resistance of flat and formed portions:

In EXAMPLES 1 to 5, a salt spray test conforming to the requirements of JIS-Z-23 71 was conducted for a maximum of 480 hours on a flat portion of each black steel sheet and an extruded portion formed by an Erichsen tester and having a height of 7 mm. The corrosion resistance of each tested portion was judged by the length of time which had passed before white rust formed in 5% by area of its surface. The symbols used to show the results have the following meanings:

⊚: No white rust occured during the passage of 480 hours;
+o: Occur more than 240 hours to within 480 hours;
o: Occur more than 120 hours to within 240 hours;
−o: Occur more than 72 hours to within 120 hours;
Δ: Occur more than 24 hours to within 72 hours;
x: Within 24 hours.

In EXAMPLE 6, each steel sheet was evaluated more strictly for corrosion resistance. The salt spray test on each flat portion to be tested was continued for 600 hours to see how white rust would propagate. The symbols used to show the results have the following meanings:

⊚: White rust covered not more than 5% by area of the surface of the tested portion;
o: Not more than 20% by area;
x: More than 20% by area.

(4) Adhesive strength of black film:

One hundred squares defining a checkered pattern and having a distance of 1 mm from one another were cut in the black film on each steel sheet, and an adhesive tape was bonded to, and removed from, the checkered surface to see how the black film would peel off the steel sheet. The symbols used to show the results have the following meanings:

⊚: No peeling occurred;
o: Peeling occurred to less than 10% by area of the film;
Δ: Peeling occurred to from 10%, inclusive, to less than 20%, by area;
x: Peeling occurred to 20% or more by area.

(5) Formability:

Each specimen of black steel sheet was subjected to hat-drawing, by 10 mm-extrusion through a 50 mmφ-die with a 120 mmφ-blank, and an adhesive tape was bonded to, and removed from, the drawn portion of the black film to determine how the film would peel off the steel sheet and adhere to the tape, and change in appearance. The symbols used to show the results have the following meanings:

⊚: No powdery peeling occurred;
+o: Some powdery peeling occurred only locally, and the black film remained substantially unchanged in appearance;
o: The powdery peeling of the black film blackened the tape very slightly, but the film remained substantially unchanged in appearance;
−o: The powdery peeling of the black film blackened the tape slightly, and the film was slightly whitened;
Δ: The powdery peeling of the black film blackened the tape, and the film was heavily whitened;
x: The tape was extremely blackened as a result of the complete peeling of the black film.

(6) Light fastness:

The black film on each steel sheet was exposed to light applied by a fadeometer in accordance with the Second Light Exposure Method as specified by JIS L-0842, and its fade resistance was ranked in accordance with the Blue Scale, as follows:

⊚: Grade 7 or 8 of the Blue Scale;
o: Grade 5 or 6;
Δ: Grade 3 or 4;
x: Grade 1 or 2

EXAMPLE 1 AND COMPARATIVE EXAMPLE 1

Black steel sheets embodying this invention and having black films formed by using different kinds of blackening agents were each evaluated for blackness, weldability, workability, adhesive strength, corrosion resistance, and light fastness. Comparative black steel sheets were likewise evaluated for blackness, weldability, and light fastness. It is, however, to be noted in connection with the comparative steel sheets that, whenever a water-soluble black dye was used as the blackening agent, a water-dispersible thermosetting resin was used as the base resin for an affinity reason.

Further information on the steel sheets and the results of their evaluation are shown in TABLES 8 to 25. All of the black films contained 70 parts by weight of blackening agent against 100 parts by weight of base resin, and the different thicknesses of the black films were achieved by employing different roll coating conditions.

Figure 3:
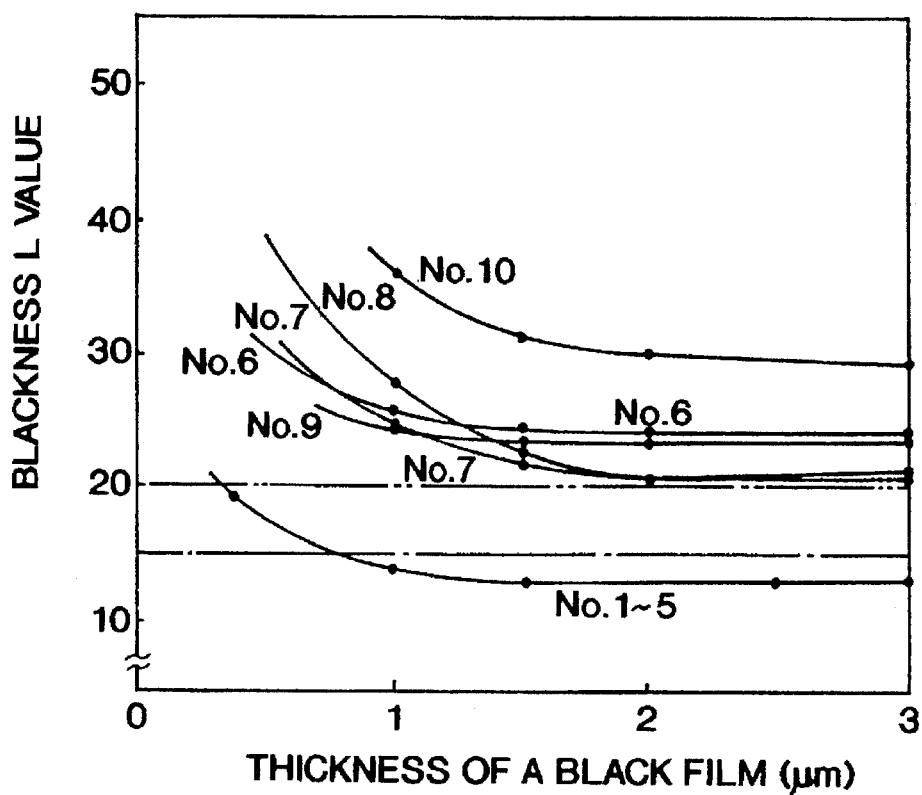
FIG. 3 is a graph showing the blackness of the black film on each sample according to Examples as will hereinafter be described, in relation to its thickness.

FIG. 3 shows the results of the blackness evaluation of each of the steel sheets according to EXAMPLE 1 and COMPARATIVE EXAMPLE 1. As is obvious therefrom, the steel sheets of this invention which had been prepared by using organic solvent-soluble black dyes as the blackening agents exhibited the intended blackness, while having black film thicknesses allowing welding, but no other black dye or pigment could achieve the intended blackness.

EXAMPLE 2 AND COMPARATIVE EXAMPLE 2

Black steel sheets embodying this invention and carrying black films formed by using different proportions of specific organic solvent-soluble black dyes, and having different thicknesses were each evaluated for blackness, weldability, formability, adhesive strength, corrosion resistance, and light fastness. Comparative black steel sheets were likewise evaluated for blackness and weldability.

Further information on the steel sheets and the results of their evaluation are shown in TABLES 26 to 61. As is obvious therefrom, good blackness was achieved only when the relationship as expressed by the formula $$(x-1)(y-0.2) \geq 7$$

existed between the proportion 'x' of the blackening agent and the thickness y of the black film, and an outstandingly good level of blackness as represented by an L value not exceeding 15 could be obtained when the relationship $$(x-5)(y-0.65) \geq 6$$

existed.

Figure 4:
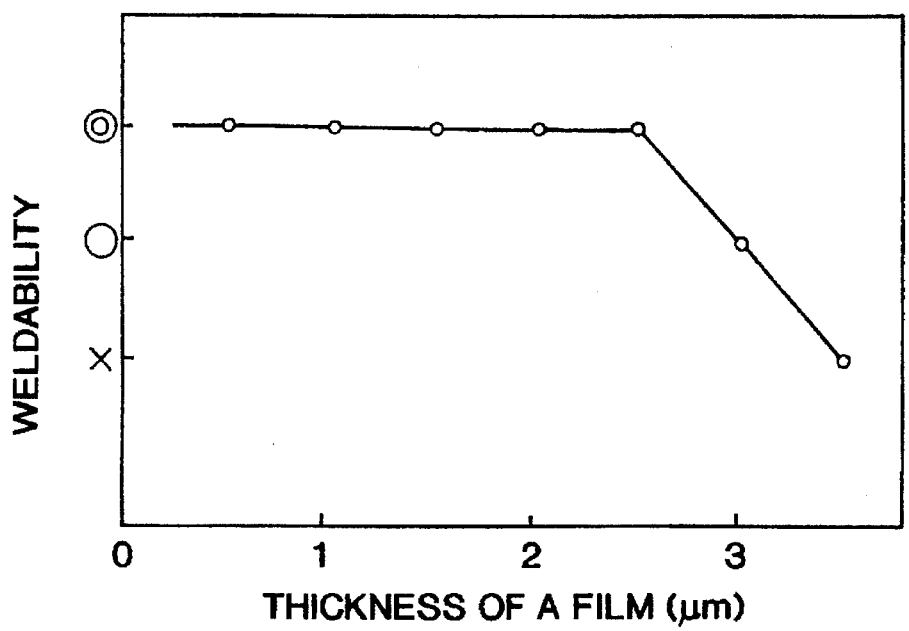
FIG. 4 is a graph showing the weldability of each sample according to Examples in relation to the thickness of the black film formed thereon.

FIG. 4 shows the results of the weldability evaluation of the steel sheets according to EXAMPLES 1 and 2, and COMPARATIVE EXAMPLES 1 and 2. As is obvious therefrom, the steel sheets were found to begin to lower in weldability when their black film thickness exceeded 2.5 microns, and no steel sheet having a black film thickness in excess of three microns was properly weldable.

EXAMPLE 3 AND COMPARATIVE EXAMPLE 3

Black steel sheets embodying this invention, which had been differently plated and chromated, and on which black films differing in composition had been formed, were each evaluated for blackness, weldability, formability, corrosion resistance, and light fastness. Comparative black steel sheets were likewise evaluated. Further information on the steel sheets and the results of their evaluation are shown in TABLES 62 to 71.

EXAMPLE 4 AND COMPARATIVE EXAMPLE 4

Black steel sheets embodying this invention and having black films differing in composition were each evaluated for blackness, weldability, formability, corrosion resistance, and light fastness. Comparative black steel sheets were likewise evaluated. Further information on the steel sheets and the results of their evaluation are shown in TABLES 72 to 91.

EXAMPLE 5 AND COMPARATIVE EXAMPLE 5

Black steel sheets embodying this invention and having black films formed by using organic solvent-soluble black dyes, and a comparative black steel sheet having a clear film not containing any black dye were each evaluated for corrosion resistance, and other properties. Further information on the steel sheets and the results of their evaluation are shown in TABLES 92 and 93. For the sake of further comparison, TABLES 92 and 93 include also Sample No. 3 of COMPARATIVE EXAMPLE 3 having a black film formed on the steel sheet on which no chromate film had been formed. 5 As is obvious from TABLE 93, the steel sheets embodying this invention (each comprising a zinc-plated steel sheet, a chromate film formed thereon and having a coating weight of 50 mg/m$^2$, and a black film formed thereon and having a thickness of 1.5 microns) were superior in corrosion resistance to the comparative steel sheet comprising a zinc-plated steel sheet, a chromate film formed thereon and having a coating weight of 50 mg/m$^2$, and a clear film formed thereon. The superiority in corrosion resistance of the steel sheets embodying this invention is not only due to the barrier effect produced by the chromate film and the resin film, but also due to the facts that the black dye itself forms a passive film, as the molecules of the dye mixed with the resin are uniformly and densely distributed in the black film, and that, if the black dye is a complex salt, trivalent chromium ions forming a complex salt with a dye form an oxide forming a passive film.

Moreover, it is apparent that the corrosion resistance of the steel sheets embodying this invention does not only owe itself to the black film, but is further enhanced by the interaction of the black film with the underlying chromate film. This is obvious from their comparison with Sample No. 3 of COMPARATIVE EXAMPLE 3 having no chromate film formed thereon. This steel sheet of COMPARATIVE EXAMPLE 3 having a black film formed directly on a zinc-plated steel surface was by far inferior in corrosion resistance to the steel sheets embodying this invention. It is evident that the outstandingly high corrosion resistance of the steel sheets embodying this invention was not only due to the barrier effect added to by the chromate film, but was due to the synergistic effect produced by the chromate film and the black film formed thereon.

EXAMPLE 6 AND COMPARATIVE EXAMPLE 6

The salt spray test as hereinbefore described was conducted for a prolonged period of 600 hours on a flat portion of each of the black steel sheets which had been prepared in EXAMPLE 1, and designated as Nos. 3, 28, 53 and 78, so that the black films formed by using different kinds of black dyes might be compared in corrosion resistance. The corrosion resistance of the black film on each steel sheet was judged by the percentage by area of the surface on which white rust had formed. Further information on the steel sheets and the results of their evaluation are shown in TABLES 94 and 95.

As is obvious from TABLE 95, the black dye of the complex type (a complex salt of dye and chromium) exhibited the highest corrosion resistance, and the black azo dye of the non-complex type, the black azine dye and the other black dye were somewhat lower in corrosion resistance.

EXAMPLE 7 AND COMPARATIVE EXAMPLE 7

A chromate film having a coating weight of 50 mg/m$^2$ in terms of chromium was formed by a continuous roll coater on the degreased surface of a steel sheet plated with a Zn-Ni alloy containing 12% Ni. One of the compositions as described at (1) to (3) below was applied onto the chromate film by the continuous roll coater, and cured by heating at 140° C. to form a black film having a thickness of 1.5 microns, whereby three kinds of black steel sheets embodying this invention were prepared:

(1) A composition comprising 100 parts by weight of an amine-modified epoxy resin and 70 parts by weight of a black azo complex dye soluble in an organic solvent (ORASOL Black RL of CIBA GEIGY);

(2) A composition comprising 100 parts by weight of the same epoxy resin and 70 parts by weight of a black azo dye soluble in an organic solvent (Neptun Black X60 of BASF); or (3) A composition comprising 100 parts by weight of the same epoxy resin and 70 parts by weight of a black azine dye soluble in an organic solvent (Basonyl Black X22 of BASF).

For the sake of comparison, a steel sheet plated with a Zn-12%Ni alloy and having a degreased surface was dipped for five seconds in a bath for reactive blackening treatment composed of an aqueous solution of nitric acid having a concentration of 5% by weight and a temperature of 25° C., was rinsed with water, and was dried, whereby a black film was formed on the steel sheet.

The comparative steel sheet, however, began to lower its blackness when about 0.03 m$^2$ of its surface per liter of the solution had been blackened, and when about 0.04 m$^2$ of its surface had been treated, the L value as a measure of its blackness exceeded 20, and no further continuation of blackening treatment was possible. On the other hand, continuous treatment was possible for the manufacture of the steel sheets embodying this invention as long as the supply of the film-forming composition could be continued.

After the black steel sheets had been prepared, a part of the remainder of each of the solutions which had been used for forming the black films on the steel sheets embodying this invention was collected from the tray in the roll coater, and a part of the aqueous solution of nitric acid used for blackening the comparative steel sheet was likewise collected. The zinc content of each solution was determined by an apparatus for atomic absorption spectroscopy (Model Z-8100 of Hitachi Limited) as a measure of the amount of zinc eluted from the plating layer. Only a trace, or even a smaller amount, of zinc was detected from each solution employed for the purpose of this invention, but the solution used for the comparative purpose was found to contain zinc in the amount indicating the elution of about 5 g of Zn-12%Ni alloy per m$^2$ of the treated surface.

The salt spray test as hereinbefore described was conducted for evaluating each black steel sheet obtained for corrosion resistance. The flat tested portion of any steel sheet embodying this invention was free of any white rust when the test lasting for 480 hours was over, but the whole surface of the comparative steel sheet was covered with white rust in about one to two hours.

A chromate film having a coating weight of 50 mg/m$^2$ in terms of chromium was formed by coating on the blackened surface of a comparative steel sheet, and a clear film having a thickness of 1.5 microns was formed on the chromate film from the epoxy resin as hereinabove mentioned. Then, the salt spray test as hereinbefore described was conducted again on the comparative steel sheet. White rust was found on about 5% by area of the tested surface when the test lasting for 240 hours was over. Thus, it was an improvement in corrosion resistance over the steel sheet having no chromate or resin film formed on its surface. The comparative black steel sheet may also be satisfactory in corrosion resistance as a material for making an electrical appliance for domestic use, but can only be manufactured by a process comprising the steps of forming a black film by reactive blackening treatment on a steel sheet plated with a Zn-Ni alloy, rinsing with water, drying, forming a chromate film, and forming a clear resin film, while the black steel sheet of this invention can be manufactured by a process comprising the steps of forming a chromate film on a plated steel sheet, and forming a black film thereon. It is, therefore, another great advantage of the black steel sheet of this invention that it can be manufactured by a simplified process not including any of the steps of reactive blackening treatment, rinsing and drying.

The following symbols that will appear in many of the tables have the following meanings:

*1: See TABLE 1; *2: See TABLE 2;
*3: See TABLE 3, 4 or 5;
*4: Parts by weight of the blackening agent for 100 parts by weight of base resin;
*5 : See TABLE 6;
*6: Parts by weight of solid lubricant for 100 parts by weight of base resin;
*7: See TABLE 7;
*8: Parts by weight of granular rust-inhibitive pigment for 100 parts by weight of base resin;
*9: $(x-1)(y-0.2)$;
*10: $(x-5)(y-0.65)$.

TABLE 1

| No. | Materials |
| --- | --- |
| 1 | Electrogalvanized steel |
| 2 | Zn—Ni alloy electroplated steel |
| 3 | Zn—Fe alloy electroplated steel |
| 4 | Hot dip galvanized steel |
| 5 | Zn—SiO$_2$ composite electroplated steel |

TABLE 2

| No. | Base Resin | Designation |
| --- | --- | --- |
| 1 | Amine-modified epoxy resin | Resin listed as No. 2 in Table 3 in Japanese Patent Appln. Laid-Open No. 8033/1989 |
| 2 | Acryl silicone resin | ZEMLAC: Product of Kanegafuchi Chemical Industrial Co., Ltd. |
| 3 | Fluororesin | LUMIFLON: Product of Asahi Glass Co., Ltd. |
| 4 | Phenoxy resin | PHENO-TOTO: Product of Toto Chemical Co., Ltd. |
| 5 | Water-soluble epoxy ester | WATERSOL: Product of Dainippon Ink & Chemical Co., Ltd. |

(Note)
No. 1 to 3: Thermosetting resin soluble in an organic solvent
No. 4: Thermoplastic resin soluble in an organic solvent
No. 5: Water-soluble thermosetting resin

TABLE 3

| No. | Blackening agent | Tradename | C.I. Generic Name |
|---|---|---|---|
| 1 | Black azo dye composed of a complex metal salt soluble in an organic solvent | ORASOL Black RL (CIBA-GEIGY) | C.I. Solvent Black 29 |
| 2 | Black azo dye composed of a complex metal salt soluble in an organic solvent | ORASOL Black CN (CIBA-GEIGY) | C.I. Solvent Black 28 |
| 3 | Black azo dye composed of a complex metal salt soluble in an organic solvent | Aizen Spilon Black RLH Special (Hodogaya Chemical Co., Ltd.) | C.I. Solvent Black 42 |
| 4 | Black azo dye composed of a complex metal salt soluble in an organic solvent | Aizen Spilon Black MH Special (Hodogaya Chemical Co., Ltd.) | Not registered in COLOUR INDEX (Third Edition) |
| 5 | Black azo dye composed of a complex metal salt soluble in an organic solvent | Olesol Fast Black RL (Taoka Chemical Co., Ltd.) | C.I. Solvent Black 27 |
| 6 | Black azo dye soluble in an organic solvent | Neptun Black X60 (BASF) | C.I. Solvent Black 3 |
| 7 | Black azo dye soluble in an organic solvent | Orient Oil Black HBB (Orient Chemical Industries, Ltd.) | C.I. Solvent Black 3 |
| 8 | Black azo dye soluble in an organic solvent | Orient Oil Black HZ (Orient Chemical Industries, Ltd.) | C.I. Solvent Black 3 |
| 9 | Black azo dye soluble in an organic solvent | Mitsui Oil Black YG-6 (Mitsui-Toatsu Dyes Ltd.) | C.I. Solvent Black 39 |

(Note) No. 1 to 5 are all composed of a complex salt of chromium.

TABLE 4

| No. | Blackening agent | Tradename | C.I. Generic Name |
|---|---|---|---|
| 10 | Black azo dye soluble in an organic solvent | Orient Oil Black 803 (Orient Chemical Industries, Ltd.) | (Mixture of azo dyes) |
| 11 | Black azine dye soluble in an organic solvent | Basonyl Black X22 (BASF) | C.I. Solvent Black 5 |
| 12 | Black azine dye soluble in an organic solvent | Orient Spirit Black SB (Orient Chemical Industries, Ltd.) | C.I. Solvent Black 5 |
| 13 | Black azine dye soluble in an organic solvent | Orient Nigrosine Base EX (Orient Chemical Industries, Ltd.) | C.I. Solvent Black 7 |
| 14 | Black azine dye soluble in an organic solvent | Orient Oil Black BS (Orient Chemical Industries, Ltd.) | C.I. Solvent Black 7 |
| 15 | Black azine dye soluble in an organic solvent | Sumisol Black AR (Sumitomo Chemical Industrial Co., Ltd.) | C.I. Solvent Black 50 |
| 16 | Black dye soluble in an organic solvent | Mixture of ① to ③ in a weight ratio of 1:1:1) ①②: C.I. Solvent Blue 64 (Azo dye composed of a complex metal salt) ②: C.I. Solvent Yellow 89 (Phthalocyanine dye) ③: C.I. Solvent Red 148 (Azo dye) | |
| 17 | Black dye soluble in an organic solvent | | C.I. Solvent Black 8 |

TABLE 5

| No. | Blackening agent | Tradename | C.I. Generic Name |
|---|---|---|---|
| 18 | Reactive black dye (water-soluble) | Celmazol Black B (Mitsui-Toatsu Dyes, Ltd.) | C.I. Reactive Black 5 |
| 19 | Mordant black dye (water-soluble) | Mitsui Chrome Black PB conc. (Mitsui-Toatsu Dyes, Ltd.) | C.I. Mordant Black 11 |
| 20 | Direct black dye (water-soluble) | Kayarus Black G conc. (Nippon Kayaku Co., Ltd.) | C.I. Direct Black 19 |
| 21 | Carbon black | Mitsubishi Carbon Black #950 (Mitsubishi Chemical Industries, Ltd.) | — |
| 22 | Aniline black | Paliotol Black L0080 (BASF) | C.I. Pigment Black 1 |

TABLE 6

| No. | Solid Lubricant |
|---|---|
| 1 | Polyethylene wax (SANWAX 151-P; Sanyo Chemical Co., Ltd.) |
| 2 | Molybdenum disulfide (MOLYPOWDER C: Nippon Kokuen Kogyo Co., Ltd.) |
| 3 | Polytetrafluoroethylene (HOSTAFLON TF 9202: Hoechst Japan) |

TABLE 7

| No. | Granular Rust-Inhibitive Pigment |
|---|---|
| 1 | Sparingly soluble chromium compound: $BaCrO_4$ (Product of Kikuchi Color Industrial Co., Ltd.) |
| 2 | Sparingly soluble chromium compound: $CaCrO_4$ (Product of Kikuchi Color Industrial Co., Ltd.) |
| 3 | Silica: Hydrophobic ultrafine silica (Product of Nippon Aerozile Co., Ltd.; R811) |
| 4 | Silica: Colloidal silica dispersed in an organic solvent (Product of Catalyst Chemical Industrial Co.; OSCAL 1432 |

TABLE 8

| | Starging sheet *1 | | Chromate film | | Black film | | | | | | | | | | |
| --- | --- | --- | --- | --- | --- | --- | --- | --- | --- | --- | --- | --- | --- | --- | --- |
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 1 | | | | | | | | | | | | | | | |
| 1 | 1 | 20 | coating | 50 | 1 | 1 | 70 | — | — | — | — | 0.4 | 13.8 | — | 140 |
| 2 | 1 | 20 | coating | 50 | 1 | 1 | 70 | — | — | — | — | 1.0 | 55.2 | 22.75 | 140 |
| 3 | 1 | 20 | coating | 50 | 1 | 1 | 70 | — | — | — | — | 1.5 | 89.7 | 55.25 | 140 |
| 4 | 1 | 20 | coating | 50 | 1 | 1 | 70 | — | — | — | — | 2.5 | 158.7 | 120.25 | 140 |
| 5 | 1 | 20 | coating | 50 | 1 | 1 | 70 | — | — | — | — | 3.0 | 193.2 | 152.75 | 140 |
| 6 | 1 | 20 | coating | 50 | 1 | 2 | 70 | — | — | — | — | 0.4 | 13.8 | — | 140 |
| 7 | 1 | 20 | coating | 50 | 1 | 2 | 70 | — | — | — | — | 1.0 | 55.2 | 22.75 | 140 |
| 8 | 1 | 20 | coating | 50 | 1 | 2 | 70 | — | — | — | — | 1.5 | 89.7 | 55.25 | 140 |
| 9 | 1 | 20 | coating | 50 | 1 | 2 | 70 | — | — | — | — | 2.5 | 158.7 | 120.25 | 140 |
| 10 | 1 | 20 | coating | 50 | 1 | 2 | 70 | — | — | — | — | 3.0 | 193.2 | 152.75 | 140 |
| 11 | 1 | 20 | coating | 50 | 1 | 3 | 70 | — | — | — | — | 0.4 | 13.8 | — | 140 |
| 12 | 1 | 20 | coating | 50 | 1 | 3 | 70 | — | — | — | — | 1.0 | 55.2 | 22.75 | 140 |

TABLE 9

| | Starging sheet *1 | | Chromate film | | Black film | | | | | | | | | | |
| --- | --- | --- | --- | --- | --- | --- | --- | --- | --- | --- | --- | --- | --- | --- | --- |
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 1 | | | | | | | | | | | | | | | |
| 13 | 1 | 20 | coating | 50 | 1 | 3 | 70 | — | — | — | — | 1.5 | 89.7 | 55.25 | 140 |
| 14 | 1 | 20 | coating | 50 | 1 | 3 | 70 | — | — | — | — | 2.5 | 158.7 | 120.25 | 140 |
| 15 | 1 | 20 | coating | 50 | 1 | 3 | 70 | — | — | — | — | 3.0 | 193.2 | 152.75 | 140 |
| 16 | 1 | 20 | coating | 50 | 1 | 4 | 70 | — | — | — | — | 0.4 | 13.8 | — | 140 |
| 17 | 1 | 20 | coating | 50 | 1 | 4 | 70 | — | — | — | — | 1.0 | 55.2 | 22.75 | 140 |
| 18 | 1 | 20 | coating | 50 | 1 | 4 | 70 | — | — | — | — | 1.5 | 89.7 | 55.25 | 140 |
| 19 | 1 | 20 | coating | 50 | 1 | 4 | 70 | — | — | — | — | 2.5 | 158.7 | 120.25 | 140 |
| 20 | 1 | 20 | coating | 50 | 1 | 4 | 70 | — | — | — | — | 3.0 | 193.2 | 152.75 | 140 |
| 21 | 1 | 20 | coating | 50 | 1 | 5 | 70 | — | — | — | — | 0.4 | 13.8 | — | 140 |
| 22 | 1 | 20 | coating | 50 | 1 | 5 | 70 | — | — | — | — | 1.0 | 55.2 | 22.75 | 140 |
| 23 | 1 | 20 | coating | 50 | 1 | 5 | 70 | — | — | — | — | 1.5 | 89.7 | 55.25 | 140 |
| 24 | 1 | 20 | coating | 50 | 1 | 5 | 70 | — | — | — | — | 2.0 | 124.2 | 87.75 | 140 |
| 25 | 1 | 20 | coating | 50 | 1 | 5 | 70 | — | — | — | — | 3.0 | 193.2 | 152.75 | 140 |

TABLE 10

| Starting sheet *1 | | Chromate film | | Black film | | | | | | | | | | |
|---|---|---|---|---|---|---|---|---|---|---|---|---|---|---|
| | | | Coating weight of chromium (mg/m²) | | Additive 1 | | Additive 2 | | Additive 3 | | | | | |
| Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |

Example 1

| | | | | | | | | | | | | | | |
|---|---|---|---|---|---|---|---|---|---|---|---|---|---|---|
| 26 | 1 | 20 | coating | 50 | 1 | 6 | 70 | — | — | — | — | 0.4 | 13.8 | — | 140 |
| 27 | 1 | 20 | coating | 50 | 1 | 6 | 70 | — | — | — | — | 1.0 | 55.2 | 22.75 | 140 |
| 28 | 1 | 20 | coating | 50 | 1 | 6 | 70 | — | — | — | — | 1.5 | 89.7 | 55.25 | 140 |
| 29 | 1 | 20 | coating | 50 | 1 | 6 | 70 | — | — | — | — | 2.5 | 158.7 | 120.25 | 140 |
| 30 | 1 | 20 | coating | 50 | 1 | 6 | 70 | — | — | — | — | 3.0 | 193.2 | 152.75 | 140 |
| 31 | 1 | 20 | coating | 50 | 1 | 7 | 70 | — | — | — | — | 0.4 | 13.8 | — | 140 |
| 32 | 1 | 20 | coating | 50 | 1 | 7 | 70 | — | — | — | — | 1.0 | 55.2 | 22.75 | 140 |
| 33 | 1 | 20 | coating | 50 | 1 | 7 | 70 | — | — | — | — | 1.5 | 89.7 | 55.25 | 140 |
| 34 | 1 | 20 | coating | 50 | 1 | 7 | 70 | — | — | — | — | 2.5 | 158.7 | 120.25 | 140 |
| 35 | 1 | 20 | coating | 50 | 1 | 7 | 70 | — | — | — | — | 3.0 | 193.2 | 152.75 | 140 |
| 36 | 1 | 20 | coating | 50 | 1 | 8 | 70 | — | — | — | — | 0.4 | 13.8 | — | 140 |
| 37 | 1 | 20 | coating | 50 | 1 | 8 | 70 | — | — | — | — | 1.0 | 55.2 | 22.75 | 140 |

TABLE 11

| Starting sheet *1 | | Chromate film | | Black film | | | | | | | | | | |
|---|---|---|---|---|---|---|---|---|---|---|---|---|---|---|
| | | | Coating weight of chromium (mg/m²) | | Additive 1 | | Additive 2 | | Additive 3 | | | | | |
| Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |

Example 1

| | | | | | | | | | | | | | | |
|---|---|---|---|---|---|---|---|---|---|---|---|---|---|---|
| 38 | 1 | 20 | coating | 50 | 1 | 8 | 70 | — | — | — | — | 1.5 | 89.7 | 55.25 | 140 |
| 39 | 1 | 20 | coating | 50 | 1 | 8 | 70 | — | — | — | — | 2.5 | 158.7 | 120.25 | 140 |
| 40 | 1 | 20 | coating | 50 | 1 | 8 | 70 | — | — | — | — | 3.0 | 193.2 | 152.75 | 140 |
| 41 | 1 | 20 | coating | 50 | 1 | 9 | 70 | — | — | — | — | 0.4 | 13.8 | — | 140 |
| 42 | 1 | 20 | coating | 50 | 1 | 9 | 70 | — | — | — | — | 1.0 | 55.2 | 22.75 | 140 |
| 43 | 1 | 20 | coating | 50 | 1 | 9 | 70 | — | — | — | — | 1.5 | 89.7 | 55.25 | 140 |
| 44 | 1 | 20 | coating | 50 | 1 | 9 | 70 | — | — | — | — | 2.5 | 158.7 | 120.25 | 140 |
| 45 | 1 | 20 | coating | 50 | 1 | 9 | 70 | — | — | — | — | 3.0 | 193.2 | 152.75 | 140 |
| 46 | 1 | 20 | coating | 50 | 1 | 10 | 70 | — | — | — | — | 0.4 | 13.8 | — | 140 |
| 47 | 1 | 20 | coating | 50 | 1 | 10 | 70 | — | — | — | — | 1.0 | 55.2 | 22.75 | 140 |
| 48 | 1 | 20 | coating | 50 | 1 | 10 | 70 | — | — | — | — | 1.5 | 89.7 | 55.25 | 140 |
| 49 | 1 | 20 | coating | 50 | 1 | 10 | 70 | — | — | — | — | 2.0 | 124.2 | 87.75 | 140 |
| 50 | 1 | 20 | coating | 50 | 1 | 10 | 70 | — | — | — | — | 3.0 | 193.2 | 152.75 | 140 |

TABLE 12

| | Starging sheet *1 | | | Chromate film | Black film | | | | | | | | | | |
| --- | --- | --- | --- | --- | --- | --- | --- | --- | --- | --- | --- | --- | --- | --- | --- |
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ①  *9 | Value of formula ①' *10 | Baking temp. (°C.) |
| Example 1 | | | | | | | | | | | | | | | |
| 51 | 1 | 20 | coating | 50 | 1 | 11 | 70 | — | — | — | — | 0.4 | 13.8 | — | 140 |
| 52 | 1 | 20 | coating | 50 | 1 | 11 | 70 | — | — | — | — | 1.0 | 55.2 | 22.75 | 140 |
| 53 | 1 | 20 | coating | 50 | 1 | 11 | 70 | — | — | — | — | 1.5 | 89.7 | 55.25 | 140 |
| 54 | 1 | 20 | coating | 50 | 1 | 11 | 70 | — | — | — | — | 2.5 | 158.7 | 120.25 | 140 |
| 55 | 1 | 20 | coating | 50 | 1 | 11 | 70 | — | — | — | — | 3.0 | 193.2 | 152.75 | 140 |
| 56 | 1 | 20 | coating | 50 | 1 | 12 | 70 | — | — | — | — | 0.4 | 13.8 | — | 140 |
| 57 | 1 | 20 | coating | 50 | 1 | 12 | 70 | — | — | — | — | 1.0 | 55.2 | 22.75 | 140 |
| 58 | 1 | 20 | coating | 50 | 1 | 12 | 70 | — | — | — | — | 1.5 | 89.7 | 55.25 | 140 |
| 59 | 1 | 20 | coating | 50 | 1 | 12 | 70 | — | — | — | — | 2.5 | 158.7 | 120.25 | 140 |
| 60 | 1 | 20 | coating | 50 | 1 | 12 | 70 | — | — | — | — | 3.0 | 193.2 | 152.75 | 140 |
| 61 | 1 | 20 | coating | 50 | 1 | 13 | 70 | — | — | — | — | 0.4 | 13.8 | — | 140 |
| 62 | 1 | 20 | coating | 50 | 1 | 13 | 70 | — | — | — | — | 1.0 | 55.2 | 22.75 | 140 |

TABLE 13

| | Starging sheet *1 | | | Chromate film | Black film | | | | | | | | | | |
| --- | --- | --- | --- | --- | --- | --- | --- | --- | --- | --- | --- | --- | --- | --- | --- |
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 1 | | | | | | | | | | | | | | | |
| 63 | 1 | 20 | coating | 50 | 1 | 13 | 70 | — | — | — | — | 1.5 | 89.7 | 55.25 | 140 |
| 64 | 1 | 20 | coating | 50 | 1 | 13 | 70 | — | — | — | — | 2.1 | 158.7 | 120.25 | 140 |
| 65 | 1 | 20 | coating | 50 | 1 | 13 | 70 | — | — | — | — | 3.0 | 193.2 | 152.75 | 140 |
| 66 | 1 | 20 | coating | 50 | 1 | 14 | 70 | — | — | — | — | 0.4 | 13.8 | — | 140 |
| 67 | 1 | 20 | coating | 50 | 1 | 14 | 70 | — | — | — | — | 1.0 | 55.2 | 22.75 | 140 |
| 68 | 1 | 20 | coating | 50 | 1 | 14 | 70 | — | — | — | — | 1.5 | 89.7 | 55.25 | 140 |
| 69 | 1 | 20 | coating | 50 | 1 | 14 | 70 | — | — | — | — | 2.5 | 158.7 | 120.25 | 140 |
| 70 | 1 | 20 | coating | 50 | 1 | 14 | 70 | — | — | — | — | 3.0 | 193.2 | 152.75 | 140 |
| 71 | 1 | 20 | coating | 50 | 1 | 15 | 70 | — | — | — | — | 0.4 | 13.8 | — | 140 |
| 72 | 1 | 20 | coating | 50 | 1 | 15 | 70 | — | — | — | — | 1.0 | 55.2 | 22.75 | 140 |
| 73 | 1 | 20 | coating | 50 | 1 | 15 | 70 | — | — | — | — | 1.5 | 89.7 | 55.25 | 140 |
| 74 | 1 | 20 | coating | 50 | 1 | 15 | 70 | — | — | — | — | 2.0 | 124.2 | 87.75 | 140 |
| 75 | 1 | 20 | coating | 50 | 1 | 15 | 70 | — | — | — | — | 3.0 | 193.2 | 152.75 | 140 |

TABLE 14

| | Starting sheet *1 | | Chromate film | | Black film | | | | | | | | | | |
|---|---|---|---|---|---|---|---|---|---|---|---|---|---|---|---|
| | | | Method of forming | Coating weight of chromium (mg/m²) | | Additive 1 | | Additive 2 | | Additive 3 | | | | | |
| | Kind of plating *1 | Coating weight (g/m²) | | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |

Example 1

| 76 | 1 | 20 | coating | 50 | 1 | 16 | 70 | — | — | — | — | 0.4 | 13.8 | — | 140 |
| 77 | 1 | 20 | coating | 50 | 1 | 16 | 70 | — | — | — | — | 0.1 | 55.2 | 22.75 | 140 |
| 78 | 1 | 20 | coating | 50 | 1 | 16 | 70 | — | — | — | — | 1.5 | 89.7 | 55.25 | 140 |
| 79 | 1 | 20 | coating | 50 | 1 | 16 | 70 | — | — | — | — | 2.5 | 158.7 | 120.25 | 140 |
| 80 | 1 | 20 | coating | 50 | 1 | 16 | 70 | — | — | — | — | 3.0 | 193.2 | 152.75 | 140 |
| 81 | 1 | 20 | coating | 50 | 1 | 17 | 70 | — | — | — | — | 0.4 | 13.8 | — | 140 |
| 82 | 1 | 20 | coating | 50 | 1 | 17 | 70 | — | — | — | — | 1.0 | 55.2 | 22.75 | 140 |
| 83 | 1 | 20 | coating | 50 | 1 | 17 | 70 | — | — | — | — | 1.5 | 89.7 | 55.25 | 140 |
| 84 | 1 | 20 | coating | 50 | 1 | 17 | 70 | — | — | — | — | 2.5 | 158.7 | 120.25 | 140 |
| 85 | 1 | 20 | coating | 50 | 1 | 17 | 70 | — | — | — | — | 3.0 | 193.2 | 152.75 | 140 |

TABLE 15

| | Starting sheet *1 | | Chromate film | | Black film | | | | | | | | | | |
|---|---|---|---|---|---|---|---|---|---|---|---|---|---|---|---|
| | | | Method of forming | Coating weight of chromium (mg/m²) | | Additive 1 | | Additive 2 | | Additive 3 | | | | | |
| | Kind of plating *1 | Coating weight (g/m²) | | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |

Comparative Example 1

| 1 | 1 | 20 | coating | 50 | 5 | 18 | 70 | — | — | — | — | 1 | — | — | 140 |
| 2 | 1 | 20 | coating | 50 | 5 | 18 | 70 | — | — | — | — | 1.5 | — | — | 140 |
| 3 | 1 | 20 | coating | 50 | 5 | 18 | 70 | — | — | — | — | 2 | — | — | 140 |
| 4 | 1 | 20 | coating | 50 | 5 | 18 | 70 | — | — | — | — | 3 | — | — | 140 |
| 5 | 1 | 20 | coating | 50 | 5 | 19 | 70 | — | — | — | — | 1 | — | — | 140 |
| 6 | 1 | 20 | coating | 50 | 5 | 19 | 70 | — | — | — | — | 1.5 | — | — | 140 |
| 7 | 1 | 20 | coating | 50 | 5 | 19 | 70 | — | — | — | — | 2 | — | — | 140 |
| 8 | 1 | 20 | coating | 50 | 5 | 19 | 70 | — | — | — | — | 3 | — | — | 140 |
| 9 | 1 | 20 | coating | 50 | 5 | 20 | 70 | — | — | — | — | 1 | — | — | 140 |
| 10 | 1 | 20 | coating | 50 | 5 | 20 | 70 | — | — | — | — | 1.5 | — | — | 140 |

TABLE 16

| | Starting sheet *1 | | Chromate film | | Black film | | | | | | | | | |
|---|---|---|---|---|---|---|---|---|---|---|---|---|---|---|
| | | | | Coating weight of chromium (mg/m²) | | Additive 1 | | Additive 2 | | Additive 3 | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |

Comparative Example 1

| | | | | | | | | | | | | | | | |
|---|---|---|---|---|---|---|---|---|---|---|---|---|---|---|---|
| 11 | 1 | 20 | coating | 50 | 5 | 20 | 70 | — | — | — | — | 2 | — | — | 140 |
| 12 | 1 | 20 | coating | 50 | 5 | 20 | 70 | — | — | — | — | 3 | — | — | 140 |
| 13 | 1 | 20 | coating | 50 | 1 | 21 | 70 | — | — | — | — | 1 | — | — | 140 |
| 14 | 1 | 20 | coating | 50 | 1 | 21 | 70 | — | — | — | — | 1.5 | — | — | 140 |
| 15 | 1 | 20 | coating | 50 | 1 | 21 | 70 | — | — | — | — | 2 | — | — | 140 |
| 16 | 1 | 20 | coating | 50 | 1 | 21 | 70 | — | — | — | — | 3 | — | — | 140 |
| 17 | 1 | 20 | coating | 50 | 1 | 22 | 70 | — | — | — | — | 1 | — | — | 140 |
| 18 | 1 | 20 | coating | 50 | 1 | 22 | 70 | — | — | — | — | 1.5 | — | — | 140 |
| 19 | 1 | 20 | coating | 50 | 1 | 22 | 70 | — | — | — | — | 2 | — | — | 140 |
| 20 | 1 | 20 | coating | 50 | 1 | 22 | 70 | — | — | — | — | 3 | — | — | 140 |

TABLE 17

| | Blackness (L value) | Weldability | Formability | Adhesion | Corrosion resistance | | Light fastness |
|---|---|---|---|---|---|---|---|
| | | | | | Flat portion | Formed portion | |

Example 1

| | | | | | | | |
|---|---|---|---|---|---|---|---|
| 1 | ○ (19) | ⊙ | ○ | ⊙ | ○ | △ | ⊙ |
| 2 | ⊙ (14) | ⊙ | ○ | ⊙ | ⊙ | ○ | ⊙ |
| 3 | ⊙ (13) | ⊙ | ○ | ⊙ | ⊙ | ○ | ⊙ |
| 4 | ⊙ (13) | ⊙ | ○ | ⊙ | ⊙ | ○ | ⊙ |
| 5 | ⊙ (13) | ○ | ○ | ⊙ | ⊙ | ○ | ⊙ |
| 6 | ○ (19) | ⊙ | ○ | ⊙ | ○ | △ | ⊙ |
| 7 | ⊙ (14) | ⊙ | ○ | ⊙ | ⊙ | ○ | ⊙ |
| 8 | ⊙ (13) | ⊙ | ○ | ⊙ | ⊙ | ○ | ⊙ |
| 9 | ⊙ (13) | ⊙ | ○ | ⊙ | ⊙ | ○ | ⊙ |
| 10 | ⊙ (13) | ○ | ○ | ⊙ | ⊙ | ○ | ⊙ |
| 11 | ○ (19) | ⊙ | ○ | ⊙ | ○ | △ | ⊙ |
| 12 | ⊙ (14) | ⊙ | ○ | ⊙ | ⊙ | ○ | ⊙ |

TABLE 18

| | Blackness (L value) | Weldability | Formability | Adhesion | Corrosion resistance | | Light fastness |
|---|---|---|---|---|---|---|---|
| | | | | | Flat portion | Formed portion | |

Example 1

| | | | | | | | |
|---|---|---|---|---|---|---|---|
| 13 | ⊙ (13) | ⊙ ○ | ⊙ | ⊙ | ○ | ⊙ | |
| 14 | ⊙ (13) | ⊙ | ○ | ⊙ | ⊙ | ○ | ⊙ |
| 15 | ⊙ (13) | ○ | ○ | ⊙ | ⊙ | ○ | ⊙ |
| 16 | ○ (19) | ⊙ | ○ | ⊙ | ○ | △ | ⊙ |
| 17 | ⊙ (14) | ⊙ | ○ | ⊙ | ⊙ | ○ | ⊙ |
| 18 | ⊙ (13) | ⊙ | ○ | ⊙ | ⊙ | ○ | ⊙ |
| 19 | ⊙ (13) | ⊙ | ○ | ⊙ | ⊙ | ○ | ⊙ |
| 20 | ⊙ (13) | ○ | ○ | ⊙ | ⊙ | ○ | ⊙ |
| 21 | ○ (19) | ⊙ | ○ | ⊙ | ○ | △ | ⊙ |
| 22 | ⊙ (14) | ⊙ | ○ | ⊙ | ⊙ | ○ | ⊙ |
| 23 | ⊙ (13) | ⊙ | ○ | ⊙ | ⊙ | ○ | ⊙ |

TABLE 18-continued

| | Blackness (L value) | Weldability | Formability | Adhesion | Corrosion resistance Flat portion | Corrosion resistance Formed portion | Light fastness |
|---|---|---|---|---|---|---|---|
| 24 | ◎ (13) | ◎ | ○ | ◎ | ◎ | ○ | ◎ |
| 25 | ◎ (13) | ○ | ○ | ◎ | ◎ | ○ | ◎ |

TABLE 19

| | Blackness (L value) | Weldability | Formability | Adhesion | Corrosion resistance Flat portion | Corrosion resistance Formed portion | Light fastness |
|---|---|---|---|---|---|---|---|
| Example 1 | | | | | | | |
| 26 | ○ (19) | ◎ | ○ | ◎ | ○ | △ | ○ |
| 27 | ◎ (14) | ◎ | ○ | ◎ | ◎ | ○ | ○ |
| 28 | ◎ (13) | ◎ | ○ | ◎ | ◎ | ○ | ○ |
| 29 | ◎ (13) | ◎ | ○ | ◎ | ◎ | ○ | ○ |
| 30 | ◎ (13) | ○ | ○ | ◎ | ◎ | ○ | ○ |
| 31 | ○ (19) | ◎ | ○ | ◎ | ○ | △ | ○ |
| 32 | ◎ (14) | ◎ | ○ | ◎ | ◎ | ○ | ○ |
| 33 | ◎ (13) | ◎ | ○ | ◎ | ◎ | ○ | ○ |
| 34 | ◎ (13) | ◎ | ○ | ◎ | ◎ | ○ | ○ |
| 35 | ◎ (13) | ○ | ○ | ◎ | ◎ | ○ | ○ |
| 36 | ○ (19) | ◎ | ○ | ◎ | ○ | △ | ○ |
| 37 | ◎ (14) | ◎ | ○ | ◎ | ◎ | ○ | ○ |

TABLE 20

| | Blackness (L value) | Weldability | Formability | Adhesion | Corrosion resistance Flat portion | Corrosion resistance Formed portion | Light fastness |
|---|---|---|---|---|---|---|---|
| Example 1 | | | | | | | |
| 38 | ◎ (13) | ◎ | ○ | ◎ | ◎ | ○ | ○ |
| 39 | ◎ (13) | ◎ | ○ | ◎ | ◎ | ○ | ○ |
| 40 | ◎ (13) | ○ | ○ | ◎ | ◎ | ○ | ○ |
| 41 | ○ (19) | ◎ | ○ | ◎ | ○ | △ | ○ |
| 42 | ◎ (14) | ◎ | ○ | ◎ | ◎ | ○ | ○ |
| 43 | ◎ (13) | ◎ | ○ | ◎ | ◎ | ○ | ○ |
| 44 | ◎ (13) | ◎ | ○ | ◎ | ◎ | ○ | ○ |
| 45 | ◎ (13) | ○ | ○ | ◎ | ◎ | ○ | ○ |
| 46 | ○ (19) | ◎ | ○ | ◎ | ○ | △ | ○ |
| 47 | ◎ (14) | ◎ | ○ | ◎ | ◎ | ○ | ○ |
| 48 | ◎ (13) | ◎ | ○ | ◎ | ◎ | ○ | ○ |
| 49 | ○ (13) | ◎ | ○ | ◎ | ◎ | ○ | ○ |
| 50 | ◎ (13) | ○ | ○ | ◎ | ◎ | ○ | ○ |

TABLE 21

| | Blackness (L value) | Weldability | Formability | Adhesion | Corrosion resistance Flat portion | Corrosion resistance Formed portion | Light fastness |
|---|---|---|---|---|---|---|---|
| Example 1 | | | | | | | |
| 51 | ○ (19) | ◎ | ○ | ◎ | ○ | △ | ○ |
| 52 | ◎ (14) | ◎ | ○ | ◎ | ◎ | ○ | ○ |
| 53 | ◎ (13) | ◎ | ○ | ◎ | ◎ | ○ | ○ |
| 54 | ◎ (13) | ◎ | ○ | ◎ | ◎ | ○ | ○ |
| 55 | ◎ (13) | ○ | ○ | ◎ | ◎ | ○ | ○ |

TABLE 21-continued

| | Blackness (L value) | Weldability | Formability | Adhesion | Corrosion resistance Flat portion | Corrosion resistance Formed portion | Light fastness |
|---|---|---|---|---|---|---|---|
| 56 | ○ (19) | ⊙ | ○ | ⊙ | ○ | Δ | ○ |
| 57 | ⊙ (14) | ⊙ | ○ | ⊙ | ⊙ | ○ | ○ |
| 58 | ⊙ (13) | ⊙ | ○ | ⊙ | ⊙ | ○ | ○ |
| 59 | ⊙ (13) | ⊙ | ○ | ⊙ | ⊙ | ○ | ○ |
| 60 | ⊙ (13) | ○ | ○ | ⊙ | ⊙ | ○ | ○ |
| 61 | ○ (19) | ⊙ | ○ | ⊙ | ○ | Δ | ○ |
| 62 | ⊙ (14) | ⊙ | ○ | ⊙ | ⊙ | ○ | ○ |

TABLE 22

| | Blackness (L value) | Weldability | Formability | Adhesion | Corrosion resistance Flat portion | Corrosion resistance Formed portion | Light fastness |
|---|---|---|---|---|---|---|---|
| Example 1 | | | | | | | |
| 63 | ⊙ (13) | ⊙ | ○ | ⊙ | ○ | ○ | |
| 64 | ⊙ (13) | ⊙ | ○ | ⊙ | ○ | ○ | |
| 65 | ⊙ (13) | ○ | ○ | ⊙ | ⊙ | ○ | ○ |
| 66 | ○ (19) | ⊙ | ○ | ⊙ | ○ | Δ | ○ |
| 67 | ⊙ (14) | ⊙ | ○ | ⊙ | ⊙ | ○ | ○ |
| 68 | ⊙ (13) | ⊙ | ○ | ⊙ | ⊙ | ○ | ○ |
| 69 | ⊙ (13) | ⊙ | ○ | ⊙ | ⊙ | ○ | ○ |
| 70 | ⊙ (13) | ○ | ○ | ⊙ | ⊙ | ○ | ○ |
| 71 | ○ (19) | ⊙ | ○ | ⊙ | ○ | Δ | ○ |
| 72 | ⊙ (14) | ⊙ | ○ | ⊙ | ⊙ | ○ | ○ |
| 73 | ⊙ (13) | ⊙ | ○ | ⊙ | ⊙ | ○ | ○ |
| 74 | ⊙ (13) | ⊙ | ○ | ⊙ | ⊙ | ○ | ○ |
| 75 | ⊙ (13) | ○ | ○ | ⊙ | ⊙ | ○ | ○ |

TABLE 23

| | Blackness (L value) | Weldability | Formability | Adhesion | Corrosion resistance Flat portion | Corrosion resistance Formed portion | Light fastness |
|---|---|---|---|---|---|---|---|
| Example 1 | | | | | | | |
| 76 | ○ (19) | ⊙ | ○ | ⊙ | ○ | Δ | ○ |
| 77 | ⊙ (14) | ⊙ | ○ | ⊙ | ⊙ | ○ | ○ |
| 78 | ⊙ (13) | ⊙ | ○ | ⊙ | ⊙ | ○ | ○ |
| 79 | ⊙ (13) | ⊙ | ○ | ⊙ | ⊙ | ○ | ○ |
| 80 | ⊙ (13) | ○ | ○ | ⊙ | ⊙ | ○ | ○ |
| 81 | ○ (19) | ⊙ | ○ | ⊙ | ○ | Δ | ○ |
| 82 | ⊙ (14) | ⊙ | ○ | ⊙ | ⊙ | ○ | ○ |
| 83 | ⊙ (13) | ⊙ | ○ | ⊙ | ⊙ | ○ | ○ |
| 84 | ⊙ (13) | ⊙ | ○ | ⊙ | ⊙ | ○ | ○ |
| 85 | ⊙ (13) | ○ | ○ | ⊙ | ⊙ | ○ | ○ |

TABLE 24

| | Blackness (L value) | Weldability | Formability | Adhesion | Corrosion resistance Flat portion | Corrosion resistance Formed portion | Light fastness |
|---|---|---|---|---|---|---|---|
| Comparative Example 1 | | | | | | | |
| 1 | X (26) | ⊙ | — | — | — | — | Δ ~ X |
| 2 | X (24) | ⊙ | — | — | — | — | Δ ~ X |
| 3 | X (24) | ⊙ | — | — | — | — | Δ ~ X |
| 4 | X (24) | ○ | — | — | — | — | Δ ~ X |
| 5 | X (24) | ⊙ | — | — | — | — | Δ ~ X |
| 6 | X (22) | ⊙ | — | — | — | — | Δ ~ X |

TABLE 24-continued

| | Blackness (L value) | Weldability | Formability | Adhesion | Corrosion resistance Flat portion | Corrosion resistance Formed portion | Light fastness |
|---|---|---|---|---|---|---|---|
| 7 | X (21) | ⊚ | — | — | — | — | Δ ~ X |
| 8 | X (21) | ○ | — | — | — | — | Δ ~ X |
| 9 | X (27) | ⊚ | — | — | — | — | Δ ~ X |
| 10 | X (22) | ⊚ | — | — | — | — | Δ ~ X |

TABLE 25

| | Blackness (L value) | Weldability | Formability | Adhesion | Corrosion resistance Flat portion | Corrosion resistance Formed portion | Light fastness |
|---|---|---|---|---|---|---|---|
| Comparative Example 1 | | | | | | | |
| 11 | X (21) | ⊚ | — | — | — | — | Δ ~ X |
| 12 | X (21) | ○ | — | — | — | — | Δ ~ X |
| 13 | X (24) | ⊚ | — | — | — | — | ⊚ |
| 14 | X (23) | ⊚ | — | — | — | — | ⊚ |
| 15 | X (23) | ⊚ | — | — | — | — | ⊚ |
| 16 | X (23) | ○ | — | — | — | — | ⊚ |
| 17 | X (36) | ⊚ | — | — | — | — | ○ ~ Δ |
| 18 | X (31) | ⊚ | — | — | — | — | ○ ~ Δ |
| 19 | X (30) | ⊚ | — | — | — | — | ○ ~ Δ |
| 20 | X (29) | ○ | — | — | — | — | ○ ~ Δ |

TABLE 26

| | Starting sheet *1 Kind of plating *1 | Starting sheet *1 Coating weight (g/m²) | Chromate film Method of forming | Chromate film Coating weight of chromium (mg/m²) | Black film Base resin *2 | Black film Additive 1 Kind *3 | Black film Additive 1 Proportion (parts) *4 | Black film Additive 2 Kind *5 | Black film Additive 2 Proportion (parts) *6 | Black film Additive 3 Kind *7 | Black film Additive 3 Proportion (parts) *8 | Thickness (μ) | Value of formula ① *9 | Value of formula ①' *10 | Baking temp. (°C.) |
|---|---|---|---|---|---|---|---|---|---|---|---|---|---|---|---|
| Example 2 | | | | | | | | | | | | | | | |
| 1 | 1 | 20 | coating | 50 | 1 | 1 | 4 | — | — | — | — | 2.6 | 7.2 | — | 140 |
| 2 | 1 | 20 | coating | 50 | 1 | 1 | 8 | — | — | — | — | 1.2 | 7.0 | 1.65 | 140 |
| 3 | 1 | 20 | coating | 50 | 1 | 1 | 8 | — | — | — | — | 2.7 | 17.5 | 6.15 | 140 |
| 4 | 1 | 20 | coating | 50 | 1 | 1 | 10 | — | — | — | — | 1.0 | 7.2 | 1.75 | 140 |
| 5 | 1 | 20 | coating | 50 | 1 | 1 | 10 | — | — | — | — | 1.9 | 15.3 | 6.25 | 140 |
| 6 | 1 | 20 | coating | 50 | 1 | 1 | 10 | — | — | — | — | 2.5 | 20.7 | 9.25 | 140 |
| 7 | 1 | 20 | coating | 50 | 1 | 1 | 10 | — | — | — | — | 3.0 | 25.2 | 11.75 | 140 |
| 8 | 1 | 20 | coating | 50 | 1 | 1 | 20 | — | — | — | — | 0.6 | 7.6 | — | 140 |
| 9 | 1 | 20 | coating | 50 | 1 | 1 | 20 | — | — | — | — | 1.1 | 17.1 | 6.75 | 140 |
| 10 | 1 | 20 | coating | 50 | 1 | 1 | 20 | — | — | — | — | 1.5 | 24.7 | 12.75 | 140 |
| 11 | 1 | 20 | coating | 50 | 1 | 1 | 20 | — | — | — | — | 2.5 | 43.7 | 27.75 | 140 |

TABLE 27

| | Starting sheet *1 | | Chromate film | | Black film | | | | | | | | | |
|---|---|---|---|---|---|---|---|---|---|---|---|---|---|---|
| | | | | Coating weight of chromium (mg/m²) | | Additive 1 | | Additive 2 | | Additive 3 | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 2 | | | | | | | | | | | | | | |
| 12 | 1 | 20 | coating | 50 | 1 | 1 | 20 | — | — | — | — | 3.0 | 53.2 | 35.25 | 140 |
| 13 | 1 | 20 | coating | 50 | 1 | 1 | 40 | — | — | — | — | 0.4 | 7.8 | — | 140 |
| 14 | 1 | 20 | coating | 50 | 1 | 1 | 40 | — | — | — | — | 0.9 | 27.3 | 8.75 | 140 |
| 15 | 1 | 20 | coating | 50 | 1 | 1 | 40 | — | — | — | — | 1.5 | 50.7 | 29.75 | 140 |
| 16 | 1 | 20 | coating | 50 | 1 | 1 | 40 | — | — | — | — | 2.5 | 89.7 | 64.75 | 140 |
| 17 | 1 | 20 | coating | 50 | 1 | 1 | 40 | — | — | — | — | 3.0 | 109.2 | 82.25 | 140 |
| 18 | 1 | 20 | coating | 50 | 1 | 1 | 40 | — | — | — | — | 0.3 | 7.9 | — | 140 |
| 19 | 1 | 20 | coating | 50 | 1 | 1 | 80 | — | — | — | — | 0.8 | 47.4 | 11.25 | 140 |
| 20 | 1 | 20 | coating | 50 | 1 | 1 | 80 | — | — | — | — | 1.5 | 102.7 | 63.75 | 140 |
| 21 | 1 | 20 | coating | 50 | 1 | 1 | 80 | — | — | — | — | 2.5 | 181.7 | 138.75 | 140 |
| 22 | 1 | 20 | coating | 50 | 1 | 1 | 80 | — | — | — | — | 3.0 | 221.2 | 176.25 | 140 |

TABLE 28

| | Starting sheet *1 | | Chromate film | | Black film | | | | | | | | | |
|---|---|---|---|---|---|---|---|---|---|---|---|---|---|---|
| | | | | Coating weight of chromium (mg/m²) | | Additive 1 | | Additive 2 | | Additive 3 | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 2 | | | | | | | | | | | | | | |
| 23 | 1 | 20 | coating | 50 | 1 | 1 | 120 | — | — | — | — | 0.3 | 11.9 | — | 140 |
| 24 | 1 | 20 | coating | 50 | 1 | 1 | 120 | — | — | — | — | 0.8 | 71.4 | 17.25 | 140 |
| 25 | 1 | 20 | coating | 50 | 1 | 1 | 120 | — | — | — | — | 1.5 | 154.7 | 97.75 | 140 |
| 26 | 1 | 20 | coating | 50 | 1 | 1 | 120 | — | — | — | — | 2.5 | 273.7 | 212.75 | 140 |
| 27 | 1 | 20 | coating | 50 | 1 | I | 120 | — | — | — | — | 3.0 | 333.2 | 270.25 | 140 |
| 28 | 1 | 20 | coating | 50 | 1 | 1 | 200 | — | — | — | — | 0.3 | 19.9 | — | 140 |
| 29 | 1 | 20 | coating | 50 | 1 | 1 | 200 | — | — | — | — | 0.7 | 99.5 | 9.75 | 140 |
| 30 | 1 | 20 | coating | 50 | 1 | 1 | 200 | — | — | — | — | 1.5 | 258.7 | 165.75 | 140 |
| 31 | 1 | 20 | coating | 50 | 1 | 1 | 200 | — | — | — | — | 2.5 | 457.7 | 360.75 | 140 |
| 32 | 1 | 20 | coating | 50 | 1 | 1 | 200 | — | — | — | — | 3.0 | 557.2 | 458.25 | 140 |

TABLE 29

| Starting sheet *1 | | Chromate film | | Black film | | | | | | | | | |
|---|---|---|---|---|---|---|---|---|---|---|---|---|---|
| | | | Coating weight | | Additive 1 | | Additive 2 | | Additive 3 | | | | |
| Kind of plating *1 | Coating weight (g/m²) | Method of forming | of chromium (mg/m²) | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |

Example 2

| | | | | | | | | | | | | | | |
|---|---|---|---|---|---|---|---|---|---|---|---|---|---|---|
| 33 | 1 | 20 | coating | 50 | 1 | 6 | 4 | — | — | — | — | 2.6 | 7.2 | — | 140 |
| 34 | 1 | 20 | coating | 50 | 1 | 6 | 8 | — | — | — | — | 1.2 | 7.0 | 1.65 | 140 |
| 35 | 1 | 20 | coating | 50 | 1 | 6 | 8 | — | — | — | — | 2.7 | 17.5 | 6.15 | 140 |
| 36 | 1 | 20 | coating | 50 | 1 | 6 | 10 | — | — | — | — | 1.0 | 7.2 | 1.75 | 140 |
| 37 | 1 | 20 | coating | 50 | 1 | 6 | 10 | — | — | — | — | 1.9 | 15.3 | 6.25 | 140 |
| 38 | 1 | 20 | coating | 50 | 1 | 6 | 10 | — | — | — | — | 2.5 | 20.7 | 9.25 | 140 |
| 39 | 1 | 20 | coating | 50 | 1 | 6 | 10 | — | — | — | — | 3.0 | 25.2 | 11.75 | 140 |
| 40 | 1 | 20 | coating | 50 | 1 | 6 | 20 | — | — | — | — | 0.6 | 7.6 | — | 140 |
| 41 | 1 | 20 | coating | 50 | 1 | 6 | 20 | — | — | — | — | 1.1 | 17.1 | 6.75 | 140 |
| 42 | 1 | 20 | coating | 50 | 1 | 6 | 20 | — | — | — | — | 1.5 | 24.7 | 12.75 | 140 |
| 43 | 1 | 20 | coating | 50 | 1 | 6 | 20 | — | — | — | — | 2.5 | 43.7 | 27.75 | 140 |

TABLE 30

| Starting sheet *1 | | Chromate film | | Black film | | | | | | | | | |
|---|---|---|---|---|---|---|---|---|---|---|---|---|---|
| | | | Coating weight | | Additive 1 | | Additive 2 | | Additive 3 | | | | |
| Kind of plating *1 | Coating weight (g/m²) | Method of forming | of chromium (mg/m²) | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |

Example 2

| | | | | | | | | | | | | | | |
|---|---|---|---|---|---|---|---|---|---|---|---|---|---|---|
| 44 | 1 | 20 | coating | 50 | 1 | 6 | 20 | — | — | — | — | 3.0 | 53.2 | 35.25 | 140 |
| 45 | 1 | 20 | coating | 50 | 1 | 6 | 40 | — | — | — | — | 0.4 | 7.8 | — | 140 |
| 46 | 1 | 20 | coating | 50 | 1 | 6 | 40 | — | — | — | — | 0.9 | 27.3 | 8.75 | 140 |
| 47 | 1 | 20 | coating | 50 | 1 | 6 | 40 | — | — | — | — | 1.5 | 50.7 | 29.75 | 140 |
| 48 | 1 | 20 | coating | 50 | 1 | 6 | 40 | — | — | — | — | 2.5 | 89.7 | 64.75 | 140 |
| 49 | 1 | 20 | coating | 50 | 1 | 6 | 40 | — | — | — | — | 3.0 | 109.2 | 82.25 | 140 |
| 50 | 1 | 20 | coating | 50 | 1 | 6 | 50 | — | — | — | — | 0.3 | 7.9 | — | 140 |
| 51 | 1 | 20 | coating | 50 | 1 | 6 | 80 | — | — | — | — | 0.8 | 47.4 | 11.25 | 140 |
| 52 | 1 | 20 | coating | 50 | 1 | 6 | 80 | — | — | — | — | 1.5 | 10.27 | 63.75 | 140 |
| 53 | 1 | 20 | coating | 50 | 1 | 6 | 80 | — | — | — | — | 2.5 | 181.7 | 138.75 | 140 |
| 54 | 1 | 20 | coating | 50 | 1 | 6 | 80 | — | — | — | — | 3.0 | 221.2 | 176.25 | 140 |

TABLE 31

| Starging sheet *1 | | | Chromate film | Black film | | | | | | | | | | | |
|---|---|---|---|---|---|---|---|---|---|---|---|---|---|---|---|
| | | | Coating weight of chromium (mg/m²) | | | Additive 1 | | Additive 2 | | Additive 3 | | | | | |
| Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 2 | | | | | | | | | | | | | | | |
| 55 | 1 | 20 | coating | 50 | 1 | 6 | 120 | — | — | — | — | — | — | 0.3 | 11.9 | — | 140 |
| 56 | 1 | 20 | coating | 50 | 1 | 6 | 120 | — | — | — | — | — | — | 0.8 | 71.4 | 17.25 | 140 |
| 57 | 1 | 20 | coating | 50 | 1 | 6 | 120 | — | — | — | — | — | — | 1.5 | 154.7 | 97.75 | 140 |
| 58 | 1 | 20 | coating | 50 | 1 | 6 | 120 | — | — | — | — | — | — | 2.5 | 273.7 | 212.75 | 140 |
| 59 | 1 | 20 | coating | 50 | 1 | 6 | 120 | — | — | — | — | — | — | 3.0 | 333.2 | 270.25 | 140 |
| 60 | 1 | 20 | coating | 50 | 1 | 6 | 200 | — | — | — | — | — | — | 0.3 | 19.9 | — | 140 |
| 61 | 1 | 20 | coating | 50 | 1 | 6 | 200 | — | — | — | — | — | — | 0.7 | 99.5 | 9.75 | 140 |
| 62 | 1 | 20 | coating | 50 | 1 | 6 | 200 | — | — | — | — | — | — | 1.5 | 258.7 | 165.75 | 140 |
| 63 | 1 | 20 | coating | 50 | 1 | 6 | 200 | — | — | — | — | — | — | 2.5 | 457.7 | 360.75 | 140 |
| 64 | 1 | 20 | coating | 50 | 1 | 6 | 200 | — | — | — | — | — | — | 3.0 | 557.2 | 458.25 | 140 |

TABLE 32

| Starging sheet *1 | | | Chromate film | Black film | | | | | | | | | | | |
|---|---|---|---|---|---|---|---|---|---|---|---|---|---|---|---|
| | | | Coating weight of chromium (mg/m²) | | | Additive 1 | | Additive 2 | | Additive 3 | | | | | |
| Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 2 | | | | | | | | | | | | | | | |
| 65 | 1 | 20 | coating | 50 | 1 | 11 | 4 | — | — | — | — | — | — | 2.6 | 7.2 | — | 140 |
| 66 | 1 | 20 | coating | 50 | 1 | 11 | 8 | — | — | — | — | — | — | 1.2 | 7.0 | 1.65 | 140 |
| 67 | 1 | 20 | coating | 50 | 1 | 11 | 8 | — | — | — | — | — | — | 2.7 | 17.5 | 6.15 | 140 |
| 68 | 1 | 20 | coating | 50 | 1 | 11 | 10 | — | — | — | — | — | — | 1.0 | 7.2 | 1.75 | 140 |
| 69 | 1 | 20 | coating | 50 | 1 | 11 | 10 | — | — | — | — | — | — | 1.9 | 15.3 | 6.25 | 140 |
| 70 | 1 | 20 | coating | 50 | 1 | 11 | 10 | — | — | — | — | — | — | 2.5 | 20.7 | 9.25 | 140 |
| 71 | 1 | 20 | coating | 50 | 1 | 11 | 10 | — | — | — | — | — | — | 3.0 | 25.2 | 11.75 | 140 |
| 72 | 1 | 20 | coating | 50 | 1 | 11 | 20 | — | — | — | — | — | — | 0.6 | 7.6 | — | 140 |
| 73 | 1 | 20 | coating | 50 | 1 | 11 | 20 | — | — | — | — | — | — | 1.1 | 17.1 | 6.75 | 140 |
| 74 | 1 | 20 | coating | 50 | 1 | 11 | 20 | — | — | — | — | — | — | 1.5 | 24.7 | 12.75 | 140 |
| 75 | 1 | 20 | coating | 50 | 1 | 11 | 20 | — | — | — | — | — | — | 2.5 | 43.7 | 27.75 | 140 |

TABLE 33

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | Value of formula ①*9 | Value of formula ①'*10 | Baking temp. (°C.) |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (µ) | | | |
| Example 2 | | | | | | | | | | | | | | | |
| 76 | 1 | 20 | coating | 50 | 1 | 11 | 20 | — | — | — | — | 3.0 | 53.2 | 35.25 | 140 |
| 77 | 1 | 20 | coating | 50 | 1 | 11 | 40 | — | — | — | — | 0.4 | 7.8 | — | 140 |
| 78 | 1 | 20 | coating | 50 | 1 | 11 | 40 | — | — | — | — | 0.9 | 27.3 | 8.75 | 140 |
| 79 | 1 | 20 | coating | 50 | 1 | 11 | 40 | — | — | — | — | 1.5 | 50.7 | 29.75 | 140 |
| 80 | 1 | 20 | coating | 50 | 1 | 11 | 40 | — | — | — | — | 2.5 | 89.7 | 64.75 | 140 |
| 81 | 1 | 20 | coating | 50 | 1 | 11 | 40 | — | — | — | — | 3.0 | 109.2 | 82.25 | 140 |
| 82 | 1 | 20 | coating | 50 | 1 | 11 | 80 | — | — | — | — | 0.3 | 7.9 | — | 140 |
| 83 | 1 | 20 | coating | 50 | 1 | 11 | 80 | — | — | — | — | 0.8 | 47.4 | 11.25 | 140 |
| 84 | 1 | 20 | coating | 50 | 1 | 11 | 80 | — | — | — | — | 1.5 | 102.7 | 63.75 | 140 |
| 85 | 1 | 20 | coating | 50 | 1 | 11 | 80 | — | — | — | — | 2.5 | 181.7 | 138.75 | 140 |
| 86 | 1 | 20 | coating | 50 | 1 | 11 | 80 | — | — | — | — | 3.0 | 221.2 | 176.25 | 140 |

TABLE 34

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | Value of formula ①*9 | Value of formula ①'*10 | Baking temp. (°C.) |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (µ) | | | |
| Example 2 | | | | | | | | | | | | | | | |
| 87 | 1 | 20 | coating | 50 | 1 | 11 | 120 | — | — | — | — | 0.3 | 11.9 | — | 140 |
| 88 | 1 | 20 | coating | 50 | 1 | 11 | 120 | — | — | — | — | 0.8 | 71.4 | 17.25 | 140 |
| 89 | 1 | 20 | coating | 50 | 1 | 11 | 120 | — | — | — | — | 1.5 | 154.7 | 97.75 | 140 |
| 90 | 1 | 20 | coating | 50 | 1 | 11 | 120 | — | — | — | — | 2.5 | 273.7 | 212.75 | 140 |
| 91 | 1 | 20 | coating | 50 | 1 | 11 | 120 | — | — | — | — | 3.0 | 333.2 | 270.25 | 140 |
| 92 | 1 | 20 | coating | 50 | 1 | 11 | 200 | — | — | — | — | 0.3 | 19.9 | — | 140 |
| 93 | 1 | 20 | coating | 50 | 1 | 11 | 200 | — | — | — | — | 0.7 | 99.5 | 9.75 | 140 |
| 94 | 1 | 20 | coating | 50 | 1 | 11 | 200 | — | — | — | — | 1.5 | 258.7 | 165.75 | 140 |
| 95 | 1 | 20 | coating | 50 | 1 | 11 | 200 | — | — | — | — | 2.5 | 457.7 | 360.75 | 140 |
| 96 | 1 | 20 | coating | 50 | 1 | 11 | 200 | — | — | — | — | 3.0 | 557.2 | 458.25 | 140 |

TABLE 35

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | Value of formula ①*9 | Value of formula ①'*10 | Baking temp. (°C.) |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (µ) | | | |
| Example 2 | | | | | | | | | | | | | | | |
| 97 | 1 | 20 | coating | 50 | 1 | 16 | 4 | — | — | — | — | 2.6 | 7.2 | — | 140 |
| 98 | 1 | 20 | coating | 50 | 1 | 16 | 8 | — | — | — | — | 1.2 | 7.0 | 1.65 | 140 |

TABLE 35-continued

| | Starging sheet *1 | | Chromate film | | Black film | | | | | | | | | | |
|---|---|---|---|---|---|---|---|---|---|---|---|---|---|---|---|
| | | | | Coating weight | | Additive 1 | | Additive 2 | | Additive 3 | | | | | |
| | Kind of plating *1 | Coating weight (g/m²) | Method of forming | of chromium (mg/m²) | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| 99  | 1 | 20 | coating | 50 | 1 | 16 | 8  | — | — | — | — | 2.7 | 17.5 | 6.15  | 140 |
| 100 | 1 | 20 | coating | 50 | 1 | 16 | 16 | — | — | — | — | 1.0 | 7.2  | 1.75  | 140 |
| 101 | 1 | 20 | coating | 50 | 1 | 16 | 16 | — | — | — | — | 1.9 | 15.3 | 6.25  | 140 |
| 102 | 1 | 20 | coating | 50 | 1 | 16 | 16 | — | — | — | — | 2.5 | 20.7 | 9.25  | 140 |
| 103 | 1 | 20 | coating | 50 | 1 | 16 | 16 | — | — | — | — | 3.0 | 25.2 | 11.75 | 140 |
| 104 | 1 | 20 | coating | 50 | 1 | 16 | 20 | — | — | — | — | 0.6 | 7.6  | —     | 140 |
| 105 | 1 | 20 | coating | 50 | 1 | 16 | 20 | — | — | — | — | 1.1 | 17.1 | 6.75  | 140 |
| 106 | 1 | 20 | coating | 50 | 1 | 16 | 20 | — | — | — | — | 1.5 | 24.7 | 12.75 | 140 |
| 107 | 1 | 20 | coating | 50 | 1 | 16 | 20 | — | — | — | — | 2.5 | 43.7 | 27.75 | 140 |

TABLE 36

| | Starging sheet *1 | | Chromate film | | Black film | | | | | | | | | | |
|---|---|---|---|---|---|---|---|---|---|---|---|---|---|---|---|
| | | | | Coating weight | | Additive 1 | | Additive 2 | | Additive 3 | | | | | |
| | Kind of plating *1 | Coating weight (g/m²) | Method of forming | of chromium (mg/m²) | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 2 | | | | | | | | | | | | | | | |
| 108 | 1 | 20 | coating | 50 | 1 | 16 | 20 | — | — | — | — | 3.0 | 53.2  | 35.25  | 140 |
| 109 | 1 | 20 | coating | 50 | 1 | 16 | 40 | — | — | — | — | 0.4 | 7.8   | —      | 140 |
| 110 | 1 | 20 | coating | 50 | 1 | 16 | 40 | — | — | — | — | 0.9 | 27.3  | 8.75   | 140 |
| 111 | 1 | 20 | coating | 50 | 1 | 16 | 40 | — | — | — | — | 1.5 | 50.7  | 29.75  | 140 |
| 112 | 1 | 20 | coating | 50 | 1 | 16 | 40 | — | — | — | — | 2.5 | 89.7  | 64.75  | 140 |
| 113 | 1 | 20 | coating | 50 | 1 | 16 | 40 | — | — | — | — | 3.0 | 109.2 | 82.25  | 140 |
| 114 | 1 | 20 | coating | 50 | 1 | 16 | 80 | — | — | — | — | 0.3 | 7.9   | —      | 140 |
| 115 | 1 | 20 | coating | 50 | 1 | 16 | 80 | — | — | — | — | 0.8 | 47.4  | 11.25  | 140 |
| 116 | 1 | 20 | coating | 50 | 1 | 16 | 80 | — | — | — | — | 1.5 | 102.7 | 63.75  | 140 |
| 117 | 1 | 20 | coating | 50 | 1 | 16 | 80 | — | — | — | — | 2.5 | 181.7 | 138.75 | 140 |
| 118 | 1 | 20 | coating | 50 | 1 | 16 | 80 | — | — | — | — | 3.0 | 221.2 | 176.25 | 140 |

TABLE 37

| | Starging sheet *1 | | Chromate film | | Black film | | | | | | | | | | |
|---|---|---|---|---|---|---|---|---|---|---|---|---|---|---|---|
| | | | | Coating weight | | Additive 1 | | Additive 2 | | Additive 3 | | | | | |
| | Kind of plating *1 | Coating weight (g/m²) | Method of forming | of chromium (mg/m²) | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 2 | | | | | | | | | | | | | | | |
| 119 | 1 | 20 | coating | 50 | 1 | 16 | 120 | — | — | — | — | 0.3 | 11.9  | —      | 140 |
| 120 | 1 | 20 | coating | 50 | 1 | 16 | 120 | — | — | — | — | 0.8 | 71.4  | 17.25  | 140 |
| 121 | 1 | 20 | coating | 50 | 1 | 16 | 120 | — | — | — | — | 1.5 | 154.7 | 97.75  | 140 |
| 122 | 1 | 20 | coating | 50 | 1 | 16 | 120 | — | — | — | — | 2.5 | 273.7 | 212.75 | 140 |
| 123 | 1 | 20 | coating | 50 | 1 | 16 | 120 | — | — | — | — | 3.0 | 333.2 | 270.25 | 140 |
| 124 | 1 | 20 | coating | 50 | 1 | 16 | 200 | — | — | — | — | 0.3 | 19.9  | —      | 140 |
| 125 | 1 | 20 | coating | 50 | 1 | 16 | 200 | — | — | — | — | 0.7 | 99.5  | 9.75   | 140 |

TABLE 37-continued

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| 126 | 1 | 20 | coating | 50 | 1 | 16 | 200 | — | — | — | — | 1.5 | 258.7 | 165.75 | 140 |
| 127 | 1 | 20 | coating | 50 | 1 | 16 | 200 | — | — | — | — | 2.5 | 457.7 | 360.75 | 140 |
| 128 | 1 | 20 | coating | 50 | 1 | 16 | 200 | — | — | — | — | 3.0 | 557.2 | 458.25 | 140 |

TABLE 38

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Comparative Example 2 | | | | | | | | | | | | | | | |
| 1 | 1 | 20 | coating | 50 | 1 | 1 | 3 | — | — | — | — | 3.0 | 5.6 | — | 140 |
| 2 | 1 | 20 | coating | 50 | 1 | 1 | 4 | — | — | — | — | 2.4 | 6.6 | — | 140 |
| 3 | 1 | 20 | coating | 50 | 1 | 1 | 8 | — | — | — | — | 1.1 | 6.3 | 1.35 | 140 |
| 4 | 1 | 20 | coating | 50 | 1 | 1 | 8 | — | — | — | — | 3.5 | 23.1 | 8.55 | 140 |
| 5 | 1 | 20 | coating | 50 | 1 | 1 | 10 | — | — | — | — | 0.9 | 6.3 | 1.25 | 140 |
| 6 | 1 | 20 | coating | 50 | 1 | 1 | 10 | — | — | — | — | 3.5 | 29.7 | 14.25 | 140 |
| 7 | 1 | 20 | coating | 50 | 1 | 1 | 20 | — | — | — | — | 0.5 | 5.7 | — | 140 |
| 8 | 1 | 20 | coating | 50 | 1 | 1 | 20 | — | — | — | — | 3.5 | 62.7 | 42.75 | 140 |

TABLE 39

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Comparative Example 2 | | | | | | | | | | | | | | | |
| 9 | 1 | 20 | coating | 50 | 1 | 1 | 40 | — | — | — | — | 0.3 | 3.9 | — | 140 |
| 10 | 1 | 20 | coating | 50 | 1 | 1 | 40 | — | — | — | — | 3.5 | 128.7 | 99.75 | 140 |
| 11 | 1 | 20 | coating | 50 | 1 | 1 | 80 | — | — | — | — | 0.2 | — | — | 140 |
| 12 | 1 | 20 | coating | 50 | 1 | 1 | 50 | — | — | — | — | 3.5 | 260.7 | 213.75 | 140 |
| 13 | 1 | 20 | coating | 50 | 1 | 1 | 120 | — | — | — | — | 0.2 | — | — | 140 |
| 14 | 1 | 20 | coating | 50 | 1 | 1 | 120 | — | — | — | — | 3.5 | 379.5 | 327.75 | 140 |
| 15 | 1 | 20 | coating | 50 | 1 | 1 | 200 | — | — | — | — | 0.2 | — | — | 140 |
| 16 | 1 | 20 | coating | 50 | 1 | 1 | 200 | — | — | — | — | 3.5 | 643.5 | 555.75 | 140 |

TABLE 40

| | Starting sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Comparative Example 2 | | | | | | | | | | | | | | | |
| 17 | 1 | 20 | coating | 50 | 1 | 6 | 3 | — | — | — | — | 3.0 | 5.6 | — | 140 |
| 18 | 1 | 20 | coating | 50 | 1 | 6 | 4 | — | — | — | — | 2.4 | 6.6 | — | 140 |
| 19 | 1 | 20 | coating | 50 | 1 | 6 | 8 | — | — | — | — | 1.1 | 6.3 | 1.35 | 140 |
| 20 | 1 | 20 | coating | 50 | 1 | 6 | 8 | — | — | — | — | 3.5 | 23.1 | 8.55 | 140 |
| 21 | 1 | 20 | coating | 50 | 1 | 6 | 10 | — | — | — | — | 0.9 | 6.3 | 1.25 | 140 |
| 22 | 1 | 20 | coating | 50 | 1 | 6 | 10 | — | — | — | — | 3.5 | 29.7 | 14.25 | 140 |
| 23 | 1 | 20 | coating | 50 | 1 | 6 | 20 | — | — | — | — | 0.5 | 5.7 | — | 140 |
| 24 | 1 | 20 | coating | 50 | 1 | 6 | 20 | — | — | — | — | 3.5 | 62.7 | 42.75 | 140 |

TABLE 41

| | Starting sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Comparative Example 2 | | | | | | | | | | | | | | | |
| 25 | 1 | 20 | coating | 50 | 1 | 6 | 40 | — | — | — | — | 0.3 | 3.9 | — | 140 |
| 26 | 1 | 20 | coating | 50 | 1 | 6 | 40 | — | — | — | — | 3.5 | 128.7 | 99.75 | 140 |
| 27 | 1 | 20 | coating | 50 | 1 | 6 | 80 | — | — | — | — | 0.2 | — | — | 140 |
| 28 | 1 | 20 | coating | 50 | 1 | 6 | 80 | — | — | — | — | 3.5 | 260.7 | 213.75 | 140 |
| 29 | 1 | 20 | coating | 50 | 1 | 6 | 120 | — | — | — | — | 0.2 | — | — | 140 |
| 30 | 1 | 20 | coating | 50 | 1 | 6 | 120 | — | — | — | — | 3.5 | 379.5 | 327.75 | 140 |
| 31 | 1 | 20 | coating | 50 | 1 | 6 | 200 | — | — | — | — | 0.2 | — | — | 140 |
| 32 | 1 | 20 | coating | 50 | 1 | 6 | 200 | — | — | — | — | 3.5 | 643.5 | 555.75 | 140 |

TABLE 42

| | Starting sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Comparative Example 2 | | | | | | | | | | | | | | | |
| 33 | 1 | 20 | coating | 50 | 1 | 11 | 3 | — | — | — | — | 3.0 | 5.6 | — | 140 |
| 34 | 1 | 20 | coating | 50 | 1 | 11 | 4 | — | — | — | — | 2.4 | 6.6 | — | 140 |
| 35 | 1 | 20 | coating | 50 | 1 | 11 | 8 | — | — | — | — | 1.1 | 6.3 | 1.35 | 140 |
| 36 | 1 | 20 | coating | 50 | 1 | 11 | 8 | — | — | — | — | 3.5 | 23.1 | 8.55 | 140 |

TABLE 42-continued

| | Starging sheet *1 | | Chromate film | | Black film | | | | | | | | | |
|---|---|---|---|---|---|---|---|---|---|---|---|---|---|---|
| | | | | Coating weight of chromium (mg/m²) | Base resin *2 | Additive 1 | | Additive 2 | | Additive 3 | | Thick-ness (μ) | Value of formula ① *9 | Value of formula ①' *10 | Baking temp. (°C.) |
| | Kind of plat-ing *1 | Coat-ing weight (g/m²) | Method of forming | | | Kind *3 | Pro-por-tion (parts) *4 | Kind *5 | Pro-por-tion (parts) *6 | Kind *7 | Pro-por-tion (parts) *8 | | | | |
| 37 | 1 | 20 | coating | 50 | 1 | 11 | 10 | — | — | — | — | 0.9 | 6.3 | 1.25 | 140 |
| 38 | 1 | 20 | coating | 50 | 1 | 11 | 10 | — | — | — | — | 3.5 | 29.7 | 14.25 | 140 |
| 39 | 1 | 20 | coating | 50 | 1 | 11 | 20 | — | — | — | — | 0.5 | 5.7 | — | 140 |
| 40 | 1 | 20 | coating | 50 | 1 | 11 | 20 | — | — | — | — | 3.5 | 62.7 | 42.75 | 140 |

TABLE 43

| | Starging sheet *1 | | Chromate film | | Black film | | | | | | | | | |
|---|---|---|---|---|---|---|---|---|---|---|---|---|---|---|
| | | | | Coating weight of chromium (mg/m²) | Base resin *2 | Additive 1 | | Additive 2 | | Additive 3 | | Thick-ness (μ) | Value of formula ① *9 | Value of formula ①' *10 | Baking temp. (°C.) |
| | Kind of plat-ing *1 | Coat-ing weight (g/m²) | Method of forming | | | Kind *3 | Pro-por-tion (parts) *4 | Kind *5 | Pro-por-tion (parts) *6 | Kind *7 | Pro-por-tion (parts) *8 | | | | |
| Comparative Example 2 | | | | | | | | | | | | | | | |
| 41 | 1 | 20 | coating | 50 | 1 | 11 | 40 | — | — | — | — | 0.3 | 3.9 | — | 140 |
| 42 | 1 | 20 | coating | 50 | 1 | 11 | 40 | — | — | — | — | 3.5 | 128.7 | 99.75 | 140 |
| 43 | 1 | 20 | coating | 50 | 1 | 11 | 80 | — | — | — | — | 0.2 | — | — | 140 |
| 44 | 1 | 20 | coating | 50 | 1 | 11 | 80 | — | — | — | — | 3.5 | 260.7 | 213.75 | 140 |
| 45 | 1 | 20 | coating | 50 | 1 | 11 | 120 | — | — | — | — | 0.2 | — | — | 140 |
| 46 | 1 | 20 | coating | 50 | 1 | 11 | 120 | — | — | — | — | 3.5 | 379.5 | 327.75 | 140 |
| 47 | 1 | 20 | coating | 50 | 1 | 11 | 200 | — | — | — | — | 0.2 | — | — | 140 |
| 48 | 1 | 20 | coating | 50 | 1 | 11 | 200 | — | — | — | — | 3.5 | 643.5 | 555.75 | 140 |

TABLE 44

| | Starging sheet *1 | | Chromate film | | Black film | | | | | | | | | |
|---|---|---|---|---|---|---|---|---|---|---|---|---|---|---|
| | | | | Coating weight of chromium (mg/m²) | Base resin *2 | Additive 1 | | Additive 2 | | Additive 3 | | Thick-ness (μ) | Value of formula ① *9 | Value of formula ①' *10 | Baking temp. (°C.) |
| | Kind of plat-ing *1 | Coat-ing weight (g/m²) | Method of forming | | | Kind *3 | Pro-por-tion (parts) *4 | Kind *5 | Pro-por-tion (parts) *6 | Kind *7 | Pro-por-tion (parts) *8 | | | | |
| Comparative Example 2 | | | | | | | | | | | | | | | |
| 49 | 1 | 20 | coating | 50 | 1 | 16 | 3 | — | — | — | — | 3.0 | 5.6 | — | 140 |
| 50 | 1 | 20 | coating | 50 | 1 | 16 | 4 | — | — | — | — | 2.4 | 6.6 | — | 140 |
| 51 | 1 | 20 | coating | 50 | 1 | 16 | 8 | — | — | — | — | 1.1 | 6.3 | 1.35 | 140 |
| 52 | 1 | 20 | coating | 50 | 1 | 16 | 8 | — | — | — | — | 3.5 | 23.1 | 8.55 | 140 |
| 53 | 1 | 20 | coating | 50 | 1 | 16 | 10 | — | — | — | — | 0.9 | 6.3 | 1.25 | 140 |
| 54 | 1 | 20 | coating | 50 | 1 | 16 | 10 | — | — | — | — | 3.5 | 29.7 | 14.25 | 140 |
| 55 | 1 | 20 | coating | 50 | 1 | 16 | 20 | — | — | — | — | 0.5 | 5.7 | — | 140 |
| 56 | 1 | 20 | coating | 50 | 1 | 16 | 20 | — | — | — | — | 3.5 | 62.7 | 42.75 | 140 |

TABLE 45

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Comparative Example 2 | | | | | | | | | | | | | | | |
| 57 | 1 | 20 | coating | 50 | 1 | 16 | 40 | — | — | — | — | 0.3 | 3.9 | — | 140 |
| 58 | 1 | 20 | coating | 50 | 1 | 16 | 40 | — | — | — | — | 3.5 | 128.7 | 99.75 | 140 |
| 59 | 1 | 20 | coating | 50 | 1 | 16 | 80 | — | — | — | — | 0.2 | — | — | 140 |
| 60 | 1 | 20 | coating | 50 | 1 | 16 | 80 | — | — | — | — | 3.5 | 260.7 | 213.75 | 140 |
| 61 | 1 | 20 | coating | 50 | 1 | 16 | 120 | — | — | — | — | 0.2 | — | — | 140 |
| 62 | 1 | 20 | coating | 50 | 1 | 16 | 120 | — | — | — | — | 3.5 | 379.5 | 327.75 | 140 |
| 63 | 1 | 20 | coating | 50 | 1 | 16 | 200 | — | — | — | — | 0.2 | — | — | 140 |
| 64 | 1 | 20 | coating | 50 | 1 | 16 | 200 | — | — | — | — | 3.5 | 643.5 | 555.75 | 140 |

TABLE 46

| | Blackness (L value) | Weldability | Formability | Adhesion | Corrosion resistance | | Light fastness |
|---|---|---|---|---|---|---|---|
| | | | | | Flat portion | Formed portion | |
| Example 2 | | | | | | | |
| 1 | ○ (20) | ○ | ○ | ◉ | ◉ | ○ | ◉ |
| 2 | ○ (20) | ◉ | ○ | ◉ | ◉ | ○ | ◉ |
| 3 | ◉ (15) | ○ | ○ | ◉ | ◉ | ○ | ◉ |
| 4 | ○ (20) | ◉ | ○ | ◉ | ◉ | ○ | ◉ |
| 5 | ◉ (15) | ◉ | ○ | ◉ | ◉ | ○ | ◉ |
| 6 | ◉ (15) | ◉ | ○ | ◉ | ◉ | ○ | ◉ |
| 7 | ◉ (15) | ○ | ○ | ◉ | ◉ | ○ | ◉ |
| 8 | ○ (20) | ◉ | ○ | ◉ | +○ | –○ | ◉ |
| 9 | ◉ (15) | ◉ | ○ | ◉ | ◉ | ○ | ◉ |
| 10 | ◉ (14) | ◉ | ○ | ◉ | ◉ | ○ | ◉ |
| 11 | ◉ (14) | ◉ | ○ | ◉ | ◉ | ○ | ◉ |

TABLE 47

| | Blackness (L value) | Weldability | Formability | Adhesion | Corrosion resistance | | Light fastness |
|---|---|---|---|---|---|---|---|
| | | | | | Flat portion | Formed portion | |
| Example 2 | | | | | | | |
| 12 | ◉ (14) | ○ | ○ | ◉ | ◉ | ○ | ◉ |
| 13 | ○ (20) | ◉ | ○ | ◉ | ○ | △ | ◉ |
| 14 | ◉ (15) | ◉ | ○ | ◉ | +○ | –○ | ◉ |
| 15 | ◉ (14) | ◉ | ○ | ◉ | ◉ | ○ | ◉ |
| 16 | ◉ (13) | ◉ | ○ | ◉ | ◉ | ○ | ◉ |
| 17 | ◉ (13) | ○ | ○ | ◉ | ◉ | ○ | ◉ |
| 18 | ○ (20) | ◉ | ○ | ◉ | ○ | △ | ◉ |
| 19 | ◉ (15) | ◉ | ○ | ◉ | +○ | –○ | ◉ |
| 20 | ◉ (13) | ◉ | ○ | ◉ | ◉ | ○ | ◉ |
| 21 | ◉ (13) | ◉ | ○ | ◉ | ◉ | ○ | ◉ |
| 22 | ◉ (13) | ○ | ○ | ◉ | ◉ | ○ | ◉ |

TABLE 48

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 23 | ○ (20) | ◎ | ○ | ◎ | ○ | △ | ◎ |
| 24 | ◎ (15) | ◎ | ○ | ◎ | +○ | −○ | ◎ |
| 25 | ◎ (13) | ◎ | ○ | ◎ | ◎ | ○ | ◎ |
| 26 | ◎ (13) | ◎ | ○ | ◎ | ◎ | ○ | ◎ |
| 27 | ◎ (13) | ○ | ○ | ◎ | ◎ | ○ | ◎ |
| 28 | ○ (20) | ◎ | −○ | ◎ | ○ | △ | ◎ |
| 29 | ◎ (15) | ◎ | −○ | ◎ | +○ | −○ | ◎ |
| 30 | ◎ (13) | ◎ | −○ | ◎ | ◎ | ○ | ◎ |
| 31 | ◎ (13) | ◎ | −○ | ◎ | ◎ | ○ | ◎ |
| 32 | ◎ (13) | ○ | −○ | ◎ | ◎ | ○ | ◎ |

TABLE 49

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 33 | ○ (20) | ○ | ○ | ◎ | ◎ | ○ | ○ |
| 34 | ○ (20) | ◎ | ○ | ◎ | ◎ | ○ | ○ |
| 35 | ◎ (15) | ○ | ○ | ◎ | ◎ | ○ | ○ |
| 36 | ○ (20) | ◎ | ○ | ◎ | ◎ | ○ | ○ |
| 37 | ◎ (15) | ◎ | ○ | ◎ | ◎ | ○ | ○ |
| 38 | ◎ (15) | ◎ | ○ | ◎ | ◎ | ○ | ○ |
| 39 | ◎ (15) | ○ | ○ | ◎ | ◎ | ○ | ○ |
| 40 | ○ (20) | ◎ | ○ | ◎ | +○ | −○ | ○ |
| 41 | ◎ (15) | ◎ | ○ | ◎ | ◎ | ○ | ○ |
| 42 | ◎ (14) | ◎ | ○ | ◎ | ◎ | ○ | ○ |
| 43 | ◎ (14) | ◎ | ○ | ◎ | ◎ | ○ | ○ |

TABLE 50

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 44 | ◎ (14) | ○ | ○ | ◎ | ◎ | ○ | ○ |
| 45 | ○ (20) | ◎ | ○ | ◎ | ○ | △ | ○ |
| 46 | ◎ (15) | ◎ | ○ | ◎ | +○ | −○ | ○ |
| 47 | ◎ (14) | ◎ | ○ | ◎ | ◎ | ○ | ○ |
| 48 | ◎ (13) | ◎ | ○ | ◎ | ◎ | ○ | ○ |
| 49 | ◎ (13) | ○ | ○ | ◎ | ◎ | ○ | ○ |
| 50 | ○ (20) | ◎ | ○ | ◎ | ○ | △ | ○ |
| 51 | ◎ (15) | ◎ | ○ | ◎ | +○ | −○ | ○ |
| 52 | ◎ (13) | ◎ | ○ | ◎ | ◎ | ○ | ○ |
| 53 | ◎ (13) | ◎ | ○ | ◎ | ◎ | ○ | ○ |
| 54 | ◎ (13) | ○ | ○ | ◎ | ◎ | ○ | ○ |

TABLE 51

| | Blackness (L value) | Weldability | Formability | Adhesion | Corrosion resistance Flat portion | Formed portion | Light fastness |
|---|---|---|---|---|---|---|---|
| Example 2 | | | | | | | |
| 55 | ○ (20) | ⊙ | ○ | ⊙ | ○ | △ | ○ |
| 56 | ⊙ (15) | ⊙ | ○ | ⊙ | +○ | -○ | ○ |
| 57 | ⊙ (13) | ⊙ | ○ | ⊙ | ⊙ | ○ | ○ |
| 58 | ⊙ (13) | ⊙ | ○ | ⊙ | ⊙ | ○ | ○ |
| 59 | ⊙ (13) | ○ | ○ | ⊙ | ⊙ | ○ | ○ |
| 60 | ○ (20) | ⊙ | ○ | ⊙ | ○ | △ | ○ |
| 61 | ⊙ (15) | ⊙ | ○ | ⊙ | +○ | -○ | ○ |
| 62 | ⊙ (13) | ⊙ | ○ | ⊙ | ⊙ | ○ | ○ |
| 63 | ⊙ (13) | ⊙ | ○ | ⊙ | ⊙ | ○ | ○ |
| 64 | ⊙ (13) | ○ | ○ | ⊙ | ⊙ | ○ | ○ |

TABLE 52

| | Blackness (L value) | Weldability | Formability | Adhesion | Corrosion resistance Flat portion | Formed portion | Light fastness |
|---|---|---|---|---|---|---|---|
| Example 2 | | | | | | | |
| 65 | ○ (20) | ○ | ○ | ⊙ | ⊙ | ○ | ○ |
| 66 | ○ (20) | ⊙ | ○ | ⊙ | ⊙ | ○ | ○ |
| 67 | ⊙ (15) | ○ | ○ | ⊙ | ⊙ | ○ | ○ |
| 68 | ○ (20) | ⊙ | ○ | ⊙ | ⊙ | ○ | ○ |
| 69 | ⊙ (15) | ⊙ | ○ | ⊙ | ⊙ | ○ | ○ |
| 70 | ⊙ (15) | ⊙ | ○ | ⊙ | ⊙ | ○ | ○ |
| 71 | ⊙ (15) | ○ | ○ | ⊙ | ⊙ | ○ | ○ |
| 72 | ○ (20) | ⊙ | ○ | ⊙ | +○ | -○ | ○ |
| 73 | ⊙ (15) | ⊙ | ○ | ⊙ | ⊙ | ○ | ○ |
| 74 | ⊙ (14) | ⊙ | ○ | ⊙ | ⊙ | ○ | ○ |
| 75 | ⊙ (14) | ⊙ | ○ | ⊙ | ⊙ | ○ | ○ |

TABLE 53

| | Blackness (L value) | Weldability | Formability | Adhesion | Corrosion resistance Flat portion | Formed portion | Light fastness |
|---|---|---|---|---|---|---|---|
| Example 2 | | | | | | | |
| 76 | ⊙ (14) | ○ | ○ | ⊙ | ⊙ | ○ | ○ |
| 77 | ○ (20) | ⊙ | ○ | ⊙ | ○ | △ | ○ |
| 78 | ⊙ (15) | ⊙ | ○ | ⊙ | +○ | -○ | ○ |
| 79 | ⊙ (14) | ⊙ | ○ | ⊙ | ⊙ | ○ | ○ |
| 80 | ⊙ (13) | ⊙ | ○ | ⊙ | ⊙ | ○ | ○ |
| 81 | ⊙ (13) | ○ | ○ | ⊙ | ⊙ | ○ | ○ |
| 82 | ○ (20) | ⊙ | ○ | ⊙ | ○ | △ | ○ |
| 83 | ⊙ (15) | ⊙ | ○ | ⊙ | +○ | -○ | ○ |
| 84 | ⊙ (13) | ⊙ | ○ | ⊙ | ⊙ | ○ | ○ |
| 85 | ⊙ (13) | ⊙ | ○ | ⊙ | ⊙ | ○ | ○ |
| 86 | ⊙ (13) | ○ | ○ | ⊙ | ⊙ | ○ | ○ |

TABLE 54

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 87 | ○ (20) | ⊚ | ○ | ⊚ | ○ | △ | ○ |
| 88 | ⊚ (15) | ⊚ | ○ | ⊚ | +○ | −○ | ○ |
| 89 | ⊚ (13) | ⊚ | ○ | ⊚ | ⊚ | ○ | ○ |
| 90 | ⊚ (13) | ⊚ | ○ | ⊚ | ⊚ | ○ | ○ |
| 91 | ⊚ (13) | ○ | ○ | ⊚ | ⊚ | ○ | ○ |
| 92 | ○ (20) | ⊚ | −○ | ⊚ | ○ | △ | ○ |
| 93 | ⊚ (15) | ⊚ | −○ | ⊚ | +○ | −○ | ○ |
| 94 | ⊚ (13) | ⊚ | −○ | ⊚ | ⊚ | ○ | ○ |
| 95 | ⊚ (13) | ⊚ | −○ | ⊚ | ⊚ | ○ | ○ |
| 96 | ⊚ (13) | ○ | −○ | ⊚ | ⊚ | ○ | ○ |

TABLE 55

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 97 | ○ (20) | ○ | ○ | ⊚ | ⊚ | ○ | ○ |
| 98 | ○ (20) | ⊚ | ○ | ⊚ | ⊚ | ○ | ○ |
| 99 | ⊚ (15) | ○ | ○ | ⊚ | ⊚ | ○ | ○ |
| 100 | ○ (20) | ⊚ | ○ | ⊚ | ⊚ | ○ | ○ |
| 101 | ⊚ (15) | ⊚ | ○ | ⊚ | ⊚ | ○ | ○ |
| 102 | ⊚ (15) | ⊚ | ○ | ⊚ | ⊚ | ○ | ○ |
| 103 | ⊚ (15) | ○ | ○ | ⊚ | ⊚ | ○ | ○ |
| 104 | ○ (20) | ⊚ | ○ | ⊚ | +○ | −○ | ○ |
| 105 | ⊚ (15) | ⊚ | ○ | ⊚ | ○ | ○ | |
| 106 | ⊚ (14) | ⊚ | ○ | ⊚ | ⊚ | ○ | ○ |
| 107 | ⊚ (14) | ⊚ | ○ | ⊚ | ⊚ | ○ | ○ |

TABLE 56

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 108 | ⊚ (14) | ○ | ○ | ⊚ | ⊚ | ○ | ○ |
| 109 | ○ (20) | ⊚ | ○ | ⊚ | ○ | △ | ○ |
| 110 | ⊚ (15) | ⊚ | ○ | ⊚ | +○ | −○ | ○ |
| 111 | ⊚ (14) | ⊚ | ○ | ⊚ | ⊚ | ○ | ○ |
| 112 | ⊚ (13) | ⊚ | ○ | ⊚ | ⊚ | ○ | ○ |
| 113 | ⊚ (13) | ○ | ○ | ⊚ | ⊚ | ○ | ○ |
| 114 | ○ (20) | ⊚ | ○ | ⊚ | ○ | △ | ○ |
| 115 | ⊚ (15) | ⊚ | ○ | ⊚ | +○ | −○ | ○ |
| 116 | ⊚ (13) | ⊚ | ○ | ⊚ | ⊚ | ○ | ○ |
| 117 | ⊚ (13) | ⊚ | ○ | ⊚ | ⊚ | ○ | ○ |
| 118 | ⊚ (13) | ○ | ○ | ⊚ | ⊚ | ○ | ○ |

TABLE 57

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 119 | ○ (20) | ⊙ | ○ | ⊙ | ○ | Δ | ○ |
| 120 | ⊙ (15) | ⊙ | ○ | ⊙ | +○ | −○ | ○ |
| 121 | ⊙ (13) | ⊙ | ○ | ⊙ | ⊙ | ○ | ○ |
| 122 | ⊙ (13) | ⊙ | ○ | ⊙ | ⊙ | ○ | ○ |
| 123 | ⊙ (13) | ○ | ○ | ⊙ | ⊙ | ○ | ○ |
| 124 | ○ (20) | ⊙ | −○ | ⊙ | ○ | Δ | ○ |
| 125 | ⊙ (15) | ⊙ | −○ | ⊙ | +○ | −○ | ○ |
| 126 | ⊙ (13) | ⊙ | −○ | ⊙ | ⊙ | ○ | ○ |
| 127 | ⊙ (13) | ⊙ | −○ | ⊙ | ⊙ | ○ | ○ |
| 128 | ⊙ (13) | ○ | −○ | ⊙ | ⊙ | ○ | ○ |

TABLE 58

| | Blackness (L value) | Weldability | Formability | Adhesion | Corrosion resistance Flat portion | Corrosion resistance Formed portion | Light fastness |
|---|---|---|---|---|---|---|---|
| Comparative Example 2 | | | | | | | |
| 1 | X (23) | ○ | — | — | — | — | — |
| 2 | X (21) | ⊙ | — | — | — | — | — |
| 3 | X (22) | ⊙ | — | — | — | — | — |
| 4 | ⊙ (13) | X | — | — | — | — | — |
| 5 | X (22) | ⊙ | — | — | — | — | — |
| 6 | ⊙ (13) | X | — | — | — | — | — |
| 7 | X (22) | ⊙ | — | — | — | — | — |
| 8 | ⊙ (13) | X | — | — | — | — | — |
| 9 | X (22) | ⊙ | — | — | — | — | — |
| 10 | ⊙ (13) | X | — | — | — | — | — |
| 11 | X (22) | ⊙ | — | — | — | — | — |
| 12 | ⊙ (13) | X | — | — | — | — | — |
| 13 | X (22) | ⊙ | — | — | — | — | — |
| 14 | ⊙ (13) | X | — | — | — | — | — |
| 15 | X (21) | ⊙ | — | — | — | — | — |
| 16 | ⊙ (13) | X | — | — | — | — | — |

TABLE 59

| | Blackness (L value) | Weldability | Formability | Adhesion | Corrosion resistance Flat portion | Corrosion resistance Formed portion | Light fastness |
|---|---|---|---|---|---|---|---|
| Comparative Example 2 | | | | | | | |
| 17 | X (23) | ○ | — | — | — | — | — |
| 18 | X (21) | ⊙ | — | — | — | — | — |
| 19 | X (22) | ⊙ | — | — | — | — | — |
| 20 | ⊙ (13) | X | — | — | — | — | — |
| 21 | X (22) | ⊙ | — | — | — | — | — |
| 22 | ⊙ (13) | X | — | — | — | — | — |
| 23 | X (22) | ⊙ | — | — | — | — | — |
| 24 | ⊙ (13) | X | — | — | — | — | — |
| 25 | X (22) | ⊙ | — | — | — | — | — |
| 26 | ⊙ (13) | X | — | — | — | — | — |
| 27 | X (22) | ⊙ | — | — | — | — | — |
| 28 | ⊙ (13) | X | — | — | — | — | — |
| 29 | X (22) | ⊙ | — | — | — | — | — |
| 30 | ⊙ (13) | X | — | — | — | — | — |
| 31 | X (21) | ⊙ | — | — | — | — | — |
| 32 | ⊙ (13) | X | — | — | — | — | — |

TABLE 60

| | Blackness (L value) | Weldability | Formability | Adhesion | Corrosion resistance Flat portion | Corrosion resistance Formed portion | Light fastness |
|---|---|---|---|---|---|---|---|
| Comparative Example 2 | | | | | | | |
| 33 | X (23) | ○ | — | — | — | — | — |
| 34 | X (21) | ⊙ | — | — | — | — | — |
| 34 | X (22) | ⊙ | — | — | — | — | — |
| 36 | ⊙ (13) | X | — | — | — | — | — |
| 37 | X (22) | ⊙ | — | — | — | — | — |
| 38 | ⊙ (13) | X | — | — | — | — | — |
| 39 | X (22) | ⊙ | — | — | — | — | — |
| 40 | ⊙ (13) | X | — | — | — | — | — |
| 41 | X (22) | ⊙ | — | — | — | — | — |
| 42 | ⊙ (13) | X | — | — | — | — | — |
| 43 | X (22) | ⊙ | — | — | — | — | — |
| 44 | ⊙ (13) | X | — | — | — | — | — |
| 45 | X (22) | ⊙ | — | — | — | — | — |
| 46 | ⊙ (13) | X | — | — | — | — | — |
| 47 | X (21) | ⊙ | — | — | — | — | — |
| 48 | ⊙ (13) | X | — | — | — | — | — |

TABLE 61

| | Blackness (L value) | Weldability | Formability | Adhesion | Corrosion resistance Flat portion | Corrosion resistance Formed portion | Light fastness |
|---|---|---|---|---|---|---|---|
| Comparative Example 2 | | | | | | | |
| 49 | X (23) | ○ | — | — | — | — | — |
| 50 | X (21) | ⊙ | — | — | — | — | — |
| 51 | X (22) | ⊙ | — | — | — | — | — |
| 52 | ⊙ (13) | X | — | — | — | — | — |
| 53 | X (22) | ⊙ | — | — | — | — | — |
| 54 | ⊙ (13) | X | — | — | — | — | — |
| 55 | X (22) | ⊙ | — | — | — | — | — |
| 56 | ⊙ (13) | X | — | — | — | — | — |
| 57 | X (22) | ⊙ | — | — | — | — | — |
| 58 | ⊙ (13) | X | — | — | — | — | — |
| 59 | X (22) | ⊙ | — | — | — | — | — |
| 60 | ⊙ (13) | X | — | — | — | — | — |
| 61 | X (22) | ⊙ | — | — | — | — | — |
| 62 | (13) | X | — | — | — | — | — |
| 63 | X (21) | ⊙ | — | — | — | — | — |
| 64 | ⊙ (13) | X | — | — | — | — | — |

TABLE 62

| | Starging sheet *1 Kind of plating *1 | Starging sheet *1 Coating weight (g/m²) | Method of forming | Chromate film Coating weight of chromium (mg/m²) | Black film Base resin *2 | Black film Additive 1 Kind *3 | Black film Additive 1 Proportion (parts) *4 | Black film Additive 2 Kind *5 | Black film Additive 2 Proportion (parts) *6 | Black film Additive 3 Kind *7 | Black film Additive 3 Proportion (parts) *8 | Thickness (μ) | Value of formula ① *9 | Value of formula ①' *10 | Baking temp. (°C.) |
|---|---|---|---|---|---|---|---|---|---|---|---|---|---|---|---|
| Example 3 | | | | | | | | | | | | | | | |
| 1 | 1 | 20 | coating | 10 | 1 | 1 | 70 | — | — | — | — | 1.5 | 89.7 | 55.25 | 140 |
| 2 | 1 | 20 | coating | 30 | 1 | 1 | 70 | — | — | — | — | 1.5 | 89.7 | 55.25 | 140 |
| 3 | 1 | 20 | coating | 150 | 1 | 1 | 70 | — | — | — | — | 1.5 | 89.7 | 55.25 | 140 |

TABLE 62-continued

| | Starging sheet *1 | | Chromate film | | Black film | | | | | | | | | |
|---|---|---|---|---|---|---|---|---|---|---|---|---|---|---|
| | | | | Coating weight | | Additive 1 | | Additive 2 | | Additive 3 | | | Value of | Value of | |
| | Kind of plating *1 | Coating weight (g/m²) | Method of forming | of chromium (mg/m²) | Base resin *2 | Kind *3 | Proportion (parts) *4 | Kind *5 | Proportion (parts) *6 | Kind *7 | Proportion (parts) *8 | Thickness (μ) | formula ① *9 | formula ①' *10 | Baking temp. (°C.) |
| 4 | 1 | 20 | coating | 200 | 1 | 1 | 70 | — | — | — | — | 1.5 | 89.7 | 55.25 | 140 |
| 5 | 1 | 20 | Electrolysis | 50 | 1 | 1 | 70 | — | — | — | — | 1.5 | 89.7 | 55.25 | 140 |
| 6 | 1 | 20 | coating | 50 | 2 | 1 | 70 | — | — | — | — | 1.5 | 89.7 | 55.25 | 140 |
| 7 | 1 | 20 | coating | 50 | 3 | 1 | 70 | — | — | — | — | 1.5 | 89.7 | 55.25 | 140 |
| 8 | 1 | 20 | coating | 50 | 1 | 1 | 70 | — | — | — | — | 1.5 | 89.7 | 55.25 | 80 |
| 9 | 1 | 20 | coating | 50 | 1 | 1 | 70 | — | — | — | — | 1.5 | 89.7 | 55.25 | 120 |
| 10 | 1 | 20 | coating | 50 | 1 | 1 | 70 | — | — | — | — | 1.5 | 89.7 | 55.25 | 250 |
| 11 | 1 | 20 | coating | 50 | 1 | 1 | 70 | — | — | — | — | 1.5 | 89.7 | 55.25 | 300 |
| 12 | 2 | 20 | coating | 50 | 1 | 1 | 70 | — | — | — | — | 1.5 | 89.7 | 55.25 | 140 |
| 13 | 3 | 40 | coating | 50 | 1 | 1 | 70 | — | — | — | — | 1.5 | 89.7 | 55.25 | 140 |
| 14 | 4 | 90 | coating | 50 | 1 | 1 | 70 | — | — | — | — | 1.5 | 89.7 | 55.25 | 140 |
| 15 | 5 | 20 | coating | 50 | 1 | 1 | 70 | — | — | — | — | 1.5 | 89.7 | 55.25 | 140 |

TABLE 63

| | Starging sheet *1 | | Chromate film | | Black film | | | | | | | | | |
|---|---|---|---|---|---|---|---|---|---|---|---|---|---|---|
| | | | | Coating weight | | Additive 1 | | Additive 2 | | Additive 3 | | | Value of | Value of | |
| | Kind of plating *1 | Coating weight (g/m²) | Method of forming | of chromium (mg/m²) | Base resin *2 | Kind *3 | Proportion (parts) *4 | Kind *5 | Proportion (parts) *6 | Kind *7 | Proportion (parts) *8 | Thickness (μ) | formula ① *9 | formula ①' *10 | Baking temp. (°C.) |
| Example 3 | | | | | | | | | | | | | | | |
| 16 | 1 | 20 | coating | 10 | 1 | 1 | 70 | — | — | — | — | 1.5 | 89.7 | 55.25 | 140 |
| 17 | 1 | 20 | coating | 30 | 1 | 1 | 70 | — | — | — | — | 1.5 | 89.7 | 55.25 | 140 |
| 18 | 1 | 20 | coating | 150 | 1 | 1 | 70 | — | — | — | — | 1.5 | 89.7 | 55.25 | 140 |
| 19 | 1 | 20 | coating | 200 | 1 | 1 | 70 | — | — | — | — | 1.5 | 89.7 | 55.25 | 140 |
| 20 | 1 | 20 | Electrolysis | 50 | 1 | 1 | 70 | — | — | — | — | 1.5 | 89.7 | 55.25 | 140 |
| 21 | 1 | 20 | coating | 50 | 2 | 1 | 70 | — | — | — | — | 1.5 | 89.7 | 55.25 | 140 |
| 22 | 1 | 20 | coating | 50 | 3 | 1 | 70 | — | — | — | — | 1.5 | 89.7 | 55.25 | 140 |
| 23 | 1 | 20 | coating | 50 | 1 | 1 | 70 | — | — | — | — | 1.5 | 89.7 | 55.25 | 80 |
| 24 | 1 | 20 | coating | 50 | 1 | 1 | 70 | — | — | — | — | 1.5 | 89.7 | 55.25 | 120 |
| 25 | 1 | 20 | coating | 50 | 1 | 1 | 70 | — | — | — | — | 1.5 | 89.7 | 55.25 | 250 |
| 26 | 1 | 20 | coating | 50 | 1 | 1 | 70 | — | — | — | — | 1.5 | 89.7 | 55.25 | 300 |
| 27 | 2 | 20 | coating | 50 | 1 | 1 | 70 | — | — | — | — | 1.5 | 89.7 | 55.25 | 140 |
| 28 | 3 | 40 | coating | 50 | 1 | 1 | 70 | — | — | — | — | 1.5 | 89.7 | 55.25 | 140 |
| 29 | 4 | 90 | coating | 50 | 1 | 1 | 70 | — | — | — | — | 1.5 | 89.7 | 55.25 | 140 |
| 30 | 5 | 20 | coating | 50 | 1 | 1 | 70 | — | — | — | — | 1.5 | 89.7 | 55.25 | 140 |

TABLE 64

| | Starging sheet *1 | | Chromate film | Coating weight of chromium (mg/m²) | Black film | | | | | | | | | | |
|---|---|---|---|---|---|---|---|---|---|---|---|---|---|---|---|
| | | | | | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Example 3 | | | | | | | | | | | | | | | |
| 31 | 1 | 20 | coating | 10 | 1 | 11 | 70 | — | — | — | — | 1.5 | 89.7 | 55.25 | 140 |
| 32 | 1 | 20 | coating | 30 | 1 | 11 | 70 | — | — | — | — | 1.5 | 89.7 | 55.25 | 140 |
| 33 | 1 | 20 | coating | 150 | 1 | 11 | 70 | — | — | — | — | 1.5 | 89.7 | 55.25 | 140 |
| 34 | 1 | 20 | coating | 200 | 1 | 11 | 70 | — | — | — | — | 1.5 | 89.7 | 55.25 | 140 |
| 35 | 1 | 20 | Electrolysis | 50 | 1 | 11 | 70 | — | — | — | — | 1.5 | 89.7 | 55.25 | 140 |
| 36 | 1 | 20 | coating | 50 | 2 | 11 | 70 | — | — | — | — | 1.5 | 89.7 | 55.25 | 140 |
| 37 | 1 | 20 | coating | 50 | 3 | 11 | 70 | — | — | — | — | 1.5 | 89.7 | 55.25 | 140 |
| 38 | 1 | 20 | coating | 50 | 1 | 11 | 70 | — | — | — | — | 1.5 | 89.7 | 55.25 | 80 |
| 39 | 1 | 20 | coating | 50 | 1 | 11 | 70 | — | — | — | — | 1.5 | 89.7 | 55.25 | 120 |
| 40 | 1 | 20 | coating | 50 | 1 | 11 | 70 | — | — | — | — | 1.5 | 89.7 | 55.25 | 250 |
| 41 | 1 | 20 | coating | 50 | 1 | 11 | 70 | — | — | — | — | 1.5 | 89.7 | 55.25 | 300 |
| 42 | 2 | 20 | coating | 50 | 1 | 11 | 70 | — | — | — | — | 1.5 | 89.7 | 55.25 | 140 |
| 43 | 3 | 40 | coating | 50 | 1 | 11 | 70 | — | — | — | — | 1.5 | 89.7 | 55.25 | 140 |
| 44 | 4 | 90 | coating | 50 | 1 | 11 | 70 | — | — | — | — | 1.5 | 89.7 | 55.25 | 140 |
| 45 | 5 | 20 | coating | 50 | 1 | 11 | 70 | — | — | — | — | 1.5 | 89.7 | 55.25 | 140 |

TABLE 65

| | Starging sheet *1 | | Chromate film | Coating weight of chromium (mg/m²) | Black film | | | | | | | | | | |
|---|---|---|---|---|---|---|---|---|---|---|---|---|---|---|---|
| | | | | | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Example 3 | | | | | | | | | | | | | | | |
| 46 | 1 | 20 | coating | 10 | 1 | 16 | 70 | — | — | — | — | 1.5 | 89.7 | 55.25 | 140 |
| 47 | 1 | 20 | coating | 30 | 1 | 16 | 70 | — | — | — | — | 1.5 | 89.7 | 55.25 | 140 |
| 48 | 1 | 20 | coating | 150 | 1 | 16 | 70 | — | — | — | — | 1.5 | 89.7 | 55.25 | 140 |
| 49 | 1 | 20 | coating | 200 | 1 | 16 | 70 | — | — | — | — | 1.5 | 89.7 | 55.25 | 140 |
| 50 | 1 | 20 | Electrolysis | 50 | 1 | 16 | 70 | — | — | — | — | 1.5 | 89.7 | 55.25 | 140 |
| 51 | 1 | 20 | coating | 50 | 2 | 16 | 70 | — | — | — | — | 1.5 | 89.7 | 55.25 | 140 |
| 52 | 1 | 20 | coating | 50 | 3 | 16 | 70 | — | — | — | — | 1.5 | 89.7 | 55.25 | 140 |
| 53 | 1 | 20 | coating | 50 | 1 | 16 | 70 | — | — | — | — | 1.5 | 89.7 | 55.25 | 80 |
| 54 | 1 | 20 | coating | 50 | 1 | 16 | 70 | — | — | — | — | 1.5 | 89.7 | 55.25 | 120 |
| 55 | 1 | 20 | coating | 50 | 1 | 16 | 70 | — | — | — | — | 1.5 | 89.7 | 55.25 | 250 |
| 56 | 1 | 20 | coating | 50 | 1 | 16 | 70 | — | — | — | — | 1.5 | 89.7 | 55.25 | 300 |
| 57 | 2 | 20 | coating | 50 | 1 | 16 | 70 | — | — | — | — | 1.5 | 89.7 | 55.25 | 140 |
| 58 | 3 | 40 | coating | 50 | 1 | 16 | 70 | — | — | — | — | 1.5 | 89.7 | 55.25 | 140 |
| 59 | 4 | 90 | coating | 50 | 1 | 16 | 70 | — | — | — | — | 1.5 | 89.7 | 55.25 | 140 |
| 60 | 5 | 20 | coating | 50 | 1 | 16 | 70 | — | — | — | — | 1.5 | 89.7 | 55.25 | 140 |

TABLE 66

| | Starting sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Comparative Example 3 | | | | | | | | | | | | | | | |
| 1 | 1 | 20 | coating | 5 | 1 | 1 | 70 | — | — | — | — | 1.5 | 89.7 | 55.25 | 140 |
| 2 | 1 | 20 | coating | 500 | 1 | 1 | 70 | — | — | — | — | 1.5 | 89.7 | 55.25 | 140 |
| 3 | 1 | 20 | — | — | 1 | 1 | 70 | — | — | — | — | 1.5 | 89.7 | 55.25 | 140 |
| 4 | 1 | 20 | coating | 50 | 4 | 1 | 70 | — | — | — | — | 1.5 | 89.7 | 55.25 | 140 |

TABLE 67

| | Blackness (L value) | Weldability | Formability | Adhesion | Corrosion resistance | | Light fastness |
|---|---|---|---|---|---|---|---|
| | | | | | Flat portion | Formed portion | |
| Example 3 | | | | | | | |
| 1 | ⊚ (13) | ⊚ | ○ | ⊚ | ○ | −○ | ⊚ |
| 2 | ⊚ (13) | ⊚ | ○ | ⊚ | ⊚ | ○ | ⊚ |
| 3 | ⊚ (13) | ⊚ | ○ | ⊚ | ⊚ | +○ | ⊚ |
| 4 | ⊚ (13) | ○ | −○ | ⊚ | ⊚ | +○ | ⊚ |
| 5 | ⊚ (13) | ⊚ | ○ | ⊚ | ⊚ | ○ | ⊚ |
| 6 | ⊚ (13) | ⊚ | ○ | ⊚ | ⊚ | ○ | ⊚ |
| 7 | ⊚ (13) | ⊚ | ○ | ⊚ | ○ | ○ | ⊚ |
| 8 | ⊚ (13) | ⊚ | ○ | ⊚ | ○ | −○ | ⊚ |
| 9 | ⊚ (13) | ⊚ | ○ | ⊚ | ⊚ | ○ | ⊚ |
| 10 | ⊚ (13) | ⊚ | ○ | ⊚ | ○ | ⊚ | ⊚ |
| 11 | ⊚ (13) | ⊚ | −○ | ⊚ | ○ | −○ | ⊚ |
| 12 | ⊚ (13) | ⊚ | +○ | ⊚ | ⊚ | +○ | ⊚ |
| 13 | ⊚ (13) | ⊚ | +○ | ⊚ | ⊚ | +○ | ⊚ |
| 14 | ⊚ (13) | ⊚ | −○ | ⊚ | ⊚ | ○ | ⊚ |
| 15 | ⊚ (13) | ⊚ | ○ | ⊚ | ⊚ | ○ | ⊚ |

TABLE 68

| | Blackness (L value) | Weldability | Formability | Adhesion | Corrosion resistance | | Light fastness |
|---|---|---|---|---|---|---|---|
| | | | | | Flat portion | Formed portion | |
| Example 3 | | | | | | | |
| 16 | ⊙ (13) | ⊙ | ○ | ⊙ | ○ | −○ | ○ |
| 17 | ⊙ (13) | ⊙ | ○ | ⊙ | ⊙ | ○ | ○ |
| 18 | ⊙ (13) | ⊙ | ○ | ⊙ | ⊙ | +○ | ○ |
| 19 | ⊙ (13) | ○ | −○ | ⊙ | ⊙ | +○ | ○ |
| 20 | ⊙ (13) | ⊙ | ○ | ⊙ | ⊙ | ○ | ○ |
| 21 | ⊙ (13) | ⊙ | ○ | ⊙ | ⊙ | ○ | ○ |
| 22 | ⊙ (13) | ⊙ | ○ | ⊙ | ⊙ | ○ | ○ |
| 23 | ⊙ (13) | ⊙ | ○ | ⊙ | ○ | −○ | ○ |
| 24 | ⊙ (13) | ⊙ | ○ | ⊙ | ⊙ | ○ | ○ |
| 25 | ⊙ (13) | ⊙ | ○ | ⊙ | ⊙ | ⊙ | ○ |
| 26 | ⊙ (13) | ⊙ | −○ | ⊙ | ○ | −○ | ○ |
| 27 | ⊙ (13) | ⊙ | +○ | ⊙ | ⊙ | +○ | ○ |
| 28 | ⊙ (13) | ⊙ | +○ | ⊙ | ⊙ | +○ | ○ |
| 29 | ⊙ (13) | ⊙ | −○ | ⊙ | ⊙ | ○ | ○ |
| 30 | ⊙ (13) | ⊙ | ○ | ⊙ | ⊙ | ○ | ○ |

TABLE 69

| | Blackness (L value) | Weldability | Formability | Adhesion | Corrosion resistance Flat portion | Corrosion resistance Formed portion | Light fastness |
|---|---|---|---|---|---|---|---|
| Example 3 | | | | | | | |
| 31 | ◎ (13) | ◎ | ○ | ◎ | ○ | −○ | ○ |
| 32 | ◎ (13) | ◎ | ○ | ◎ | ◎ | ○ | ○ |
| 33 | ◎ (13) | ◎ | ○ | ◎ | ◎ | +○ | ○ |
| 34 | ◎ (13) | ○ | −○ | ◎ | ◎ | +○ | ○ |
| 35 | ◎ (13) | ◎ | ○ | ◎ | ◎ | ○ | ○ |
| 36 | ◎ (13) | ◎ | ○ | ◎ | ◎ | ○ | ○ |
| 37 | ◎ (13) | ◎ | ○ | ◎ | ◎ | ○ | ○ |
| 38 | ◎ (13) | ◎ | ○ | ◎ | ○ | −○ | ○ |
| 39 | ◎ (13) | ◎ | ○ | ◎ | ◎ | ○ | ○ |
| 40 | ◎ (13) | ◎ | ○ | ◎ | ◎ | ○ | ○ |
| 41 | ◎ (13) | ◎ | −○ | ◎ | ○ | −○ | ○ |
| 42 | ◎ (13) | ◎ | +○ | ◎ | ◎ | +○ | ○ |
| 43 | ◎ (13) | ◎ | +○ | ◎ | ◎ | +○ | ○ |
| 44 | ◎ (13) | ◎ | −○ | ◎ | ◎ | ○ | ○ |
| 45 | ◎ (13) | ◎ | ○ | ◎ | ◎ | ○ | ○ |

TABLE 70

| | Blackness (L value) | Weldability | Formability | Adhesion | Corrosion resistance Flat portion | Corrosion resistance Formed portion | Light fastness |
|---|---|---|---|---|---|---|---|
| Example 3 | | | | | | | |
| 46 | ◎ (13) | ◎ | ○ | ◎ | ○ | −○ | ○ |
| 47 | ◎ (13) | ◎ | ○ | ◎ | ◎ | ○ | ○ |
| 48 | ◎ (13) | ◎ | ○ | ◎ | ◎ | +○ | ○ |
| 49 | ◎ (13) | ○ | −○ | ◎ | ◎ | +○ | ○ |
| 50 | ◎ (13) | ◎ | ○ | ◎ | ◎ | ○ | ○ |
| 51 | ◎ (13) | ◎ | ○ | ◎ | ◎ | ○ | ○ |
| 52 | ◎ (13) | ◎ | ○ | ◎ | ◎ | ○ | ○ |
| 53 | ◎ (13) | ◎ | ○ | ◎ | ○ | −○ | ○ |
| 54 | ◎ (13) | ◎ | ○ | ◎ | ◎ | ○ | ○ |
| 55 | ◎ (13) | ◎ | ○ | ◎ | ◎ | ○ | ○ |
| 56 | ◎ (13) | ◎ | −○ | ◎ | ○ | −○ | ○ |
| 57 | ◎ (13) | ◎ | +○ | ◎ | ◎ | +○ | ○ |
| 58 | ◎ (13) | ◎ | +○ | ◎ | ◎ | +○ | ○ |
| 59 | ◎ (13) | ◎ | −○ | ◎ | ◎ | ○ | ○ |
| 60 | ◎ (13) | ◎ | ○ | ◎ | ◎ | ○ | ○ |

TABLE 71

| | Blackness (L value) | Weldability | Formability | Adhesion | Corrosion resistance Flat portion | Corrosion resistance Formed portion | Light fastness | Remark |
|---|---|---|---|---|---|---|---|---|
| Comparative Example 3 | | | | | | | | |
| 1 | ◎ (13) | ◎ | ◎ | ○ | △ | X | ◎ | ◎ |
| 2 | ◎ (13) | △ ~ X | △ | △ | ◎ | ◎ | ◎ | |
| 3 | ◎ (13) | ◎ | ◎ | ○ | X | X | ◎ | |
| 4 | ◎ (13) | ◎ | X | ○ | ◎ | ○ | ◎ | Easily damaged |

TABLE 72

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 4 | | | | | | | | | | | | | | | |
| 1 | 1 | 20 | coating | 50 | 1 | 1 | 70 | 1 | 1 | — | — | 1.5 | 89.7 | 55.25 | 140 |
| 2 | 1 | 20 | coating | 50 | 1 | 1 | 70 | 1 | 10 | — | — | 1.5 | 89.7 | 55.25 | 140 |
| 3 | 1 | 20 | coating | 50 | 1 | 1 | 70 | 1 | 40 | — | — | 1.5 | 89.7 | 55.25 | 140 |
| 4 | 1 | 20 | coating | 50 | 1 | 1 | 70 | 1 | 60 | — | — | 1.5 | 89.7 | 55.25 | 140 |
| 5 | 1 | 20 | coating | 50 | 1 | 1 | 70 | 1 | 100 | — | — | 1.5 | 89.7 | 55.25 | 140 |
| 6 | 1 | 20 | coating | 50 | 2 | 1 | 70 | 2 | 40 | — | — | 1.5 | 89.7 | 55.25 | 140 |
| 7 | 1 | 20 | coating | 50 | 3 | 1 | 70 | 3 | 40 | — | — | 1.5 | 89.7 | 55.25 | 140 |
| 8 | 1 | 20 | coating | 50 | 1 | 1 | 70 | — | — | 1 | 1 | 1.5 | 89.7 | 55.25 | 140 |
| 9 | 1 | 20 | coating | 50 | 1 | 1 | 70 | — | — | 1 | 10 | 1.5 | 89.7 | 55.25 | 140 |
| 10 | 1 | 20 | coating | 50 | 1 | 1 | 70 | — | — | 1 | 60 | 1.5 | 89.7 | 55.25 | 140 |
| 11 | 1 | 20 | coating | 50 | 1 | 1 | 70 | — | — | 1 | 100 | 1.5 | 89.7 | 55.25 | 140 |

TABLE 73

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 4 | | | | | | | | | | | | | | | |
| 12 | 1 | 20 | coating | 50 | 1 | 1 | 70 | — | — | 2 | 40 | 1.5 | 89.7 | 55.25 | 140 |
| 13 | 1 | 20 | coating | 50 | 1 | 1 | 70 | — | — | 3 | 40 | 1.5 | 89.7 | 55.25 | 140 |
| 14 | 1 | 20 | coating | 50 | 1 | 1 | 70 | — | — | 4 | 40 | 1.5 | 89.7 | 55.25 | 140 |
| 15 | 1 | 20 | coating | 50 | 1 | 1 | 70 | 1 | 40 | 1 | 1 | 1.5 | 89.7 | 55.25 | 140 |
| 16 | 1 | 20 | coating | 50 | 1 | 1 | 70 | 1 | 40 | 1 | 10 | 1.5 | 89.7 | 55.25 | 140 |
| 17 | 1 | 20 | coating | 50 | 1 | 1 | 70 | 1 | 40 | 1 | 40 | 1.5 | 89.7 | 55.25 | 140 |
| 18 | 1 | 20 | coating | 50 | 1 | 1 | 70 | 1 | 40 | 1 | 60 | 1.5 | 89.7 | 55.25 | 140 |
| 19 | 1 | 20 | coating | 50 | 1 | 1 | 70 | 1 | 40 | 1 | 100 | 1.5 | 89.7 | 55.25 | 140 |
| 20 | 1 | 20 | coating | 50 | 1 | 1 | 70 | 1 | 1 | 1 | 40 | 1.5 | 89.7 | 55.25 | 140 |
| 21 | 1 | 20 | coating | 50 | 1 | 1 | 70 | 1 | 10 | 1 | 40 | 1.5 | 89.7 | 55.25 | 140 |
| 22 | 1 | 20 | coating | 50 | 1 | 1 | 70 | 1 | 60 | 1 | 40 | 1.5 | 89.7 | 55.25 | 140 |
| 23 | 1 | 20 | coating | 50 | 1 | 1 | 70 | 1 | 100 | 1 | 40 | 1.5 | 89.7 | 55.25 | 140 |

TABLE 74

| | Starging sheet *1 | | | Chromate film Coating weight | | Black film Additive 1 | | Additive 2 | | Additive 3 | | | | | |
|---|---|---|---|---|---|---|---|---|---|---|---|---|---|---|---|
| | Kind of plat- ing *1 | Coat- ing weight (g/m²) | Method of forming | of chrom- ium (mg/ m²) | Base resin *2 | Kind *3 | Pro- por- tion (parts) *4 | Kind *5 | Pro- por- tion (parts) *6 | Kind *7 | Pro- por- tion (parts) *8 | Thick- ness (μ) | Value of for- mula ① *9 | Value of for- mula ①' *10 | Baking temp. (°C.) |
| Example 4 | | | | | | | | | | | | | | | |
| 24 | 1 | 20 | coating | 50 | 6 | 1 | 70 | 1 | 1 | — | — | 1.5 | 89.7 | 55.25 | 140 |
| 25 | 1 | 20 | coating | 50 | 6 | 1 | 70 | 1 | 3 | — | — | 1.5 | 89.7 | 55.25 | 140 |
| 26 | 1 | 20 | coating | 50 | 6 | 1 | 70 | 1 | 40 | — | — | 1.5 | 89.7 | 55.25 | 140 |
| 27 | 1 | 20 | coating | 50 | 6 | 1 | 70 | 1 | 60 | — | — | 1.5 | 89.7 | 55.25 | 140 |
| 28 | 1 | 20 | coating | 50 | 6 | 1 | 70 | 1 | 100 | — | — | 1.5 | 89.7 | 55.25 | 140 |
| 29 | 1 | 20 | coating | 50 | 6 | 1 | 70 | 2 | 40 | — | — | 1.5 | 89.7 | 55.25 | 140 |
| 30 | 1 | 20 | coating | 50 | 6 | 1 | 70 | 3 | 40 | — | — | 1.5 | 89.7 | 55.25 | 140 |
| 31 | 1 | 20 | coating | 50 | 6 | 1 | 70 | — | — | 1 | 1 | 1.5 | 89.7 | 55.25 | 140 |
| 32 | 1 | 20 | coating | 50 | 6 | 1 | 70 | — | — | 1 | 3 | 1.5 | 89.7 | 55.25 | 140 |
| 33 | 1 | 20 | coating | 50 | 6 | 1 | 70 | — | — | 1 | 60 | 1.5 | 89.7 | 55.25 | 140 |
| 34 | 1 | 20 | coating | 50 | 6 | 1 | 70 | — | — | 1 | 100 | 1.5 | 89.7 | 55.25 | 140 |
| 35 | 1 | 20 | coating | 50 | 6 | 1 | 70 | — | — | 2 | 40 | 1.5 | 89.7 | 55.25 | 140 |

TABLE 75

| | Starging sheet *1 | | | Chromate film Coating weight | | Black film Additive 1 | | Additive 2 | | Additive 3 | | | | | |
|---|---|---|---|---|---|---|---|---|---|---|---|---|---|---|---|
| | Kind of plat- ing *1 | Coat- ing weight (g/m²) | Method of forming | of chrom- ium (mg/ m²) | Base resin *2 | Kind *3 | Pro- por- tion (parts) *4 | Kind *5 | Pro- por- tion (parts) *6 | Kind *7 | Pro- por- tion (parts) *8 | Thick- ness (μ) | Value of for- mula ① *9 | Value of for- mula ①' *10 | Baking temp. (°C.) |
| Example 4 | | | | | | | | | | | | | | | |
| 36 | 1 | 20 | coating | 50 | 1 | 6 | 70 | — | — | 3 | 40 | 1.5 | 89.7 | 55.25 | 140 |
| 37 | 1 | 20 | coating | 50 | 1 | 6 | 70 | — | — | 4 | 40 | 1.5 | 89.7 | 55.25 | 140 |
| 38 | 1 | 20 | coating | 50 | 1 | 6 | 70 | 1 | 40 | 1 | 1 | 1.5 | 89.7 | 55.25 | 140 |
| 39 | 1 | 20 | coating | 50 | 1 | 6 | 70 | 1 | 40 | 1 | 3 | 1.5 | 89.7 | 55.25 | 140 |
| 40 | 1 | 20 | coating | 50 | 1 | 6 | 70 | 1 | 40 | 1 | 40 | 1.5 | 89.7 | 55.25 | 140 |
| 41 | 1 | 20 | coating | 50 | 1 | 6 | 70 | 1 | 40 | 1 | 60 | 1.5 | 89.7 | 55.25 | 140 |
| 42 | 1 | 20 | coating | 50 | 1 | 6 | 70 | 1 | 40 | 1 | 100 | 1.5 | 89.7 | 55.25 | 140 |
| 43 | 1 | 20 | coating | 50 | 1 | 6 | 70 | 1 | 1 | 1 | 40 | 1.5 | 89.7 | 55.25 | 140 |
| 44 | 1 | 20 | coating | 50 | 1 | 6 | 70 | 1 | 3 | 1 | 40 | 1.5 | 89.7 | 55.25 | 140 |
| 45 | 1 | 20 | coating | 50 | 1 | 6 | 70 | 1 | — | 1 | 40 | 1.5 | 89.7 | 55.25 | 140 |
| 46 | 1 | 20 | coating | 50 | 1 | 6 | 70 | 1 | — | 1 | 40 | 1.5 | 89.7 | 55.25 | 140 |

TABLE 76

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Example 4 | | | | | | | | | | | | | | | |
| 47 | 1 | 20 | coating | 50 | 1 | 11 | 70 | 1 | 1 | — | — | 1.5 | 89.7 | 55.25 | 140 |
| 48 | 1 | 20 | coating | 50 | 1 | 11 | 70 | 1 | 3 | — | — | 1.5 | 89.7 | 55.25 | 140 |
| 49 | 1 | 20 | coating | 50 | 1 | 11 | 70 | 1 | 40 | — | — | 1.5 | 89.7 | 55.25 | 140 |
| 50 | 1 | 20 | coating | 50 | 1 | 11 | 70 | 1 | 60 | — | — | 1.5 | 89.7 | 55.25 | 140 |
| 51 | 1 | 20 | coating | 50 | 1 | 11 | 70 | 1 | 100 | — | — | 1.5 | 89.7 | 55.25 | 140 |
| 52 | 1 | 20 | coating | 50 | 1 | 11 | 70 | 2 | 40 | — | — | 1.5 | 89.7 | 55.25 | 140 |
| 53 | 1 | 20 | coating | 50 | 1 | 11 | 70 | 3 | 40 | — | — | 1.5 | 89.7 | 55.25 | 140 |
| 54 | 1 | 20 | coating | 50 | 1 | 11 | 70 | — | — | 1 | 1 | 1.5 | 89.7 | 55.25 | 140 |
| 55 | 1 | 20 | coating | 50 | 1 | 11 | 70 | — | — | 1 | 3 | 1.5 | 89.7 | 55.25 | 140 |
| 56 | 1 | 20 | coating | 50 | 1 | 11 | 70 | — | — | 1 | 60 | 1.5 | 89.7 | 55.25 | 140 |
| 57 | 1 | 20 | coating | 50 | 1 | 11 | 70 | — | — | 1 | 100 | 1.5 | 89.7 | 55.25 | 140 |
| 58 | 1 | 20 | coating | 50 | 1 | 11 | 70 | — | — | 2 | 40 | 1.5 | 89.7 | 55.25 | 140 |

TABLE 77

| | Starging sheet *1 | | Chromate film | | Black film | | | | | | | | | | |
|---|---|---|---|---|---|---|---|---|---|---|---|---|---|---|---|
| | | | | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |
| Example 4 | | | | | | | | | | | | | | | |
| 59 | 1 | 20 | coating | 50 | 1 | 11 | 70 | — | — | 3 | 40 | 1.5 | 89.7 | 55.25 | 140 |
| 60 | 1 | 20 | coating | 50 | 1 | 11 | 70 | — | — | 4 | 40 | 1.5 | 89.7 | 55.25 | 140 |
| 61 | 1 | 20 | coating | 50 | 1 | 11 | 70 | 1 | 40 | 1 | 1 | 1.5 | 89.7 | 55.25 | 140 |
| 62 | 1 | 20 | coating | 50 | 1 | 11 | 70 | 1 | 40 | 1 | 3 | 1.5 | 89.7 | 55.25 | 140 |
| 63 | 1 | 20 | coating | 50 | 1 | 11 | 70 | 1 | 40 | 1 | 40 | 1.5 | 89.7 | 55.25 | 140 |
| 64 | 1 | 20 | coating | 50 | 1 | 11 | 70 | 1 | 40 | 1 | 60 | 1.5 | 89.7 | 55.25 | 140 |
| 65 | 1 | 20 | coating | 50 | 1 | 11 | 70 | 1 | 40 | 1 | 100 | 1.5 | 89.7 | 55.25 | 140 |
| 66 | 1 | 20 | coating | 50 | 1 | 11 | 70 | 1 | 1 | 1 | 40 | 1.5 | 89.7 | 55.25 | 140 |
| 67 | 1 | 20 | coating | 50 | 1 | 11 | 70 | 1 | 3 | 1 | 40 | 1.5 | 89.7 | 55.25 | 140 |
| 68 | 1 | 20 | coating | 50 | 1 | 11 | 70 | 1 | 60 | 1 | 40 | 1.5 | 89.7 | 55.25 | 140 |
| 69 | 1 | 20 | coating | 50 | 1 | 11 | 70 | 1 | 100 | 1 | 40 | 1.5 | 89.7 | 55.25 | 140 |

TABLE 78

| | Starging sheet *1 | | | Chromate film Coating weight of chromium (mg/m²) | Black film | | | | | | | | | | |
|---|---|---|---|---|---|---|---|---|---|---|---|---|---|---|---|
| | | | | | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 4 | | | | | | | | | | | | | | | |
| 70 | 1 | 20 | coating | 50 | 1 | 16 | 70 | 1 | 1 | — | — | 1.5 | 89.7 | 55.25 | 140 |
| 71 | 1 | 20 | coating | 50 | 1 | 16 | 70 | 1 | 10 | — | — | 1.5 | 89.7 | 55.25 | 140 |
| 72 | 1 | 20 | coating | 50 | 1 | 16 | 70 | 1 | 40 | — | — | 1.5 | 89.7 | 55.25 | 140 |
| 73 | 1 | 20 | coating | 50 | 1 | 16 | 70 | 1 | 60 | — | — | 1.5 | 89.7 | 55.25 | 140 |
| 74 | 1 | 20 | coating | 50 | 1 | 16 | 70 | 1 | 100 | — | — | 1.5 | 89.7 | 55.25 | 140 |
| 75 | 1 | 20 | coating | 50 | 1 | 16 | 70 | 2 | 40 | — | — | 1.5 | 89.7 | 55.25 | 140 |
| 76 | 1 | 20 | coating | 50 | 1 | 16 | 70 | 3 | 40 | — | — | 1.5 | 89.7 | 55.25 | 140 |
| 77 | 1 | 20 | coating | 50 | 1 | 16 | 70 | — | — | 1 | 1 | 1.5 | 89.7 | 55.25 | 140 |
| 78 | 1 | 20 | coating | 50 | 1 | 16 | 70 | — | — | 1 | 10 | 1.5 | 89.7 | 55.25 | 140 |
| 79 | 1 | 20 | coating | 50 | 1 | 16 | 70 | — | — | 1 | 60 | 1.5 | 89.7 | 55.25 | 140 |
| 80 | 1 | 20 | coating | 50 | 1 | 16 | 70 | — | — | 1 | 100 | 1.5 | 89.7 | 55.25 | 140 |
| 81 | 1 | 20 | coating | 50 | 1 | 16 | 70 | — | — | 2 | 40 | 1.5 | 89.7 | 55.25 | 140 |

TABLE 79

| | Starging sheet *1 | | | Chromate film Coating weight of chromium (mg/m²) | Black film | | | | | | | | | | |
|---|---|---|---|---|---|---|---|---|---|---|---|---|---|---|---|
| | | | | | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 4 | | | | | | | | | | | | | | | |
| 82 | 1 | 20 | coating | 50 | 1 | 16 | 70 | — | — | 3 | 40 | 1.5 | 89.7 | 55.25 | 140 |
| 83 | 1 | 20 | coating | 50 | 1 | 16 | 70 | — | — | 4 | 40 | 1.5 | 89.7 | 55.25 | 140 |
| 84 | 1 | 20 | coating | 50 | 1 | 16 | 70 | 1 | 40 | 1 | 1 | 1.5 | 89.7 | 55.25 | 140 |
| 85 | 1 | 20 | coating | 50 | 1 | 16 | 70 | 1 | 40 | 1 | 10 | 1.5 | 89.7 | 55.25 | 140 |
| 86 | 1 | 20 | coating | 50 | 1 | 16 | 70 | 1 | 40 | 1 | 40 | 1.5 | 89.7 | 55.25 | 140 |
| 87 | 1 | 20 | coating | 50 | 1 | 16 | 70 | 1 | 40 | 1 | 60 | 1.5 | 89.7 | 55.25 | 140 |
| 88 | 1 | 20 | coating | 50 | 1 | 16 | 70 | 1 | 40 | 1 | 100 | 1.5 | 89.7 | 55.25 | 140 |
| 89 | 1 | 20 | coating | 50 | 1 | 16 | 70 | 1 | 1 | 1 | 40 | 1.5 | 89.7 | 55.25 | 140 |
| 90 | 1 | 20 | coating | 50 | 1 | 16 | 70 | 1 | 10 | 1 | 40 | 1.5 | 89.7 | 55.25 | 140 |
| 91 | 1 | 20 | coating | 50 | 1 | 16 | 70 | 1 | 60 | 1 | 40 | 1.5 | 89.7 | 55.25 | 140 |
| 92 | 1 | 20 | coating | 50 | 1 | 16 | 70 | 1 | 100 | 1 | 40 | 1.5 | 89.7 | 55.25 | 140 |

TABLE 80

| | Starting sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | Value of formula ① *9 | Value of formula ①' *10 | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | | | Baking temp. (°C.) |
| Comparative Example 4 | | | | | | | | | | | | | | | |
| 1 | 1 | 20 | coating | 50 | 1 | 1 | 70 | 1 | 150 | — | — | 1.5 | — | — | 140 |
| 2 | 1 | 20 | coating | 50 | 1 | 1 | 70 | — | — | 1 | 150 | 1.5 | — | — | 140 |
| 3 | 1 | 20 | coating | 50 | 1 | 1 | 70 | 1 | 40 | 1 | 110 | 1.5 | — | — | 140 |
| 4 | 1 | 20 | coating | 50 | 1 | 1 | 70 | 1 | 110 | 1 | 40 | 1.5 | — | — | 140 |
| 5 | 1 | 20 | coating | 50 | 1 | 6 | 70 | 1 | 150 | — | — | 1.5 | — | — | 140 |
| 6 | 1 | 20 | coating | 50 | 1 | 6 | 70 | — | — | 1 | 150 | 1.5 | — | — | 140 |
| 7 | 1 | 20 | coating | 50 | 1 | 6 | 70 | 1 | 40 | 1 | 110 | 1.5 | — | — | 140 |
| 8 | 1 | 20 | coating | 50 | 1 | 6 | 70 | 1 | 110 | 1 | 40 | 1.5 | — | — | 140 |

TABLE 81

| | Starting sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | Value of formula ① *9 | Value of formula ①' *10 | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | | | Baking temp. (°C.) |
| Comparative Example 4 | | | | | | | | | | | | | | | |
| 9 | 1 | 20 | coating | 50 | 1 | 11 | 70 | 1 | 150 | — | — | 1.5 | — | — | 140 |
| 10 | 1 | 20 | coating | 50 | 1 | 11 | 70 | — | — | 1 | 150 | 1.5 | — | — | 140 |
| 11 | 1 | 20 | coating | 50 | 1 | 11 | 70 | 1 | 40 | 1 | 110 | 1.5 | — | — | 140 |
| 12 | 1 | 20 | coating | 50 | 1 | 11 | 70 | 1 | 110 | 1 | 40 | 1.5 | — | — | 140 |
| 13 | 1 | 20 | coating | 50 | 1 | 16 | 70 | 1 | 150 | — | — | 1.5 | — | — | 140 |
| 14 | 1 | 20 | coating | 50 | 1 | 16 | 70 | — | — | 1 | 150 | 1.5 | — | — | 140 |
| 15 | 1 | 20 | coating | 50 | 1 | 16 | 70 | 1 | 40 | 1 | 110 | 1.5 | — | — | 140 |
| 16 | 1 | 20 | coating | 50 | 1 | 16 | 70 | 1 | 110 | 1 | 40 | 1.5 | — | — | 140 |

TABLE 82

| | Blackness (L value) | Weldability | Formability | Adhesion | Corrosion resistance | | Light fastness |
|---|---|---|---|---|---|---|---|
| | | | | | Flat portion | Formed portion | |
| Example 4 | | | | | | | |
| 1 | ⊙ (13) | ⊙ | +○ | ⊙ | ⊙ | ○ | ⊙ |
| 2 | ⊙ (13) | ⊙ | ⊙ | ⊙ | ⊙ | ○ | ⊙ |
| 3 | ⊙ (14) | ⊙ | ⊙ | ⊙ | ⊙ | ○ | ⊙ |
| 4 | ⊙ (15) | ⊙ | ⊙ | ⊙ | ⊙ | ○ | ⊙ |
| 5 | ○ (20) | ⊙ | +○ | ○ | ⊙ | ○ | ⊙ |
| 6 | ⊙ (14) | ⊙ | ⊙ | ⊙ | ⊙ | ○ | ⊙ |
| 7 | ⊙ (14) | ⊙ | ⊙ | ⊙ | ⊙ | ○ | ⊙ |
| 8 | ⊙ (13) | ⊙ | ○ | ⊙ | ⊙ | +○ | ⊙ |
| 9 | ⊙ (13) | ⊙ | ○ | ⊙ | ⊙ | ⊙ | ⊙ |

TABLE 82-continued

| | Blackness | | | | Corrosion resistance | | |
|---|---|---|---|---|---|---|---|
| | (L value) | Weldability | Formability | Adhesion | Flat portion | Formed portion | Light fastness |
| 10 | ⊙ (15) | ⊙ | ○ | ⊙ | ⊙ | ⊙ | ⊙ |
| 11 | ○ (20) | ⊙ | –○ | ○ | ⊙ | ⊙ | ⊙ |

TABLE 83

| | Blackness | | | | Corrosion resistance | | |
|---|---|---|---|---|---|---|---|
| | (L value) | Weldability | Formability | Adhesion | Flat portion | Formed portion | Light fastness |
| Example 4 | | | | | | | |
| 12 | ⊙ (14) | ⊙ | ○ | ⊙ | ⊙ | ⊙ | ⊙ |
| 13 | ⊙ (14) | ⊙ | ○ | ⊙ | ⊙ | ⊙ | ⊙ |
| 14 | ⊙ (14) | ⊙ | ○ | ⊙ | ⊙ | ⊙ | ⊙ |
| 15 | ⊙ (14) | ⊙ | +○ | ⊙ | ⊙ | +○ | ⊙ |
| 16 | ⊙ (14) | ⊙ | ⊙ | ⊙ | ⊙ | ⊙ | ⊙ |
| 17 | ⊙ (15) | ⊙ | ⊙ | ⊙ | ⊙ | ⊙ | ⊙ |
| 18 | ○ (18) | ⊙ | +○ | ○ | ⊙ | ⊙ | ⊙ |
| 19 | ○ (20) | ⊙ | +○ | ○ | ⊙ | ⊙ | ⊙ |
| 20 | ⊙ (13) | ⊙ | +○ | ⊙ | ⊙ | +○ | ⊙ |
| 21 | ⊙ (13) | ⊙ | ⊙ | ⊙ | ⊙ | ⊙ | ⊙ |
| 22 | ○ (18) | ⊙ | +○ | ○ | ⊙ | ⊙ | ⊙ |
| 23 | ○ (20) | ⊙ | +○ | ○ | ⊙ | ○ | ⊙ |

TABLE 84

| | Blackness | | | | Corrosion resistance | | |
|---|---|---|---|---|---|---|---|
| | (L value) | Weldability | Formability | Adhesion | Flat portion | Formed portion | Light fastness |
| Example 4 | | | | | | | |
| 24 | ⊙ (13) | ⊙ | +○ | ⊙ | ⊙ | ○ | ○ |
| 25 | ⊙ (13) | ⊙ | ⊙ | ⊙ | ⊙ | ○ | ○ |
| 26 | ⊙ (14) | ⊙ | ⊙ | ⊙ | ⊙ | ○ | ○ |
| 27 | ⊙ (15) | ⊙ | ⊙ | ⊙ | ⊙ | ○ | ○ |
| 28 | ○ (20) | ⊙ | +○ | ○ | ⊙ | ○ | ○ |
| 29 | ⊙ (14) | ⊙ | ⊙ | ⊙ | ⊙ | ○ | ○ |
| 30 | ⊙ (14) | ⊙ | ⊙ | ⊙ | ⊙ | ○ | ○ |
| 31 | ⊙ (13) | ⊙ | ○ | ⊙ | ⊙ | +○ | ○ |
| 32 | ⊙ (13) | ⊙ | ○ | ⊙ | ⊙ | ⊙ | ○ |
| 33 | ⊙ (15) | ⊙ | ○ | ⊙ | ⊙ | ⊙ | ○ |
| 34 | ○ (20) | ⊙ | –○ | ○ | ⊙ | ⊙ | ○ |
| 35 | ⊙ (14) | ⊙ | ○ | ⊙ | ⊙ | ⊙ | ○ |

TABLE 85

| | Blackness | | | | Corrosion resistance | | |
|---|---|---|---|---|---|---|---|
| | (L value) | Weldability | Formability | Adhesion | Flat portion | Formed portion | Light fastness |
| Example 4 | | | | | | | |
| 36 | ⊙ (14) | ⊙ | ○ | ⊙ | ⊙ | ⊙ | ○ |
| 37 | ⊙ (14) | ⊙ | ○ | ⊙ | ⊙ | ⊙ | ○ |
| 38 | ⊙ (14) | ⊙ | +○ | ⊙ | ⊙ | +○ | ○ |
| 39 | ⊙ (14) | ⊙ | ⊙ | ⊙ | ⊙ | ⊙ | ○ |
| 40 | ⊙ (15) | ⊙ | ⊙ | ⊙ | ⊙ | ⊙ | ○ |
| 41 | ○ (18) | ⊙ | +○ | ○ | ⊙ | ⊙ | ○ |
| 42 | ○ (20) | ⊙ | +○ | ○ | ⊙ | ⊙ | ○ |
| 43 | ⊙ (13) | ⊙ | +○ | ⊙ | ⊙ | +○ | ○ |
| 44 | ⊙ (13) | ⊙ | ⊙ | ⊙ | ⊙ | ⊙ | ○ |

TABLE 85-continued

| | Blackness (L value) | Weldability | Formability | Adhesion | Corrosion resistance Flat portion | Corrosion resistance Formed portion | Light fastness |
|---|---|---|---|---|---|---|---|
| 45 | ○ (18) | ⊚ | +○ | ○ | ⊚ | ⊚ | ○ |
| 46 | ○ (20) | ⊚ | +○ | ○ | ⊚ | ○ | ○ |

TABLE 86

| | Blackness (L value) | Weldability | Formability | Adhesion | Corrosion resistance Flat portion | Corrosion resistance Formed portion | Light fastness |
|---|---|---|---|---|---|---|---|
| Example 4 | | | | | | | |
| 47 | ⊚ (13) | ⊚ | +○ | ⊚ | ⊚ | ○ | ○ |
| 48 | ⊚ (13) | ⊚ | ⊚ | ⊚ | ⊚ | ○ | ○ |
| 49 | ⊚ (14) | ⊚ | ⊚ | ⊚ | ⊚ | ○ | ○ |
| 50 | ⊚ (15) | ⊚ | ⊚ | ⊚ | ⊚ | ○ | ○ |
| 51 | ○ (20) | ⊚ | +○ | ○ | ⊚ | ○ | ○ |
| 52 | ⊚ (14) | ⊚ | ⊚ | ⊚ | ⊚ | ○ | ○ |
| 53 | ⊚ (14) | ⊚ | ⊚ | ⊚ | ⊚ | ○ | ○ |
| 54 | ⊚ (13) | ⊚ | ○ | ⊚ | ⊚ | +○ | ○ |
| 55 | ⊚ (13) | ⊚ | ○ | ⊚ | ⊚ | ⊚ | ○ |
| 56 | ⊚ (15) | ⊚ | ○ | ⊚ | ⊚ | ⊚ | ○ |
| 57 | ○ (20) | ⊚ | −○ | ○ | ⊚ | ⊚ | ○ |
| 58 | ⊚ (14) | ⊚ | ○ | ⊚ | ⊚ | ⊚ | ○ |

TABLE 87

| | Blackness (L value) | Weldability | Formability | Adhesion | Corrosion resistance Flat portion | Corrosion resistance Formed portion | Light fastness |
|---|---|---|---|---|---|---|---|
| Example 4 | | | | | | | |
| 59 | ⊚ (14) | ⊚ | ○ | ⊚ | ⊚ | ⊚ | ○ |
| 60 | ⊚ (14) | ⊚ | ○ | ⊚ | ⊚ | ⊚ | ○ |
| 61 | ⊚ (14) | ⊚ | +○ | ⊚ | ⊚ | +○ | ○ |
| 62 | ⊚ (14) | ⊚ | ⊚ | ⊚ | ⊚ | ⊚ | ○ |
| 63 | ⊚ (15) | ⊚ | ⊚ | ⊚ | ⊚ | ⊚ | ○ |
| 64 | ○ (18) | ⊚ | +○ | ○ | ⊚ | ⊚ | ○ |
| 65 | ○ (20) | ⊚ | +○ | ○ | ⊚ | ⊚ | ○ |
| 66 | ⊚ (13) | ⊚ | +○ | ⊚ | ⊚ | +○ | ○ |
| 67 | ⊚ (13) | ⊚ | ⊚ | ⊚ | ⊚ | ⊚ | ○ |
| 68 | ○ (18) | ⊚ | +○ | ○ | ⊚ | ⊚ | ○ |
| 69 | ○ (20) | ⊚ | +○ | ○ | ⊚ | ○ | ○ |

TABLE 88

| | Blackness (L value) | Weldability | Formability | Adhesion | Corrosion resistance Flat portion | Corrosion resistance Formed portion | Light fastness |
|---|---|---|---|---|---|---|---|
| Example 4 | | | | | | | |
| 70 | ⊚ (13) | ⊚ | +○ | ⊚ | ⊚ | ○ | ○ |
| 71 | ⊚ (13) | ⊚ | ⊚ | ⊚ | ⊚ | ○ | ○ |
| 72 | ⊚ (14) | ⊚ | ⊚ | ⊚ | ⊚ | ○ | ○ |
| 73 | ⊚ (15) | ⊚ | ⊚ | ⊚ | ⊚ | ○ | ○ |
| 74 | ○ (20) | ⊚ | +○ | ○ | ⊚ | ○ | ○ |
| 75 | ⊚ (14) | ⊚ | ⊚ | ⊚ | ⊚ | ○ | ○ |
| 76 | ⊚ (14) | ⊚ | ⊚ | ⊚ | ⊚ | ○ | ○ |

TABLE 88-continued

| | Blackness (L value) | Weldability | Formability | Adhesion | Corrosion resistance | | Light fastness |
|---|---|---|---|---|---|---|---|
| | | | | | Flat portion | Formed portion | |
| 77 | ⊚ (13) | ⊚ | ○ | ⊚ | ⊚ | +○ | ○ |
| 78 | ⊚ (13) | ⊚ | ○ | ⊚ | ⊚ | ⊚ | ○ |
| 79 | ⊚ (15) | ⊚ | ○ | ⊚ | ⊚ | ⊚ | ○ |
| 80 | ○ (20) | ⊚ | −○ | ○ | ⊚ | ⊚ | ○ |
| 81 | ⊚ (14) | ⊚ | ○ | ⊚ | ⊚ | ⊚ | ○ |

TABLE 89

| | Blackness (L value) | Weldability | Formability | Adhesion | Corrosion resistance | | Light fastness |
|---|---|---|---|---|---|---|---|
| | | | | | Flat portion | Formed portion | |
| Example 4 | | | | | | | |
| 82 | ⊚ (14) | ⊚ | ○ | ⊚ | ⊚ | ⊚ | ○ |
| 83 | ⊚ (14) | ⊚ | ○ | ⊚ | ⊚ | ⊚ | ○ |
| 84 | ⊚ (14) | ⊚ | +○ | ⊚ | ⊚ | +○ | ○ |
| 85 | ⊚ (14) | ⊚ | ⊚ | ⊚ | ⊚ | ⊚ | ○ |
| 86 | ⊚ (15) | ⊚ | ⊚ | ⊚ | ⊚ | ⊚ | ○ |
| 87 | ○ (18) | ⊚ | +○ | ○ | ⊚ | ⊚ | ○ |
| 88 | ○ (20) | ⊚ | +○ | ○ | ⊚ | ⊚ | ○ |
| 89 | ⊚ (13) | ⊚ | +○ | ⊚ | ⊚ | +○ | ○ |
| 90 | ⊚ (13) | ⊚ | ⊚ | ⊚ | ⊚ | ⊚ | ○ |
| 91 | ○ (18) | ⊚ | +○ | ○ | ⊚ | ⊚ | ○ |
| 92 | ○ (20) | ⊚ | +○ | ○ | ⊚ | ○ | ○ |

TABLE 90

| | Blackness (L value) | Weldability | Formability | Adhesion | Corrosion resistance | | Light fastness |
|---|---|---|---|---|---|---|---|
| | | | | | Flat portion | Formed portion | |
| Comparative Example 4 | | | | | | | |
| 1y | X (25) | ⊚ | −○ | △ | ⊚ | △ | ○ |
| 2 | X (25) | ⊚ | △ | △ | ⊚ | △ | ○ |
| 3 | X (25) | ⊚ | △ | △ | ⊚ | △ | ○ |
| 4 | X (25) | ⊚ | △ | △ | ⊚ | △ | ○ |
| 5 | X (25) | ⊚ | −○ | △ | ⊚ | △ | ⊚ |
| 6 | X (25) | ⊚ | △ | △ | ⊚ | △ | ⊚ |
| 7 | X (25) | ⊚ | △ | △ | ⊚ | △ | ⊚ |
| 8 | X (25) | ⊚ | △ | △ | ⊚ | △ | ⊚ |

TABLE 91

| | Blackness (L value) | Weldability | Formability | Adhesion | Corrosion resistance | | Light fastness |
|---|---|---|---|---|---|---|---|
| | | | | | Flat portion | Formed portion | |
| Comparative Example 4 | | | | | | | |
| 9 | X (25) | ⊚ | −○ | △ | ⊚ | △ | ○ |
| 10 | X (25) | ⊚ | △ | △ | ⊚ | △ | ○ |
| 11 | X (25) | ⊚ | △ | △ | ⊚ | △ | ○ |
| 12 | X (25) | ⊚ | △ | △ | ⊚ | △ | ○ |
| 13 | X (25) | ⊚ | −○ | △ | ⊚ | △ | ⊚ |
| 14 | X (25) | ⊚ | △ | △ | ⊚ | △ | ⊚ |

TABLE 91-continued

| | Blackness | | | | Corrosion resistance | | |
|---|---|---|---|---|---|---|---|
| | (L value) | Weldability | Formability | Adhesion | Flat portion | Formed portion | Light fastness |
| 15 | X (25) | ⊙ | Δ | Δ | ⊙ | Δ | ⊙ |
| 16 | X (25) | ⊙ | Δ | Δ | ⊙ | Δ | ⊙ |

TABLE 92

| | Starting sheet *1 | | Chromate film | | Black film | | | | | | | | | |
|---|---|---|---|---|---|---|---|---|---|---|---|---|---|---|
| | | | Method of forming | Coating weight of chromium (mg/m²) | Base resin *2 | Additive 1 | | Additive 2 | | Additive 3 | | Thickness (μ) | Value of formula ① *9 | Value of formula ①' *10 | Baking temp. (°C.) |
| | Kind of plating *1 | Coating weight (g/m²) | | | | Kind *3 | Proportion (parts) *4 | Kind *5 | Proportion (parts) *6 | Kind *7 | Proportion (parts) *8 | | | | |

| Example 5 | | | | | | | | | | | | | | | |
|---|---|---|---|---|---|---|---|---|---|---|---|---|---|---|---|
| 1 | 1 | 20 | coating | 50 | 1 | 1 | 70 | — | — | — | — | 1.5 | 89.7 | 55.25 | 140 |
| 2 | 1 | 20 | coating | 50 | 1 | 6 | 70 | — | — | — | — | 1.5 | 89.7 | 55.25 | 140 |
| 3 | 1 | 20 | coating | 50 | 1 | 11 | 70 | — | — | — | — | 1.5 | 89.7 | 55.25 | 140 |
| 4 | 1 | 20 | coating | 50 | 1 | 16 | 70 | — | — | — | — | 1.5 | 89.7 | 55.25 | 140 |
| Comparative Example 5 | 1 | 20 | coating | 50 | 1 | — | — | — | — | — | — | 1.5 | — | — | 140 |
| Comparative Example 3 No. 3 | 1 | 20 | — | — | 1 | 1 | 70 | — | — | — | — | 1.5 | 89.7 | 55.25 | 140 |

TABLE 93

| | Blackness | | | | Corrosion resistance | | |
|---|---|---|---|---|---|---|---|
| | (L value) | Weldability | Formability | Adhesion | Flat portion | Formed portion | Light fastness |
| Example 5 | | | | | | | |
| 1 | ⊙ (13) | ⊙ | ○ | ⊙ | ⊙ | ○ | ⊙ |
| 2 | ⊙ (13) | ⊙ | ○ | ⊙ | ⊙ | ○ | ○ |
| 3 | ⊙ (13) | ⊙ | ○ | ⊙ | ⊙ | ○ | ○ |
| 4 | ⊙ (13) | ⊙ | ○ | ⊙ | ⊙ | ○ | ○ |
| Comparative Example 5 | X (65) | ⊙ | ○ | ⊙ | ⊙ | Δ | — |
| Comparative Example 3 No. 3 | ⊙ (13) | ⊙ | ⊙ | ○ | X | X | ⊙ |

TABLE 94

| Starging sheet *1 | | | Chromate film Coating weight of chromium (mg/m²) | Black film | | | | | | | | | |
|---|---|---|---|---|---|---|---|---|---|---|---|---|---|
| | | | | Base resin *2 | Additive 1 | | Additive 2 | | Additive 3 | | Thickness (µ) | Value of formula ①  *9 | Value of formula ①' *10 | Baking temp. (°C.) |
| Kind of plating *1 | Coating weight (g/m²) | Method of forming | | | Kind *3 | Proportion (parts) *4 | Kind *5 | Proportion (parts) *6 | Kind *7 | Proportion (parts) *8 | | | | |

Example 6

| | | | | | | | | | | | | | | |
|---|---|---|---|---|---|---|---|---|---|---|---|---|---|---|
| 1 | 1 | 20 | coating | 50 | 1 | 1 | 70 | — | — | — | — | 1.5 | 89.7 | 55.25 | 140 |
| 2 | 1 | 20 | coating | 50 | 1 | 6 | 70 | — | — | — | — | 1.5 | 89.7 | 55.25 | 140 |
| 3 | 1 | 20 | coating | 50 | 1 | 11 | 70 | — | — | — | — | 1.5 | 89.7 | 55.25 | 140 |
| 4 | 1 | 20 | coating | 50 | 1 | 16 | 70 | — | — | — | — | 1.5 | 89.7 | 55.25 | 140 |

TABLE 95

| | Blackness (L value) | Weldability | Formability | Adhesion | Corrosion resistance | | Light fastness |
|---|---|---|---|---|---|---|---|
| | | | | | Flat portion | Formed portion | |

Example 6

| | | | | | | | |
|---|---|---|---|---|---|---|---|
| 1 | ⊚ (13) | — | — | — | ⊚ | — | — |
| 2 | ⊚ (13) | — | — | — | ○ | — | — |
| 3 | ⊚ (13) | — | — | — | ○ | — | — |
| 4 | ⊚ (13) | — | — | — | ○ | — | — |

What is claimed is:

1. A weldable black steel sheet having a surface plated with zinc or a zinc alloy, and carrying a chromate film formed on said plated surface and having a coating weight of 10 to 200 mg/m² in terms of metallic chromium, and a black film formed on said chromate film from a composition comprising 100 parts by weight of a thermosetting resin as a base resin, and 'x' parts by weight of a black dye as a blackening agent, said black film having a thickness of 'y' microns and an L value not exceeding 20, said resin and said dye being both soluble in an organic solvent, said dye being at least one dye selected from the group consisting of azo dyes, azine dyes, and metal complex of azo dyes, said 'x' being a value satisfying formulas 1 and 2, while said 'y' is a value satisfying formulas 1 and 3:

$$(x-1)(y-0.2) \geq 7 \quad (1)$$

$$1 < x \leq 200 \quad (2)$$

$$0.2 < y \leq 3 \quad (3)$$

where x represents the proportion, in parts by weight, of said dye against 100 parts by weight of said resin, and y represents the thickness, in microns, of said black trim.

2. A weldable black steel sheet as set forth in claim 1, wherein said black dye is at least one dye selected from the group consisting of azo dyes, azine dyes and metal complex of azo dyes, and at least one dye selected from the group consisting of phthalocyanine dyes, azomethine dyes, anthraquinone dyes, and quinophthalone dyes.

3. A weldable black steel sheet as set forth in claim 2, wherein said black film contains, other than said black dyes, at least a dye for controlling a black color tone and/or luster.

4. A weldable black steel sheet as set forth in claim 1, wherein said black film contains, other than said black dyes, at least a dye for controlling a black color tone and/or luster.

5. A weldable black steel sheet as set forth in claim 1, 2, 4 or 3, wherein said L value does not exceed 15, and wherein said 'x' is a value satisfying formulas 1' and 2', while said 'y' is a value satisfying formulas 1' and 3':

$$(x-5)(y-0.65) \geq 6 \quad (1')$$

$$5 < x \leq 120 \quad (2')$$

$$0.65 < y \leq 2.5 \quad (3')$$

where x end y are both as defined in claim 1.

6. A weldable black steel sheet as set forth in claim 1, 2, 4 or 3, wherein said composition further contains 1 to 100 parts by weight of a solid lubricant.

7. A weldable black steel sheet as set forth in claim 6, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

8. A weldable black steel sheet as set forth in claim 6, wherein said L value does not exceed 15, and wherein said 'x' is a value satisfying formulas 1' and 2', while said 'y' is a value satisfying formulas 1' and 3':

$$(x-5)(y-0.65) \geq 6 \quad (1')$$

$$5 < x \leq 120 \quad (2')$$

$$0.65 < y \leq 2.5 \quad (3')$$

where x and y are both as defined in claim 1.

9. A weldable black steel sheet as set forth in claim 8, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

10. A weldable black steel sheet as set forth in claim 1, 2, 4 or 3, wherein said composition further contains 1 to 100 parts by weight of a granular rust-inhibitive pigment.

11. A weldable black steel sheet as set forth in claim 10, wherein said pigment is at least one material selected from the group consisting of sparingly soluble chromium compounds and silica.

12. A weldable black steel as set forth in claim 10, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (1')$$

$$5 < x \leq 120 \qquad (2')$$

$$0.65 < y \leq 2.5 \qquad (3')$$

where x and y are both as defined in claim 1.

13. A weldable black steel sheet as set forth in claim 12, wherein said pigment is at least one material selected from the group consisting of sparingly soluble chromium compounds and silica.

14. A weldable black steel sheet as set forth in claim 1, 2, 4 or 3, wherein said composition further contains 1 to 100 parts by weight of a solid lubricant and 1 to 100 parts by weight of a granular rust-inhibitive pigment.

15. A weldable black steel sheet as set forth in claim 14, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

16. A weldable black steel sheet as set forth in claim 14, wherein said pigment is at least one material selected from the group consisting of sparingly soluble chromium compounds and silica.

17. A weldable black steel sheet as set forth in claim 14, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols; while said pigment is at least one material selected from the group consisting of sparingly soluble chromium compounds and silica.

18. A weldable black steel sheet as set forth in claim 14, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (4')$$

$$5 < x \leq 120 \qquad (2')$$

$$0.65 < y \leq 2.5 \qquad (3')$$

where x and y are both as defined in claim 1.

19. A weldable black steel sheet as set forth in claim 18, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

20. A weldable black steel sheet as set forth in claim 18, wherein said pigment is at least one material selected from the group consisting of sparingly soluble chromium compounds and silica.

21. A weldable black steel sheet as set forth in claim 18, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols; while said pigment is at least one material selected from the group consisting of sparingly soluble chromium compounds and silica.

22. A weldable black steel sheet as set forth in claim 1, 4 or 3, wherein said black dye is a complex salt composed of an azo dye and a metal.

23. A weldable black steel sheet as set forth in claim 22, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (1')$$

$$5 < x \leq 120 \qquad (2')$$

$$0.65 < y \leq 2.5 \qquad (3')$$

where x and y are both as defined in claim 1.

24. A weldable black steel sheet as set forth in claim 22, wherein said composition further contains 1 to 100 parts by weight of a solid lubricant.

25. A weldable black steel sheet as set forth in claim 24, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

26. A weldable black steel sheet as set forth in claim 24, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (4')$$

$$5 < x \leq 120 \qquad (2')$$

$$0.65 < y \leq 2.5 \qquad (3')$$

where x and y are both as defined in claim 1.

27. A weldable black steel sheet as set forth in claim 26, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

28. A weldable black steel sheet as set forth in claim 22, wherein said composition further contains 1 to 100 parts by weight of a granular rust-inhibitive pigment.

29. A weldable black steel sheet as set forth in claim 28, wherein said pigment is at least one material selected from the group consisting of sparingly soluble chromium compounds and silica.

30. A weldable black steel sheet as set forth in claim 28, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (1')$$

$$5 < x \leq 120 \qquad (2')$$

$$0.65 < y \leq 2.5 \qquad (3')$$

where x and y are both as defined in claim 1.

31. A weldable black steel sheet as set forth in claim 30, wherein said pigment is at least one material selected from the group consisting of sparingly soluble chromium compounds and silica.

32. A weldable black steel sheet as set forth in claim 22, wherein said composition further contains 1 to 100 parts by weight of a solid lubricant and 1 to 100 parts by weight of a granular rust-inhibitive pigment.

33. A weldable black steel sheet as set forth in claim 32, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

34. A weldable black steel sheet as set forth in claim 32, wherein said pigment is at least one material selected from the group consisting of sparingly soluble chromium compounds and silica.

35. A weldable black steel sheet as set forth in claim 32, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols; while said pigment is at least one material selected from the group consisting of sparingly soluble chromium compounds and silica.

36. A weldable black steel sheet as set forth in claim 32, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (1')$$

$$5 < x \leq 120 \qquad (2')$$

$$0.65 < y \leq 2.5 \qquad (3')$$

where x and y are both as defined in claim 1.

37. A weldable black steel sheet as set forth in claim 36, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

38. A weldable black steel sheet as set forth in claim 36, wherein said pigment is at least one material selected from the group consisting of sparingly soluble chromium compounds and silica.

39. A weldable black steel sheet as set forth in claim 36, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols; while said pigment is at least one material selected from the group consisting of sparingly soluble chromium compounds and silica.

40. A weldable black steel sheet as set forth in claim 22, wherein said metal is chromium.

41. A weldable black steel sheet as set forth in claim 40, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (1')$$

$$5 < x \leq 120 \qquad (2')$$

$$0.65 < y \leq 2.5 \qquad (3')$$

where x and y are both as defined in claim 1.

42. A weldable black steel sheet as set forth in claim 40, wherein said composition further contains 1 to 100 parts by weight of a solid lubricant.

43. A weldable black steel sheet as set forth in claim 42, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

44. A weldable black steel sheet as set forth in claim 42, wherein said L value hoes not exceed 15, and wherein said 'x' is a value satisfying formulas 1' and 2', while said 'y' is a value satisfying formulas 1' and 3':

$$(x-5)(y-0.65) \geq 6 \qquad (1')$$

$$5 < x \leq 120 \qquad (2')$$

$$0.65 < y \leq 2.5 \qquad (3')$$

where x and y are both as defined in claim 1.

45. A weldable black steel sheet as set forth in claim 44, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

46. A weldable black steel sheet as set forth in claim 40, wherein said composition further contains 1 to 100 parts by weight of a granular rust-inhibitive pigment.

47. A weldable black steel sheet as set forth in claim 45, wherein said pigment is at least one material selected from the group consisting of sparingly soluble chromium compounds and silica.

48. A weldable black steel sheet as set forth in claim 46, wherein said L value does not exceed 15, and wherein said 'x' is a value satisfying formulas 1' and 2', while said 'y' is a value satisfying formulas 1' and 3':

$$(x-5)(y-0.65) \geq 6 \qquad (1')$$

$$5 < x \leq 120 \qquad (2')$$

$$0.65 < y \leq 2.5 \qquad (3')$$

where x and y are both as defined in claim 1.

49. A weldable black steel sheet as set forth in claim 48, wherein said pigment is at least one material selected from the group consisting of sparingly soluble chromium compounds and silica.

50. A weldable black steel sheet as set forth in claim 40, wherein said composition further contains 1 to 100 parts by weight of a solid lubricant and 1 to 100 parts by weight of a granular rust-inhibitive pigment.

51. A weldable black steel sheet as set forth in claim 50, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

52. A weldable black steel sheet as set forth in claim 50, wherein said pigment is at least one material selected from the group consisting of sparingly soluble chromium compounds and silica.

53. A weldable black steel sheet as set forth in claim 50, wherein sad lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols; while said pigment is at least one material selected from the group consisting of sparingly soluble chromium compounds and silica.

54. A weldable black steel sheet as set forth in claim 50, wherein said L value does not exceed 15, and wherein said 'x' is a value satisfying formulas 1' and 2', while said 'y' is a value satisfying formulas 1' and 3':

$$(x-5)(y-0.65) \geq 6 \quad (1')$$

$$5 < x \leq 120 \quad (2')$$

$$0.65 < y \leq 2.5 \quad (3')$$

where x and y are both as defined in claim 1.

55. A weldable black steel sheet as set forth in claim 54, wherein said lubricant is at least one material selected from the group consisting of: polyolefin wax, paraffin wax; fluororesin compounds; fatty acid amides; metallic soaps; molybdenum disulfide; graphite; graphite fluoride; boron nitride; and polyalkylene glycols.

56. A weldable black steel sheet as set forth in claim 54, wherein said pigment is at least one material selected from the group consisting of sparingly soluble chromium compounds and silica.

57. A weldable black steel sheet as set forth in claim 54, wherein said lubricant is at least one material selected from the group consisting of: polyolefin wax, paraffin wax; fluororesin compounds, fatty acid amides; metallic soaps; molybdenum disulfide; graphite; graphite fluoride; boron nitride; and polyalkylene glycols; while said pigment is at least one material selected from the group consisting of sparingly soluble chromium compounds and silica.

* * * * *